US012262184B2

(12) United States Patent
Yu et al.

(10) Patent No.: US 12,262,184 B2
(45) Date of Patent: Mar. 25, 2025

(54) ACTIVE NOISE CANCELLATION METHOD AND APPARATUS

(71) Applicant: Huawei Technologies Co., Ltd., Shenzhen (CN)

(72) Inventors: Xiaowei Yu, Shenzhen (CN); Yulong Li, Shenzhen (CN); Fan Fan, Shenzhen (CN); JingFan Qin, Shenzhen (CN); Xiaohong Yang, Shenzhen (CN); Yangshan Ou, Shenzhen (CN); Yuhao Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 17/986,549

(22) Filed: Nov. 14, 2022

(65) Prior Publication Data

US 2023/0080298 A1 Mar. 16, 2023

Related U.S. Application Data

(63) Continuation of application No. PCT/CN2021/084775, filed on Mar. 31, 2021.

(30) Foreign Application Priority Data

May 14, 2020 (CN) ......................... 202010407692.7
Oct. 19, 2020 (CN) ......................... 202011120314.7

(51) Int. Cl.
*H04R 3/04* (2006.01)
*H04R 1/10* (2006.01)

(52) U.S. Cl.
CPC ............. *H04R 3/04* (2013.01); *H04R 1/1083* (2013.01); *H04R 2420/07* (2013.01); *H04R 2460/01* (2013.01)

(58) Field of Classification Search
None
See application file for complete search history.

(56) References Cited

U.S. PATENT DOCUMENTS 8,107,637 B2 1/2012 Asada et al.
2010/0002891 A1 1/2010 Shiraishi et al.
(Continued)

FOREIGN PATENT DOCUMENTS

CN 102026080 A 4/2011
CN 103297904 A 9/2013
(Continued)

OTHER PUBLICATIONS

Shota Suzuki et al, Audio object individual operation and its application to earphone leakage noise reduction, Proceedings of the 4th International Symposium on Communications Control and Signal Processing, ISCCSP 2010, Limassol, Cyprus, Mar. 3-5, 2010, 5 pages.

*Primary Examiner* — Kenny H Truong
(74) *Attorney, Agent, or Firm* — Conley Rose, P.C.

(57) ABSTRACT

An active noise cancellation (ANC) method applied to a headset includes obtaining a first group of filtering parameters, and performing noise cancellation using the first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. $N_1$ is a positive integer greater than or equal to two.

17 Claims, 43 Drawing Sheets

(56) References Cited

U.S. PATENT DOCUMENTS

| | | | |
|---|---|---|---|
| 2010/0061564 | A1 | 3/2010 | Clemow et al. |
| 2013/0266150 | A1 | 10/2013 | Weil et al. |
| 2013/0287219 | A1 | 10/2013 | Hendrix et al. |
| 2014/0307887 | A1 | 10/2014 | Alderson |
| 2015/0023542 | A1 | 1/2015 | Shimizu |
| 2015/0243271 | A1 | 8/2015 | Goldstein |
| 2016/0119718 | A1 | 4/2016 | Yang et al. |
| 2016/0302000 | A1 | 10/2016 | Shin |
| 2016/0372102 | A1 | 12/2016 | Liu et al. |
| 2017/0099538 | A1 | 4/2017 | Kraft et al. |
| 2017/0200444 | A1 | 7/2017 | O'Connell et al. |
| 2017/0264728 | A1 | 9/2017 | Lu et al. |
| 2017/0270905 | A1 | 9/2017 | Asada |
| 2017/0345408 | A1 | 11/2017 | Hong et al. |
| 2018/0295449 | A1 | 10/2018 | Morgan et al. |
| 2022/0030349 | A1 | 1/2022 | Li et al. |
| 2022/0157291 | A1* | 5/2022 | McCutcheon ... G10K 11/17881 |
| 2022/0189449 | A1 | 6/2022 | Wang et al. |

FOREIGN PATENT DOCUMENTS

| | | | |
|---|---|---|---|
| CN | 104246870 | A | 12/2014 |
| CN | 105376668 | A | 3/2016 |
| CN | 105378828 | A | 3/2016 |
| CN | 106060689 | A | 10/2016 |
| CN | 106572411 | A | 4/2017 |
| CN | 106601225 | A | 4/2017 |
| CN | 106941637 | A | 7/2017 |
| CN | 107393545 | A | 11/2017 |
| CN | 107808657 | A | 3/2018 |
| CN | 107919132 | A | 4/2018 |
| CN | 108429955 | A | 8/2018 |
| CN | 108495227 | A | 9/2018 |
| CN | 108566600 | A | 9/2018 |
| CN | 108701449 | A | 10/2018 |
| CN | 108847209 | A | 11/2018 |
| CN | 109151635 | A | 1/2019 |
| CN | 109348362 | A | 2/2019 |
| CN | 110049413 | A | 7/2019 |
| CN | 110087159 | A | 8/2019 |
| CN | 110225429 | A | 9/2019 |
| CN | 110430520 | A | 11/2019 |
| CN | 209964254 | U | 1/2020 |
| CN | 110809211 | A | 2/2020 |
| CN | 210042133 | U | 2/2020 |
| CN | 110933554 | A | 3/2020 |
| CN | 110996215 | A | 4/2020 |
| CN | 111010646 | A | 4/2020 |
| CN | 111083591 | A | 4/2020 |
| CN | 111107461 | A | 5/2020 |
| CN | 111405421 | A | 7/2020 |
| CN | 111757219 | A | 10/2020 |
| CN | 111836147 | A | 10/2020 |
| CN | 112104936 | A | 12/2020 |
| CN | 212486779 | U | 2/2021 |
| CN | 212812019 | U | 3/2021 |
| CN | 113099367 | A | 7/2021 |
| EP | 4068804 | A1 | 10/2022 |
| JP | 2010016429 | A | 1/2010 |
| JP | 2016015585 | A | 1/2016 |
| JP | 2016519906 | A | 7/2016 |
| JP | 2016526862 | A | 9/2016 |
| JP | 2019144067 | A | 8/2019 |
| JP | 2019164357 | A | 9/2019 |
| KR | 101902122 | B1 | 11/2018 |

* cited by examiner

ACTIVE NOISE CANCELLATION METHOD AND APPARATUS

CROSS-REFERENCE TO RELATED APPLICATIONS

This is a continuation of International Patent Application No. PCT/CN2021/084775 filed on Mar. 31, 2021, which claims priority to Chinese Patent Application No. 202010407692.7 filed on May 14, 2020 and Chinese Patent Application No. 202011120314.7 filed on Oct. 19, 2020. All of the aforementioned patent applications are hereby incorporated by reference in their entireties.

TECHNICAL FIELD

Embodiments of this disclosure relate to the field of audio technologies, and in particular, to an active noise cancellation (ANC) method and apparatus.

BACKGROUND

Compared with an in-ear earphone, a semi-open earphone does not have a rubber cover at a sound outlet. Therefore, the semi-open earphone is comfortable to wear, has no stethoscope effect, and is suitable to wear for long time.

Because the semi-open earphone has no rubber cover, noise cannot be passively isolated. In addition, audio playing effect of the semi-open earphone varies greatly with different human ears and different wearing postures. Therefore, ANC is an important problem for the semi-open earphone.

SUMMARY

Embodiments of this disclosure provide an ANC method and apparatus, to improve noise cancellation effect of a headset.

To achieve the foregoing objectives, the following technical solutions are used in embodiments.

According to a first aspect, an embodiment provides an ANC method, applied to a headset having an ANC function. The method includes: When the headset is in an ANC working mode, the headset obtains a first group of filtering parameters. In addition, the headset performs noise cancellation by using the first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2.

It should be understood that the foregoing $N_1$ leakage states may represent $N_1$ ranges of fitness between the headset and a human ear, and may represent $N_1$ sealing degrees between the headset and the human ear. Any leakage state does not specifically refer to a specific wearing state of the headset, but is a typical or differentiated leakage scenario obtained by performing a large amount of statistics collection based on an impedance characteristic of the leakage state.

According to the ANC method provided in this embodiment, a group of filtering parameters (that is, the foregoing first group of filtering parameters) that matches a current leakage state (which may also be understood as a current wearing state) may be determined based on a leakage state formed by the headset and an ear canal environment of a user when the user wears the headset, and noise cancellation is performed on ambient sound based on the group of filtering parameters. This can meet a personalized noise cancellation requirement of the user, and improve noise cancellation effect.

In a possible implementation, the ANC method provided in this embodiment of this application further includes generating $N_2$ groups of filtering parameters based on at least the first group of filtering parameters and a second group of filtering parameters. The $N_2$ groups of filtering parameters respectively correspond to different ANC noise cancellation strengths. The second group of filtering parameters is one of the $N_1$ groups of filtering parameters prestored in the headset. The second group of filtering parameters is used to perform noise cancellation on ambient sound in a state with a minimum leakage degree in the $N_1$ leakage states. It should be understood that the $N_2$ groups of filtering parameters include the first group of filtering parameters and the second group of filtering parameters.

In a possible implementation, the ANC method provided in this embodiment further includes obtaining a target ANC noise cancellation strength, determining a third group of filtering parameters from the $N_2$ groups of filtering parameters based on the target ANC noise cancellation strength and performing noise cancellation by using the third group of filtering parameters.

In the ANC method provided in this embodiment, after the first group of filtering parameters is determined, the $N_2$ groups of filtering parameters adapted to a current user are generated based on the first group of filtering parameters and the second group of filtering parameters, and the third group of filtering parameters corresponding to the target ANC noise cancellation strength is further determined from the $N_2$ groups of filtering parameters, to perform noise cancellation by using the third group of filtering parameters. In this way, an appropriate ANC noise cancellation strength can be selected based on a status of ambient noise, so that noise cancellation effect better meets a user requirement.

In a possible implementation, the method for obtaining the first group of filtering parameters includes receiving first indication information from a terminal. The first indication information indicates the headset to perform noise cancellation by using the first group of filtering parameters.

In a possible implementation, the headset includes an error microphone. The method for obtaining the first group of filtering parameters includes collecting a first signal by using the error microphone of the headset, and obtaining a downlink signal of the headset, determining current frequency response curve information of a secondary path based on the first signal and the downlink signal, and determining, from preset frequency response curve information of $N_1$ secondary paths, target frequency response curve information matching the current frequency response curve information; and determining a group of filtering parameters corresponding to the target frequency response curve information as the first group of filtering parameters. The $N_1$ groups of filtering parameters correspond to the frequency response curve information of the $N_1$ secondary paths.

In a possible implementation, the headset includes an error microphone and a reference microphone. The method for obtaining the first group of filtering parameters includes collecting a first signal by using the error microphone of the headset, collecting a second signal by using the reference microphone of the headset, and obtaining a downlink signal of the headset, then determining a residual signal of the error microphone based on the first signal and the second signal, determining current frequency response curve information of a secondary path based on the residual signal of the error microphone and the downlink signal, determining from preset frequency response curve information of $N_1$ secondary paths, target frequency response curve information matching the current frequency response curve information, and further determining a group of filtering parameters corresponding to the target frequency response curve information as the first group of filtering parameters. The $N_1$ groups of filtering parameters correspond to the frequency response curve information of the $N_1$ secondary paths.

In a possible implementation, the headset includes an error microphone and a reference microphone. The method for obtaining the first group of filtering parameters includes collecting a first signal by using the error microphone of the headset, and collecting a second signal by using the reference microphone of the headset then determining current frequency response curve information of a primary path based on the first signal and the second signal determining, from preset frequency response curve information of $N_1$ primary paths, target frequency response curve information matching the current frequency response curve information, and determining a group of filtering parameters corresponding to the target frequency response curve information as the first group of filtering parameters. The $N_1$ groups of filtering parameters correspond to the frequency response curve information of the $N_1$ primary paths.

In a possible implementation, the headset includes an error microphone and a reference microphone. The method for obtaining the first group of filtering parameters includes collecting a first signal by using the error microphone of the headset, collecting a second signal by using the reference microphone of the headset, and obtaining a downlink signal of the headset, then determining current frequency response curve information of a primary path based on the first signal and the second signal, and determining current frequency response curve information of a secondary path based on the first signal and the downlink signal, determining current frequency response ratio curve information, where the current frequency response ratio curve information is a ratio of the current frequency response curve information of the primary path to the current frequency response curve information of the secondary path, then determining, from $N_1$ pieces of preset frequency response ratio curve information, target frequency response ratio curve information matching the current frequency response ratio curve information and further determining a group of filtering parameters corresponding to the target frequency response ratio curve information as the first group of filtering parameters. The $N_1$ groups of filtering parameters correspond to the $N_1$ pieces of frequency response ratio curve information.

In a possible implementation, the headset includes an error microphone and a reference microphone. The method for obtaining the first group of filtering parameters includes determining frequency response difference curve information that is of the error microphone and the reference microphone and that respectively corresponds to the $N_1$ groups of filtering parameters, determining, in $N_1$ pieces of frequency response difference curve information corresponding to the $N_1$ groups of filtering parameters, a frequency response difference curve that has a minimum amplitude and that corresponds to a target frequency band as a target frequency response difference curve, where the frequency response difference curve information of the error microphone and the reference microphone is a difference between frequency response curve information of the error microphone and frequency response curve information of the reference microphone and further determining a group of filtering parameters corresponding to the target frequency response difference curve information as the first group of filtering parameters.

In a possible implementation, the foregoing method for generating the $N_2$ groups of filtering parameters based on at least the first group of filtering parameters and the second group of filtering parameters includes performing interpolation on the first group of filtering parameters and the second group of filtering parameters to generate the $N_2$ groups of filtering parameters.

In a possible implementation, the method for obtaining the target ANC noise cancellation strength includes receiving second indication information from the terminal. The second indication information indicates the headset to perform noise cancellation by using the third group of filtering parameters corresponding to the target ANC noise cancellation strength.

In a possible implementation, the method for obtaining the target ANC noise cancellation strength includes determining the target ANC noise cancellation strength based on a status of current ambient noise. For example, when a current environment is quiet, the headset adaptively selects a low ANC noise cancellation strength based on a status of ambient noise, or when a current environment is noisy, the headset adaptively selects a high ANC noise cancellation strength based on a status of ambient noise.

In a possible implementation, before the obtaining a first group of filtering parameters, the ANC method provided in this embodiment further includes: receiving a first instruction, where the headset works in the ANC working mode, and the first instruction controls the headset to work in the ANC working mode, or detecting whether the headset is in an ear. When it is detected that the headset is in the ear, the headset works in the ANC working mode.

The ANC method provided in this embodiment of this disclosure is applied to a scenario in which the headset is in the ANC working mode. It can be learned that the headset being in the ANC working mode is a trigger condition for determining the first group of filtering parameters.

In an implementation, when the ANC function is enabled, the headset plays a prompt tone indicating that ANC is enabled, and determines the first group of filtering parameters in a process of playing an in-ear prompt tone, that is, uses the in-ear prompt tone as a test signal. The user determines the first group of filtering parameters based on subjective listening experience.

In another implementation, when it is detected that the headset is in the ear, the headset works in the ANC working mode, and the headset plays an in-ear prompt tone at the same time. The headset determines the first group of filtering parameters in a process of playing the in-ear prompt tone, that is, uses the in-ear prompt tone as a test signal. The user determines the first group of filtering parameters based on subjective listening experience.

In a possible implementation, the method for obtaining the first group of filtering parameters further includes receiving a second instruction when the headset is in the ANC working mode. The second instruction instructs the headset to obtain the first group of filtering parameters. The first group of filtering parameters is different from a filtering parameter used by the headset before receiving the second instruction.

In a case, after the first group of filtering parameters is determined, the headset performs noise cancellation based on the first group of filtering parameters. Subsequently, when the headset works, the user may further redetermine, based on an actual situation, a group of filtering parameters for noise cancellation. In this case, the second instruction may also be sent to instruct the headset to obtain the first group of filtering parameters.

In a possible implementation, after the obtaining a first group of filtering parameters and before the generating $N_2$ groups of filtering parameters based on at least the first group of filtering parameters and a second group of filtering parameters, the ANC method provided in this embodiment further includes: receiving a third instruction. The third instruction triggers the headset to generate the $N_2$ groups of filtering parameters.

In an example, after the $N_2$ groups of filtering parameters are generated based on the first group of filtering parameters and the second group of filtering parameters, the third group of filtering parameters is determined from the $N_2$ groups of filtering parameters. The headset performs noise cancellation based on the third group of filtering parameters. Subsequently, when the headset works, the user may further redetermine, based on an actual requirement, a group of filtering parameters for noise cancellation, that is, the headset re-obtains the first group of filtering parameters. Further, the headset restores the $N_2$ groups of filtering parameters in the headset to the $N_1$ groups of filtering parameters, further redetermines a first group of filtering parameters from the $N_1$ groups of filtering parameters, and performs noise cancellation by using the re-obtained first group of filtering parameters. Further, optionally, $N_2$ groups of new filtering parameters may also be generated based on the re-obtained first group of filtering parameters and the second group of filtering parameters, a third group of filtering parameters is determined from the $N_2$ groups of filtering parameters, and noise cancellation is performed by using the third group of filtering parameters.

In a possible implementation, the $N_1$ groups of filtering parameters are determined based on a recording signal in a secondary path SP mode and a recording signal in a primary path PP mode. The recording signal in the SP mode includes a downlink signal, a signal of a tympanic microphone, and a signal of the error microphone of the headset. The recording signal in the PP mode includes a signal of a tympanic microphone, a signal of the error microphone of the headset, and a signal of the reference microphone of the headset.

In a possible implementation, the ANC method provided in this embodiment further includes detecting whether abnormal noise exists, where the abnormal noise includes at least one of the following, howling noise, clipping noise, or noise floor. and when it is detected that the abnormal noise exists, updating a filtering parameter, where the filtering parameter includes the first group of filtering parameters or the third group of filtering parameters, collecting sound signals by using the reference microphone and the error microphone of the headset and processing, based on an updated filtering parameter, the sound signal collected by the reference microphone and the sound signal collected by the error microphone, to generate an anti-noise signal.

In this embodiment, the anti-noise signal is used to weaken an intra-ear noise signal of the user, and the intra-ear noise signal may be understood as residual noise obtained after the ambient noise is isolated by the headset after the user wears the headset. A residual noise signal is related to external ambient noise, the headset, fit between the headset and an ear canal, and other factors. After the headset generates the anti-noise signal, the headset plays the anti-noise signal. A phase of the anti-noise signal is opposite to that of the intra-ear noise signal of the user. In this way, the anti-noise signal can weaken the intra-ear noise signal of the user, thereby reducing abnormal intra-ear noise.

According to the ANC method provided in this embodiment, because the headset can detect the abnormal noise, and perform noise cancellation processing on the abnormal noise, interference of the abnormal noise is reduced, stability of the headset is improved, and listening experience of the user can be improved.

In a possible implementation, the headset includes a semi-open ANC earphone.

According to a second aspect, an embodiment provides an ANC method applied to a terminal that establishes a communication connection to a headset. The headset is in an ANC working mode. The method includes determining a first group of filtering parameters and sending first indication information to the headset. The first indication information indicates the headset to perform noise cancellation by using the first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2.

According to the ANC method provided in this embodiment, a group of filtering parameters (that is, the first group of filtering parameters) that matches a current leakage state may be determined based on a leakage state formed by the headset and an ear canal environment of a user when the user wears the headset, and noise cancellation is performed on ambient sound based on the group of filtering parameters. This can meet a personalized noise cancellation requirement of the user, and improve noise cancellation effect.

In a possible implementation, the method for determining the first group of filtering parameters includes receiving a first signal collected by an error microphone of the headset, and obtaining a downlink signal of the headset then determining current frequency response curve information of a secondary path based on the first signal and the downlink signal, determining from preset frequency response curve information of $N_1$ secondary paths, target frequency response curve information matching the current frequency response curve information, and determining a group of filtering parameters corresponding to the target frequency response curve information as the first group of filtering parameters. The $N_1$ groups of filtering parameters correspond to the frequency response curve information of the $N_1$ secondary paths.

In a possible implementation, the method for determining the first group of filtering parameters includes receiving a first signal collected by an error microphone of the headset and a second signal collected by a reference microphone of the headset, and obtaining a downlink signal of the headset, then determining a residual signal of the error microphone based on the first signal and the second signal determining current frequency response curve information of a secondary path based on the residual signal of the error microphone and the downlink signal, then determining from preset frequency response curve information of $N_1$ secondary paths, target frequency response curve information matching the current frequency response curve information, and further determining filtering parameters corresponding to the target frequency response curve information as the first group of filtering parameters. The $N_1$ groups of filtering parameters correspond to the frequency response curve information of the $N_1$ secondary paths.

In a possible implementation, the method for determining the first group of filtering parameters includes receiving a first signal collected by an error microphone of the headset and a second signal collected by a reference microphone of the headset, determining current frequency response curve information of a primary path based on the first signal and the second signal, determining from preset frequency response curve information of $N_1$ primary paths, target frequency response curve information matching the current frequency response curve information and determining filtering parameters corresponding to the target frequency response curve information as the first group of filtering parameters. The $N_1$ groups of filtering parameters correspond to the frequency response curve information of the $N_1$ primary paths.

In a possible implementation, the method for determining the first group of filtering parameters includes receiving a first signal collected by an error microphone of the headset and a second signal collected by a reference microphone of the headset, and obtaining a downlink signal of the headset, determining current frequency response curve information of a primary path based on the first signal and the second signal, determining current frequency response curve information of a secondary path based on the first signal and the downlink signal, and determining current frequency response ratio curve information, where the current frequency response ratio curve information is a ratio of the current frequency response curve information of the primary path to the current frequency response curve information of the secondary path, then determining, from $N_1$ pieces of preset frequency response ratio curve information, target frequency response ratio curve information matching the current frequency response ratio curve information, and further determining filtering parameters corresponding to the target frequency response ratio curve information as the first group of filtering parameters. The $N_1$ groups of filtering parameters correspond to the $N_1$ pieces of frequency response ratio curve information.

In a possible implementation, the method for determining the first group of filtering parameters includes determining frequency response difference curve information of an error microphone and a reference microphone and that respectively corresponds to the $N_1$ groups of filtering parameters, then determining in $N_1$ pieces of frequency response difference curve information corresponding to the $N_1$ groups of filtering parameters, a frequency response difference curve that has a minimum amplitude and that corresponds to a target frequency band as a target frequency response difference curve, where the frequency response difference curve information of the error microphone and the reference microphone is a difference between frequency response curve information of the error microphone and frequency response curve information of the reference microphone, and further determining filtering parameters corresponding to the target frequency response difference curve information as the first group of filtering parameters.

In a possible implementation, before the determining a first group of filtering parameters, the ANC method provided in this embodiment further includes receiving an operation for a first option on a first interface of the terminal, where the first interface is an interface for setting a working mode of the headset, and sending a first instruction to the headset in response to the operation for the first option. The first instruction controls the headset to work in the ANC working mode.

In a possible implementation, after the receiving an operation for a first option on a first interface of the terminal, the ANC method provided in this embodiment further includes displaying an ANC control list. The ANC control list includes at least one of the following options, a first control option, a second control option, or a third control option. The first control option is used to trigger determining of the first group of filtering parameters. The second control option is used to trigger generation of $N_2$ groups of filtering parameters. The third control option is used to trigger redetermining of the first group of filtering parameters.

In a possible implementation, the method for determining the first group of filtering parameters includes receiving an operation for the first control option in the ANC control list, and displaying a first control, where the first control includes $N_1$ preset locations, and the $N_1$ preset locations correspond to the $N_1$ groups of filtering parameters, receiving an operation for a first location in the first control, where the first location is one of the $N_1$ preset locations, and noise cancellation effect obtained when a group of filtering parameters corresponding to the first location is applied to the headset is better than noise cancellation effect obtained when a filtering parameter corresponding to another location in the $N_1$ preset locations is applied to the headset, and in response to the operation for the first location, determining the group of filtering parameters corresponding to the first location as the first group of filtering parameters.

In a possible implementation, the ANC method provided in this embodiment further includes receiving an operation for the third control option in the ANC control list, and redetermining the first group of filtering parameters in response to the operation for the third control option.

In a possible implementation, the ANC method provided in this embodiment further includes receiving an operation for the third control option in the ANC control list, and sending a second instruction to the headset in response to the operation for the third control option. The second instruction instructs the headset to obtain the first group of filtering parameters. The first group of filtering parameters is different from a filtering parameter used by the headset before receiving the second instruction.

In a possible implementation, the ANC method provided in this embodiment further includes receiving an operation for the second control option in the ANC control list, and sending a third instruction to the headset in response to the operation for the second control option. The third instruction triggers the headset to generate the $N_2$ groups of filtering parameters. The $N_2$ groups of filtering parameters are generated based on the first group of filtering parameters and a second group of filtering parameters. The second group of filtering parameters is one of the $N_1$ groups of filtering parameters. The second group of filtering parameters is used to perform noise cancellation on ambient sound in a state with a minimum leakage degree in the $N_1$ leakage states.

In a possible implementation, after the receiving an operation for the second control option in the ANC control list, the ANC method provided in this embodiment further includes displaying a second control, where the second control includes $N_2$ preset locations, the $N_2$ preset locations correspond to $N_2$ ANC noise cancellation strengths, and the $N_2$ ANC noise cancellation strengths correspond to the $N_2$ groups of filtering parameters, receiving an operation for a second location in the second control, where the second location is one of the $N_2$ preset locations, and noise cancellation effect obtained when a filtering parameter corresponding to an ANC noise cancellation strength at the second location is applied to the headset is better than noise cancellation effect obtained when a filtering parameter corresponding to an ANC noise cancellation strength at another location in the $N_2$ preset locations is applied to the headset, in response to the operation for the second location, determining the ANC noise cancellation strength corresponding to the second location as a target ANC noise cancellation strength, and further sending second indication information to the headset. The second indication information indicates the headset to perform noise cancellation by using a third group of filtering parameters corresponding to the target ANC noise cancellation strength.

According to a third aspect, an embodiment provides a headset. The headset has an ANC function. The headset includes an obtaining module and a processing module. The obtaining module is configured to obtain a first group of filtering parameters when the headset is in an ANC working mode. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2. The processing module is configured to perform noise cancellation by using the first group of filtering parameters.

In a possible implementation, the headset provided in this embodiment further includes a generation module. The generation module is configured to generate $N_2$ groups of filtering parameters based on at least the first group of filtering parameters and a second group of filtering parameters. The $N_2$ groups of filtering parameters respectively correspond to different ANC noise cancellation strengths. The second group of filtering parameters is one of the $N_1$ groups of filtering parameters prestored in the headset. The second group of filtering parameters is used to perform noise cancellation on ambient sound in a state with a minimum leakage degree in the $N_1$ leakage states.

In a possible implementation, the headset provided in this embodiment further includes a determining module. The obtaining module is further configured to obtain a target ANC noise cancellation strength. The determining module is configured to determine, based on the target ANC noise cancellation strength, a third group of filtering parameters from the $N_2$ groups of filtering parameters. The processing module is further configured to perform noise cancellation by using the third group of filtering parameters.

In a possible implementation, the headset provided in this embodiment further includes a receiving module. The receiving module is configured to receive first indication information from the terminal. The first indication information indicates the headset to perform noise cancellation by using the first group of filtering parameters.

In a possible implementation, the headset provided in this embodiment further includes a first signal collection module. The first signal collection module is configured to collect a first signal by using an error microphone of the headset. The obtaining module is further configured to obtain a downlink signal of the headset. The determining module is further configured to determine current frequency response curve information of a secondary path based on the first signal and the downlink signal, determine from preset frequency response curve information of $N_1$ secondary paths, target frequency response curve information matching the current frequency response curve information, and determine a group of filtering parameters corresponding to the target frequency response curve information as the first group of filtering parameters. The $N_1$ groups of filtering parameters correspond to the frequency response curve information of the $N_1$ secondary paths.

In a possible implementation, the headset provided in this embodiment further includes a first signal collection module and a second signal collection module. The first signal collection module is configured to collect a first signal by using an error microphone of the headset. The second signal collection module is configured to collect a second signal by using a reference microphone of the headset. The obtaining module is further configured to obtain a downlink signal of the headset. The determining module is further configured to determine a residual signal of the error microphone based on the first signal and the second signal, determine current frequency response curve information of a secondary path based on the residual signal of the error microphone and the downlink signal, and determine, from preset frequency response curve information of $N_1$ secondary paths, target frequency response curve information matching the current frequency response curve information, and determine a group of filtering parameters corresponding to the target frequency response curve information as the first group of filtering parameters. The $N_1$ groups of filtering parameters correspond to the frequency response curve information of the $N_1$ secondary paths.

In a possible implementation, the headset provided in this embodiment further includes a first signal collection module and a second signal collection module. The first signal collection module is configured to collect a first signal by using an error microphone of the headset. The second signal collection module is configured to collect a second signal by using a reference microphone of the headset. The determining module is further configured to determine current frequency response curve information of a primary path based on the first signal and the second signal, determine from preset frequency response curve information of $N_1$ primary paths, target frequency response curve information matching the current frequency response curve information, and determine a group of filtering parameters corresponding to the target frequency response curve information as the first group of filtering parameters. The $N_1$ groups of filtering parameters correspond to the frequency response curve information of the $N_1$ primary paths.

In a possible implementation, the headset provided in this embodiment further includes a first signal collection module and a second signal collection module. The first signal collection module is configured to collect a first signal by using an error microphone of the headset. The second signal collection module is configured to collect a second signal by using a reference microphone of the headset. The obtaining module is further configured to obtain a downlink signal of the headset. The determining module is further configured to determine current frequency response curve information of a primary path based on the first signal and the second signal, determine current frequency response curve information of a secondary path based on the first signal and the downlink signal, determine current frequency response ratio curve information, where the current frequency response ratio curve information is a ratio of the current frequency response curve information of the primary path to the current frequency response curve information of the secondary path, further determine, from $N_1$ pieces of preset frequency response ratio curve information, target frequency response ratio curve information matching the current frequency response ratio curve information, and determine a group of filtering parameters corresponding to the target frequency response ratio curve information as the first group of filtering parameters. The $N_1$ groups of filtering parameters correspond to the $N_1$ pieces of frequency response ratio curve information.

In a possible implementation, the determining module is further configured to determine frequency response difference curve information that is of an error microphone and a reference microphone and that respectively corresponds to the $N_1$ groups of filtering parameters, determine in $N_1$ pieces of frequency response difference curve information corresponding to the $N_1$ groups of filtering parameters, a frequency response difference curve that has a minimum amplitude and that corresponds to a target frequency band as a target frequency response difference curve, where the frequency response difference curve information of the error microphone and the reference microphone is a difference between frequency response curve information of the error microphone and frequency response curve information of the reference microphone, and determine a group of filtering parameters corresponding to the target frequency response difference curve information as the first group of filtering parameters.

In a possible implementation, the generation module is further configured to perform interpolation on the first group of filtering parameters and the second group of filtering parameters to generate the $N_2$ groups of filtering parameters.

In a possible implementation, the receiving module is further configured to receive second indication information from the terminal. The second indication information indicates the headset to perform noise cancellation by using the third group of filtering parameters corresponding to the target ANC noise cancellation strength.

In a possible implementation, the determining module is further configured to determine the target ANC noise cancellation strength based on a status of current ambient noise.

In a possible implementation, the headset provided in this embodiment further includes a detection module. The receiving module is further configured to receive a first instruction. The headset works in the ANC working mode. The first instruction controls the headset to work in the ANC working mode. The detection module is configured to detect whether the headset is in an ear. When the detection module detects that the headset is in the ear, the headset works in the ANC working mode.

In a possible implementation, the receiving module is further configured to receive a second instruction when the headset is in the ANC working mode. The second instruction instructs the headset to obtain the first group of filtering parameters. The first group of filtering parameters is different from a filtering parameter used by the headset before receiving the second instruction.

In a possible implementation, the receiving module is further configured to receive a third instruction. The third instruction triggers the headset to generate the $N_2$ groups of filtering parameters.

In a possible implementation, the $N_1$ groups of filtering parameters are determined based on a recording signal in a secondary path (SP) mode and a recording signal in a primary path (PP) mode. The recording signal in the SP mode includes a downlink signal, a signal of a tympanic microphone, and a signal of the error microphone of the headset. The recording signal in the PP mode includes a signal of a tympanic microphone, a signal of the error microphone of the headset, and a signal of the reference microphone of the headset.

In a possible implementation, the headset provided in this embodiment further includes an updating module. The detection module is further configured to detect whether abnormal noise exists. The abnormal noise includes at least one of the following; howling noise, clipping noise, or noise floor. The updating module is configured to when the detection module detects that the abnormal noise exists, update a filtering parameter. The filtering parameter includes the first group of filtering parameters or the third group of filtering parameters. The first signal collection module is further configured to collect a sound signal by using the reference microphone of the headset. The second signal collection module is further configured to collect a sound signal by using the error microphone of the headset. The processing module is further configured to process, based on an updated filtering parameter, the sound signal collected by the reference microphone and the sound signal collected by the error microphone, to generate an anti-noise signal.

According to a fourth aspect, an embodiment provides a terminal. The terminal establishes a communication connection to a headset. The headset is in an ANC working mode. The terminal includes a determining module and a sending module. The determining module is configured to determine a first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2. The sending module is configured to send first indication information to the headset. The first indication information indicates the headset to perform noise cancellation by using the first group of filtering parameters.

In a possible implementation, the terminal provided in this embodiment further includes a receiving module and an obtaining module. The receiving module is configured to receive a first signal collected by an error microphone of the headset. The obtaining module is configured to obtain a downlink signal of the headset. The determining module is further configured to determine current frequency response curve information of a secondary path based on the first signal and the downlink signal, determine, from preset frequency response curve information of $N_1$ secondary paths, target frequency response curve information matching the current frequency response curve information, and determine a group of filtering parameters corresponding to the target frequency response curve information as the first group of filtering parameters. The $N_1$ groups of filtering parameters correspond to the frequency response curve information of the $N_1$ secondary paths.

In a possible implementation, the terminal provided in this embodiment further includes a receiving module and an obtaining module. The receiving module is configured to receive a first signal collected by an error microphone of the headset and a second signal collected by a reference microphone of the headset. The obtaining module is configured to obtain a downlink signal of the headset. The determining module is further configured to determine a residual signal of the error microphone based on the first signal and the second signal, determine current frequency response curve information of a secondary path based on the residual signal of the error microphone and the downlink signal, determine from preset frequency response curve information of $N_1$ secondary paths, target frequency response curve information matching the current frequency response curve information, and determine filtering parameters corresponding to the target frequency response curve information as the first group of filtering parameters. The $N_1$ groups of filtering parameters correspond to the frequency response curve information of the $N_1$ secondary paths.

In a possible implementation, the terminal provided in this embodiment further includes a receiving module. The receiving module is configured to receive a first signal collected by an error microphone of the headset and a second signal collected by a reference microphone of the headset. The determining module is further configured to determine current frequency response curve information of a primary path based on the first signal and the second signal, determine from preset frequency response curve information of $N_1$ primary paths, target frequency response curve information matching the current frequency response curve information, and determine filtering parameters corresponding to the target frequency response curve information as the first group of filtering parameters. The $N_1$ groups of filtering parameters correspond to the frequency response curve information of the $N_1$ primary paths.

In a possible implementation, the terminal provided in this embodiment further includes a receiving module and an obtaining module. The receiving module is configured to receive a first signal collected by an error microphone of the headset and a second signal collected by a reference microphone of the headset. The obtaining module is configured to obtain a downlink signal of the headset. The determining module is further configured to determine current frequency response curve information of a primary path based on the first signal and the second signal, determine current frequency response curve information of a secondary path based on the first signal and the downlink signal, determine current frequency response ratio curve information, where the current frequency response ratio curve information is a ratio of the current frequency response curve information of the primary path to the current frequency response curve information of the secondary path, further determine, from $N_1$ pieces of preset frequency response ratio curve information, target frequency response ratio curve information matching the current frequency response ratio curve information, and determine filtering parameters corresponding to the target frequency response ratio curve information as the first group of filtering parameters. The $N_1$ groups of filtering parameters correspond to the $N_1$ pieces of frequency response ratio curve information.

In a possible implementation, the determining module is further configured to determine frequency response difference curve information of an error microphone and a reference microphone and that respectively corresponds to the $N_1$ groups of filtering parameters, determine in $N_1$ pieces of frequency response difference curve information corresponding to the $N_1$ groups of filtering parameters, a frequency response difference curve that has a minimum amplitude and that corresponds to a target frequency band as a target frequency response difference curve, where the frequency response difference curve information of the error microphone and the reference microphone is a difference between frequency response curve information of the error microphone and frequency response curve information of the reference microphone, and determine filtering parameters corresponding to the target frequency response difference curve information as the first group of filtering parameters.

In a possible implementation, the receiving module is further configured to receive an operation for a first option on a first interface of the terminal. The first interface is an interface for setting a working mode of the headset. The sending module is further configured to send a first instruction to the headset in response to the operation for the first option. The first instruction controls the headset to work in the ANC working mode.

In a possible implementation, the terminal provided in this embodiment further includes a display module. The display module is configured to display an ANC control list. The ANC control list includes at least one of the following options, a first control option, a second control option, or a third control option. The first control option is used to trigger determining of the first group of filtering parameters. The second control option is used to trigger generation of the $N_2$ groups of filtering parameters. The third control option is used to trigger redetermining of the first group of filtering parameters.

In a possible implementation, the receiving module is further configured to receive an operation for the first control option in the ANC control list. The display module is further configured to display a first control. The first control includes $N_1$ preset locations. The $N_1$ preset locations correspond to the $N_1$ groups of filtering parameters. The receiving module is further configured to receive an operation for a first location in the first control. The first location is one of the $N_1$ preset locations, and noise cancellation effect obtained when a group of filtering parameters corresponding to the first location is applied to the headset is better than noise cancellation effect obtained when a filtering parameter corresponding to another location in the $N_1$ preset locations is applied to the headset. The determining module is further configured to determine, in response to the operation for the first location, the group of filtering parameters corresponding to the first location as the first group of filtering parameters.

In a possible implementation, the receiving module is further configured to receive an operation for the third control option in the ANC control list. The determining module is further configured to redetermine the first group of filtering parameters in response to the operation for the third control option.

In a possible implementation, the receiving module is further configured to receive an operation for the third control option in the ANC control list. The sending module is further configured to send a second instruction to the headset in response to the operation for the third control option. The second instruction instructs the headset to obtain the first group of filtering parameters. The first group of filtering parameters is different from a filtering parameter used by the headset before receiving the second instruction.

In a possible implementation, the receiving module is further configured to receive an operation for the second control option in the ANC control list. The sending module is further configured to send a third instruction to the headset in response to the operation for the second control option. The third instruction triggers the headset to generate the $N_2$ groups of filtering parameters. The $N_2$ groups of filtering parameters are generated based on the first group of filtering parameters and a second group of filtering parameters. The second group of filtering parameters is one of the $N_1$ groups of filtering parameters. The second group of filtering parameters is used to perform noise cancellation on ambient sound in a state with a minimum leakage degree in the $N_1$ leakage states.

In a possible implementation, the display module is further configured to display a second control. The second control includes $N_2$ preset locations. The $N_2$ preset locations correspond to $N_2$ ANC noise cancellation strengths. The $N_2$ ANC noise cancellation strengths correspond to the $N_2$ groups of filtering parameters. The receiving module is further configured to receive an operation for a second location in the second control. The second location is one of the $N_2$ preset locations, and noise cancellation effect obtained when a filtering parameter corresponding to an ANC noise cancellation strength at the second location is applied to the headset is better than noise cancellation effect obtained when a filtering parameter corresponding to an ANC noise cancellation strength at another location in the $N_2$ preset locations is applied to the headset. The determining module is further configured to determine, in response to the operation for the second location, the ANC noise cancellation strength corresponding to the second location as a target ANC noise cancellation strength. The sending module is further configured to send second indication information to the headset. The second indication information indicates the headset to perform noise cancellation by using a third group of filtering parameters corresponding to the target ANC noise cancellation strength.

According to a fifth aspect, an embodiment provides a headset, including a memory and at least one processor connected to the memory. The memory is configured to store instructions, and after the instructions are read by the at least one processor, the method in any one of the first aspect and the possible implementations of the first aspect is performed.

According to a sixth aspect, an embodiment provides a computer-readable storage medium, including a computer program. When the computer program runs on a computer, the method in any one of the first aspect and the possible implementations of the first aspect is performed.

According to a seventh aspect, an embodiment provides a computer program product including instructions. When the computer program product runs on a computer, the computer is enabled to perform the method in any one of the first aspect and the possible implementations of the first aspect.

According to an eighth aspect, an embodiment further provides a chip, including a memory and a processor. The memory is configured to store computer instructions. The processor is configured to invoke the computer instructions from the memory and run the computer instructions, to perform the method in any one of the first aspect and the possible implementations of the first aspect.

According to a ninth aspect, an embodiment provides a terminal, including a memory and at least one processor connected to the memory. The memory is configured to store instructions, and after the instructions are read by the at least one processor, the method in any one of the second aspect and the possible implementations of the second aspect is performed.

According to a tenth aspect, an embodiment provides a computer-readable storage medium, including a computer program. When the computer program runs on a computer, the method in any one of the second aspect and the possible implementations of the second aspect is performed.

According to an eleventh aspect, an embodiment provides a computer program product including instructions. When the computer program product runs on a computer, the computer is enabled to perform the method in any one of the second aspect and the possible implementations of the second aspect.

According to a twelfth aspect, an embodiment provides a chip, including a memory and a processor. The memory is configured to store computer instructions. The processor is configured to invoke the computer instructions from the memory and run the computer instructions, to perform the method in any one of the second aspect and the possible implementations of the second aspect.

It should be understood that, for beneficial effects achieved by the technical solutions in the second aspect to the twelfth aspect and the corresponding possible implementations in embodiments, refer to the foregoing technical effects in the first aspect, the second aspect and the corresponding possible implementations thereof. Details are not described herein again.

According to a thirteenth aspect, an embodiment provides an ANC method, applied to a headset having an ANC function. The method includes, when the headset is in an ANC working mode, detecting whether a leakage state between the headset and an ear canal changes, and when it is detected that the leakage state between the headset and the ear canal changes, updating a filtering parameter of the headset from a first group of filtering parameters to a second group of filtering parameters, and performing noise cancellation by using the second group of filtering parameters. The first group of filtering parameters and the second group of filtering parameters are respectively two different groups of filtering parameters in N groups of filtering parameters prestored in the headset. The N groups of filtering parameters are respectively used to perform noise cancellation on ambient sound in N leakage states. In a current wearing state of the headset, for same ambient noise, noise cancellation effect obtained when the second group of filtering parameters is applied to the headset is better than noise cancellation effect obtained when another filtering parameter in the N groups of filtering parameters is applied to the headset.

According to the ANC method provided in this embodiment, after the ANC function of the headset is enabled, in a process in which a user uses the headset, the filtering parameter of the headset may be adaptively updated based on a change in the leakage state between the headset and the ear canal, and noise cancellation is performed based on the updated filtering parameter. This can improve noise cancellation effect.

In a possible implementation, when a sealing degree between the headset and a human ear changes, and noise cancellation effect obtained when the first group of filtering parameters is applied to the headset deteriorates, the leakage state between the headset and the ear canal changes. It should be understood that the leakage state between the headset and the ear canal reflects the sealing degree between the headset and the human ear.

In this embodiment, the leakage states are formed by the headset and different ear canal environments. The ear canal environment is related to an ear canal feature of the user and a posture of wearing the headset by the user. Combinations of different ear canal features and different postures of wearing the headset may form a plurality of ear canal environments, and also correspond to a plurality of leaking states.

It should be understood that the foregoing N leakage states may represent N ranges of fitness between the headset and the human ear, and may represent N sealing degrees between the headset and the human ear. A smaller leakage degree indicates a high sealing degree between the headset and the ear canal of the user, and a sound is less likely to leak. Any leakage state does not further refer to a specific wearing state of the headset, but is a typical or differentiated leakage scenario obtained by performing a large amount of statistics collection based on an impedance characteristic of the leakage state.

A wearing state of the headset corresponds to an ear canal environment, to form a leakage state. The wearing state of the headset varies with the ear canal feature of the user and a change in the posture of wearing the headset by the user. The current wearing state of the headset corresponds to a stable ear canal environment, that is, corresponds to a stable ear canal feature and wearing posture. Noise cancellation effect obtained when the foregoing N groups of filtering parameters are applied to the headset varies with the wearing state of the headset.

In a possible implementation, in a case in which the headset has no downlink signal, the method for detecting whether the leakage state between the headset and the ear canal changes may include collecting a first signal by using an error microphone of the headset, and collecting a second signal by using a reference microphone of the headset, calculating a long-term energy ratio frame by frame based on the first signal and the second signal, when a long-term energy ratio of a current frame increases and a difference between the long-term energy ratio of the current frame and a long-term energy ratio of a historical frame is greater than a first threshold, determining that the leakage state between the earphone and the ear canal changes, and otherwise, determining that the leakage state between the earphone and the ear canal does not change.

It should be understood that a long-term energy ratio of an audio frame is an indicator reflecting noise cancellation effect. A larger long-term energy ratio indicates worse noise cancellation effect, and a smaller long-term energy ratio indicates better noise cancellation effect. In this embodiment, when an increase of the long-term energy ratio of the current frame exceeds a specific threshold (for example, the foregoing first threshold), it is determined that the sealing degree between the headset and the human ear changes, and the noise cancellation effect obtained when the first group of filtering parameters is applied to the headset deteriorates. Therefore, it is determined that the leakage state between the headset and the ear canal changes.

In a possible implementation, the N leakage states sequentially corresponding to the N groups of filtering parameters prestored in the headset indicate that the sealing degree between the headset and the human ear changes from high to low. The foregoing method for updating the filtering parameters of the headset from the first group of filtering parameters to the second group of filtering parameters may include updating the filtering parameters of the headset from the first group of filtering parameters to a third group of filtering parameters, where an index of the first group of filtering parameters in the N groups of prestored filtering parameters is n, and an index of the third group of filtering parameters is n−1, determining the long-term energy ratio of the current frame when the headset performs noise cancellation by using the third group of filtering parameters, and if the long-term energy ratio of the current frame decreases when the headset performs noise cancellation by using the third group of filtering parameters, decreasing indexes of the filtering parameters one by one by using the index of the third group of filtering parameters as a starting point until the difference between the long-term energy ratio of the current frame and the long-term energy ratio of the historical frame is less than a second threshold when the headset performs noise cancellation by using a group of filtering parameters corresponding to the current index, where the group of filtering parameters corresponding to the current index is the second group of filtering parameters. When the long-term energy ratio of the current frame increases when the headset performs noise cancellation using the third group of filtering parameters, updating the filtering parameters of the headset from the third group of filtering parameters to a fourth group of filtering parameters, where an index of the fourth group of filtering parameters is n+1, determining the long-term energy ratio of the current frame when the headset performs noise cancellation by using the fourth group of filtering parameters, and when the long-term energy ratio of the current frame decreases, increasing indexes of the filtering parameters one by one by using the index of the fourth group of filtering parameters as a starting point until the difference between the long-term energy ratio of the current frame and the long-term energy ratio of the historical frame is less than the second threshold when the headset performs noise cancellation by using a group of filtering parameters corresponding to the current index, where the group of filtering parameters corresponding to the current index is the second group of filtering parameters.

In this embodiment, when it is detected that the leakage state between the headset and the ear canal changes, the filtering parameter may be first updated in a manner of decreasing the index of the filtering parameter, and the index of the filtering parameter is adjusted from n to n−1, to determine noise cancellation effect obtained when the headset performs noise cancellation by using the filtering parameters whose index is n−1. when the noise cancellation effect obtained when the headset performs noise cancellation by using the filtering parameters whose index is n−1 becomes better, it indicates that the manner of decreasing the index of the filtering parameters is feasible, to determine whether to continue to decrease the index of the filtering parameters. When the noise cancellation effect obtained when the headset performs noise cancellation by using the filtering parameters whose index is n−1 deteriorates, it indicates that the manner of decreasing the index of the filtering parameters is not feasible. In this case, the index of the filtering parameters is increased to n+1, and noise cancellation is performed by using the filtering parameters whose index is n+1. If the noise cancellation effect becomes better, it indicates that the manner of increasing the index of the filtering parameters is feasible, to determine whether to continue to increase the index of the filtering parameters until the difference between the long-term energy ratio of the current frame and the long-term energy ratio of the historical frame is less than the second threshold when the headset performs noise cancellation by using a filtering parameter corresponding to an index.

In a possible implementation, the N leakage states sequentially corresponding to the N groups of filtering parameters prestored in the headset indicate that the sealing degree between the headset and the human ear changes from high to low. In a case in which the headset has no downlink signal, the foregoing method for detecting whether the leakage state between the headset and the ear canal changes may include collecting a first signal by using an error microphone of the headset, collecting a second signal by using a reference microphone of the headset, and obtaining an anti-noise signal played by a speaker of the headset determining current frequency response curve information of a secondary path based on the first signal, the second signal, and the anti-noise signal determining from N groups of frequency response curve information of the secondary path that correspond to the N groups of prestored filtering parameters, target frequency response curve information matching the current frequency response curve information of the secondary path, where an index of the first group of filtering parameters in the N groups of prestored filtering parameters is n, and an index of a group of filtering parameters corresponding to the target frequency response curve information is x. When the index x of the group of filtering parameters corresponding to the target frequency response curve information and the index n of the first group of filtering parameters satisfy $|n-x| \geq 2$, determining that the leakage state between the headset and the ear canal changes; otherwise, determining that the leakage state between the headset and the ear canal does not change.

In this embodiment, when the index x of the group of filtering parameters corresponding to the target frequency response curve information of the secondary path and the index n of the first group of filtering parameters satisfy $|n-x| \geq 2$, it indicates that there is a large deviation between the current frequency response curve information of the secondary path and historical frequency response curve information of the secondary path, that is, it indicates that the noise cancellation effect obtained when the first group of filtering parameters is used to perform noise cancellation deteriorates. In this case, it is determined that the leakage state between the headset and the ear canal changes. When the index x of the group of filtering parameters corresponding to the target frequency response curve information and the index n of the first group of filtering parameters satisfy $|n-x|<2$, it indicates that there is a small deviation between the current frequency response curve information of the secondary path and historical frequency response curve information of the secondary path, that is, it indicates that the noise cancellation effect obtained when the first group of filtering parameters is used to perform noise cancellation does not change. In this case, it is determined that the leakage state between the headset and the ear canal does not change.

In a possible implementation, the method for determining the current frequency response curve information of the secondary path based on the first signal, the second signal, and the anti-noise signal includes: calculating a residual signal of the error microphone of the headset based on the first signal and the second signal; and then performing adaptive filtering on the residual signal of the error microphone by using the anti-noise signal as a reference signal, to obtain the current frequency response curve information of the secondary path. In this embodiment, adaptive filtering is performed on the residual signal of the error microphone by using a Kalman filter and a normalized least mean square (NLMS) filter and by using the anti-noise signal as the reference signal, and an amplitude of a converged filter is calculated, to obtain the current frequency response curve information of the secondary path.

In a possible implementation, the ANC method provided in this embodiment further includes: collecting a third signal by using an external microphone of the headset, where the external microphone of the headset may include a talk microphone or the reference microphone; and determining whether energy of the third signal is greater than a second preset energy threshold. If the energy of the third signal is greater than the preset threshold, it indicates that the environment is noisy. Otherwise, the environment is quiet.

In a possible implementation, the foregoing method for updating the filtering parameters of the headset from the first group of filtering parameters to the second group of filtering parameters may include: when the energy of the third signal is greater than the second preset energy threshold or energy of the second signal is greater than a third preset energy threshold, updating the filtering parameters of the headset from the first group of filtering parameters to the second group of filtering parameters.

In this embodiment, the foregoing method for determining the frequency response curve information of the secondary path based on the first signal, the second signal, and the anti-noise signal, to detect whether the leakage state between the headset and the ear canal changes is applicable to an environment (that is, a noisy environment) with large noise, and is not applicable to a quiet environment. In a quiet environment, anti-noise is excessively small, and the frequency response curve information of the secondary path calculated by using the excessively small anti-noise is inaccurate. As a result, a detection result may be inaccurate.

In a possible implementation, the N leakage states sequentially corresponding to the N groups of filtering parameters prestored in the headset indicate that the sealing degree between the headset and the human ear changes from high to low. In a case in which the headset has a downlink signal, the foregoing method for detecting whether the leakage state between the headset and the ear canal changes may include: collecting a first signal by using an error microphone of the headset, and obtaining a downlink signal of the headset; determining current frequency response curve information of a secondary path based on the first signal and the downlink signal; determining, from N groups of frequency response curve information of the secondary path that correspond to the N groups of prestored filtering parameters, target frequency response curve information matching the current frequency response curve information of the secondary path, where an index of the first group of filtering parameters in the N groups of prestored filtering parameters is n, and an index of a group of filtering parameters corresponding to the target frequency response curve information is x; if the index of the group of filtering parameters corresponding to the target frequency response curve information and the index of the first group of filtering parameters satisfy $|n-x| \geq 2$, determining that the leakage state between the headset and the ear canal changes; otherwise, determining that the leakage state between the headset and the ear canal does not change.

In this embodiment, if the index x of the group of filtering parameters corresponding to the target frequency response curve information of the secondary path and the index n of the first group of filtering parameters satisfy $|n-x| \geq 2$, it indicates that there is a large deviation between the current frequency response curve information of the secondary path and historical frequency response curve information of the secondary path, that is, it indicates that the noise cancellation effect obtained when the first group of filtering parameters is used to perform noise cancellation deteriorates In this case, it is determined that the leakage state between the headset and the ear canal changes. If the index x of the group of filtering parameters corresponding to the target frequency response curve information and the index n of the first group of filtering parameters satisfy $|n-x|<2$, it indicates that there is a small deviation between the current frequency response curve information of the secondary path and historical frequency response curve information of the secondary path, that is, it indicates that the noise cancellation effect obtained when the first group of filtering parameters is used to perform noise cancellation does not change. In this case, it is determined that the leakage state between the headset and the ear canal does not change.

In a possible implementation, the method for determining the current frequency response curve information of the secondary path based on the first signal and the downlink signal includes: performing adaptive filtering on the first signal by using the downlink signal as a reference signal, to obtain the current frequency response curve information of the secondary path. In this embodiment, adaptive filtering is performed on the first signal by using a Kalman filter and an NLMS filter and by using the downlink signal as the reference signal, and an amplitude of a converged filter is calculated, to obtain the current frequency response curve information of the secondary path.

In a possible implementation, the foregoing method for updating the filtering parameters of the headset from the first group of filtering parameters to the second group of filtering parameters may include: adjusting indexes of the filtering parameters one by one from n to x by using the index n of the first group of filtering parameters as a starting point, where the group of filtering parameters corresponding to the index x is the second group of filtering parameters.

In this embodiment, when the filtering parameters of the headset are updated, the index of the filtering parameters is updated from n to x. In a process of adjusting the filtering parameters, to provide good listening experience to the user, the indexes of the filtering parameters are adjusted one by one until the index of the filtering parameters is x in this embodiment, so that the best noise cancellation effect is smoothly achieved.

According to a fourteenth aspect, an embodiment provides a headset. The headset has an ANC function. The headset includes a detection module, an updating module, and a processing module. The detection module is configured to: when the headset is in an ANC working mode, detect whether a leakage state between the headset and an ear canal changes. The updating module is configured to: when the detection module detects that the leakage state between the headset and the ear canal changes, update a filtering parameter of the headset from a first group of filtering parameters to a second group of filtering parameters. The processing module is configured to perform noise cancellation by using the second group of filtering parameters. The first group of filtering parameters and the second group of filtering parameters are respectively two different groups of filtering parameters in N groups of filtering parameters prestored in the headset. The N groups of filtering parameters are respectively used to perform noise cancellation on ambient sound in N leakage states. The N leakage states are formed by the headset and N different ear canal environments. In a current wearing state of the headset, for same ambient noise, noise cancellation effect obtained when the second group of filtering parameters is applied to the headset is better than noise cancellation effect obtained when another filtering parameter in the N groups of filtering parameters is applied to the headset.

In a possible implementation, when a sealing degree between the headset and a human ear changes, and noise cancellation effect obtained when the first group of filtering parameters is applied to the headset deteriorates, the leakage state between the headset and the ear canal changes. It should be understood that the leakage state between the headset and the ear canal reflects the sealing degree between the headset and the human ear.

In a possible implementation, the headset provided in this embodiment further includes a first signal collection module and a second signal collection module. The first signal collection module is configured to collect a first signal by using an error microphone of the headset. The second signal collection module is configured to collect a second signal by using a reference microphone of the headset.

The detection module is further configured to, when the headset has no downlink signal, calculate a long-term energy ratio frame by frame based on the first signal and the second signal, and when a long-term energy ratio of a current frame increases and a difference between the long-term energy ratio of the current frame and a long-term energy ratio of a historical frame is greater than a first threshold, determine that the leakage state between the headset and the ear canal changes, otherwise, determine that the leakage state between the headset and the ear canal does not change.

In a possible implementation, the N leakage states sequentially corresponding to the N groups of filtering parameters prestored in the headset indicate that the sealing degree between the headset and the human ear changes from high to low. The updating module is further configured to update the filtering parameters of the headset from the first group of filtering parameters to a third group of filtering parameters, where an index of the first group of filtering parameters in the N groups of prestored filtering parameters is n, and an index of the third group of filtering parameters is $n-1$, determine the long-term energy ratio of the current frame when the headset performs noise cancellation by using the third group of filtering parameters; and if the long-term energy ratio of the current frame decreases when the headset performs noise cancellation by using the third group of filtering parameters, decrease indexes of the filtering parameters one by one by using the index of the third group of filtering parameters as a starting point until the difference between the long-term energy ratio of the current frame and the long-term energy ratio of the historical frame is less than a second threshold when the headset performs noise cancellation by using a group of filtering parameters corresponding to the current index, where the group of filtering parameters corresponding to the current index is the second group of filtering parameters, or if the long-term energy ratio of the current frame increases when the headset performs noise cancellation by using the third group of filtering parameters, update the filtering parameters of the headset from the third group of filtering parameters to a fourth group of filtering parameters, where an index of the fourth group of filtering parameters is $n+1$, determine the long-term energy ratio of the current frame when the headset performs noise cancellation by using the fourth group of filtering parameters, and if the long-term energy ratio of the current frame decreases, increase indexes of the filtering parameters one by one by using the index of the fourth group of filtering parameters as a starting point until the difference between the long-term energy ratio of the current frame and the long-term energy ratio of the historical frame is less than a second threshold when the headset performs noise cancellation by using a group of filtering parameters corresponding to the current index, where the group of filtering parameters corresponding to the current index is the second group of filtering parameters.

In a possible implementation, the headset provided in this embodiment further includes a first signal collection module, a second signal collection module, and an obtaining module. The first signal collection module is configured to collect and obtain a first signal by using an error microphone of the headset. The second signal collection module is configured to collect a second signal by using a reference microphone of the headset. The obtaining module is configured to obtain an anti-noise signal played by a speaker of the headset.

The N leakage states sequentially corresponding to the N groups of filtering parameters prestored in the headset indicate that the sealing degree between the headset and the human ear changes from high to low. The detection module is further configured to determine current frequency response curve information of a secondary path based on the first signal, the second signal, and the anti-noise signal; determine, from N groups of frequency response curve information of the secondary path that correspond to the N groups of prestored filtering parameters, target frequency response curve information matching the current frequency response curve information of the secondary path, where an index of the first group of filtering parameters in the N groups of prestored filtering parameters is n, and an index of a group of filtering parameters corresponding to the target frequency response curve information is x; if the index x of the group of filtering parameters corresponding to the target frequency response curve information and the index n of the first group of filtering parameters satisfy $|n-x|\geq 2$, determine that the leakage state between the headset and the ear canal changes; otherwise, determine that the leakage state between the headset and the ear canal does not change.

In a possible implementation, the detection module is further configured to calculate a residual signal of the error microphone of the headset based on the first signal and the second signal, and perform adaptive filtering on the residual signal of the error microphone by using the anti-noise signal as a reference signal, to obtain the current frequency response curve information of the secondary path.

In a possible implementation, the headset provided in this embodiment further includes a third signal collection module and a determining module. The third signal collection module is configured to collect a third signal by using an external microphone of the headset, where the external microphone of the headset may include a talk microphone or the reference microphone. The determining module is configured to determine whether energy of the third signal is greater than a second preset energy threshold.

In a possible implementation, the updating module is further configured to: when the energy of the third signal is greater than the second preset energy threshold or the energy of the second signal is greater than a third preset energy threshold, update the filtering parameters of the headset from the first group of filtering parameters to the second group of filtering parameters.

In a possible implementation, the headset provided in this embodiment further includes a first signal collection module and an obtaining module. The first signal collection module is configured to collect a first signal by using an error microphone of the headset. The obtaining module is configured to obtain a downlink signal of the headset.

The N leakage states sequentially corresponding to N groups of filtering parameters prestored in the headset indicate that a sealing degree between the headset and a human ear changes from high to low. The detection module is further configured to: when the headset has a downlink signal, determine current frequency response curve information of a secondary path based on the first signal and the downlink signal, determine, from N groups of frequency response curve information of the secondary path that correspond to the N groups of prestored filtering parameters, target frequency response curve information matching the current frequency response curve information of the secondary path, where an index of the first group of filtering parameters in the N groups of prestored filtering parameters is n, and an index of a group of filtering parameters corresponding to the target frequency response curve information is x, if the index of the group of filtering parameters corresponding to the target frequency response curve information and the index of the first group of filtering parameters satisfy $|n-x|\geq 2$, determine that the leakage state between the headset and the ear canal changes, otherwise, determine that the leakage state between the headset and the ear canal does not change.

In a possible implementation, the detection module is further configured to perform adaptive filtering on the first signal by using the downlink signal as a reference signal, to obtain the current frequency response curve information of the secondary path.

In a possible implementation, the updating module is further configured to adjust indexes of the filtering parameters from n to x one by one by using the index n of the first group of filtering parameters as a starting point, where the group of filtering parameters corresponding to the index x is the second group of filtering parameters.

According to a fifteenth aspect, an embodiment provides a headset. The headset includes a memory and at least one processor connected to the memory. The memory is configured to store instructions, and after the instructions stored in the memory are read by the at least one processor, the method in any one of the thirteenth aspect and the possible implementations of the thirteenth aspect is performed.

According to a sixteenth aspect, an embodiment provides a computer-readable storage medium. The computer-readable storage medium stores a computer program, and when the computer program is executed by a processor, the method in any one of the thirteenth aspect and the possible implementations of the thirteenth aspect is performed.

According to a seventeenth aspect, an embodiment provides a computer program product including instructions. When the computer program product runs on a computer, the computer is enabled to perform the method in any one of the thirteenth aspect and the possible implementations of the thirteenth aspect.

According to an eighteenth aspect, an embodiment provides a chip, including a memory and a processor. The memory is configured to store computer instructions. The processor is configured to invoke the computer instructions from the memory and run the computer instructions, to perform the method in any one of the thirteenth aspect and the possible implementations of the thirteenth aspect.

It should be understood that, for beneficial effects achieved by the technical solutions in the fourteenth aspect to the eighteenth aspect and the corresponding possible implementations in embodiments, refer to the foregoing technical effects in the thirteenth aspect and the corresponding possible implementations thereof. Details are not described herein again.

DESCRIPTION OF EMBODIMENTS

Figure 1:
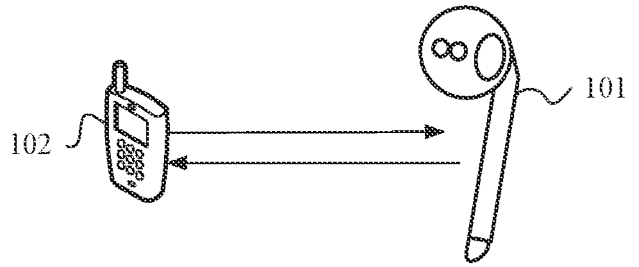
FIG. 1 is a schematic diagram of an application scenario of an ANC method according to an embodiment.

The term “and/or” in this specification describes only an association relationship for describing associated objects and represents that three relationships may exist. For example, A and/or B may represent the following three cases: only A exists, both A and B exist, and only B exists.

In the specification and claims of embodiments of this disclosure, the terms “first”, “second”, and the like are intended to distinguish between different objects but do not indicate a particular order of the objects. For example, a first group of filtering parameters, a second group of filtering parameters, a third group of filtering parameters, and the like are used to distinguish between different filtering parameters, but are not used to indicate a particular order of the filtering parameters.

In embodiments, the word “example” or “for example” is used to represent giving an example, an illustration, or a description. Any embodiment or design scheme described as an “example” or “for example” in embodiments should not be explained as being more preferred or having more advantages than another embodiment or design scheme. Exactly, use of the word “example” or “for example” or the like is intended to present a related concept in a specific manner.

In the descriptions of embodiments, unless otherwise stated, "a plurality of" means two or more than two. For example, a plurality of processing units are two or more processing units, and a plurality of systems are two or more systems.

Based on the problems existing in the background, embodiments provide an ANC method and apparatus, applied to a headset having an ANC function. When the headset is in an ANC working mode, the headset obtains a first group of filtering parameters, and performs noise cancellation by using the first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2. In conclusion, according to the ANC method provided in this embodiment, a group of filtering parameters that matches a current leakage state may be determined based on a leakage state formed by the headset and an ear canal environment of a user when the user wears the headset, and noise cancellation is performed on ambient sound based on the group of filtering parameters. This can meet a personalized noise cancellation requirement of the user, and improve noise cancellation effect.

Optionally, the ANC method provided in this embodiment may be applied to a headset that has sound leakage from an ear canal of a user. It should be understood that sound leakage further means that after the user wears the headset, the headset cannot closely fit the ear canal of the user, and a gap exists between the ear canal of the user and the headset, causing sound leakage. In addition, leakage varies with different human ear features and different wearing postures. For example, the ANC method provided in this embodiment may be applied to semi-open ANC (because there is no rubber cover at a sound outlet of a semi-open ANC earphone, a gap exists between the earphone and an ear canal). In the following embodiments, an example in which the headset is the semi-open ANC earphone is used for description.

FIG. 1 is a schematic diagram of an application scenario of an ANC method according to an embodiment. In FIG. 1, a semi-open ANC earphone 101 communicates with an electronic device 102 in a wired transmission manner, or may communicate with the electronic device 102 in a wireless transmission manner. For example, the semi-open ANC earphone 101 communicates with the electronic device 102 through BLUETOOTH or another wireless network. It should be understood that this embodiment relates to transmission of audio data and control signaling between the semi-open ANC earphone 101 and the electronic device 102. For example, the electronic device 102 sends the audio data to the semi-open ANC earphone 101 for playing. For another example, the electronic device 102 sends the control signaling to the semi-open ANC earphone 101, to control a working mode and the like of the semi-open ANC earphone 101.

Optionally, the electronic device 102 in FIG. 1 may be an electronic device such as a mobile phone, a computer (for example, a notebook computer or a desktop computer), or a tablet computer (a handheld tablet computer or a vehicle-mounted tablet computer). Alternatively, the electronic device 102 may be another terminal device, for example, a smart speaker or a vehicle-mounted speaker. A specific type, structure, and the like of the electronic device 102 are not limited in embodiments.

Figure 2:
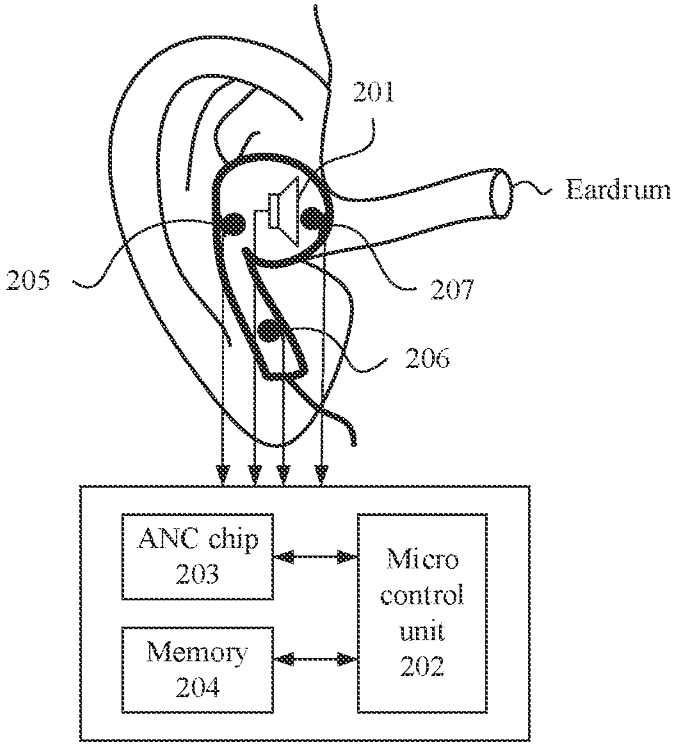
FIG. 2 is a schematic diagram of hardware of a semi-open ANC earphone according to an embodiment.

Optionally, the semi-open ANC earphone provided in this embodiment may be wired or wireless. This is not limited herein. The following describes a hardware structure of the semi-open ANC earphone with reference to a wearing form of the semi-open ANC earphone in a human ear. As shown in FIG. 2, the semi-open ANC earphone includes a speaker (horn) 201, a micro control unit (MCU) 202, an ANC chip 203, a memory 204, and a plurality of microphones. The plurality of microphones may include a reference microphone 205, a talk microphone 206, and an error microphone 207.

The speaker 201 is configured to play a downlink signal (music or voice). In the semi-open ANC earphone, the speaker 201 is further configured to play an anti-noise signal (or an ANTI signal), and the anti-noise signal is used to weaken a noise signal in the ear canal of the user, thereby achieving effect of actively reducing noise.

The MCU 202 is configured to: control the filtering parameter, for example, determine the first group of filtering parameters from the $N_1$ groups of filtering parameters, and write the determined first group of filtering parameters into the ANC chip 203, or modify the filtering parameter stored in the memory 204.

The ANC chip 203 is configured to perform noise cancellation on ambient sound. In this example, the ANC chip 203 processes signals collected by the reference microphone 205 and the error microphone 207, to generate an anti-noise signal, so as to weaken a noise signal in the ear canal of the user.

The memory 204 is configured to store a plurality of groups of filtering parameters (or ANC parameters). One group of filtering parameters includes a filtering parameter (or an FF coefficient) corresponding to a feedforward path, a filtering parameter (or an FB coefficient) corresponding to a feedback path, and a filtering parameter (or SPE coefficient) corresponding to a downlink compensation path. For example, the $N_1$ groups of filtering parameters and $N_2$ groups of filtering parameters in this embodiment are stored. In a process of implementing the ANC method, after determining the first group of filtering parameters from the $N_1$ groups of filtering parameters, the micro control unit 202 reads the first group of filtering parameters from the memory 204, and writes the first group of filtering parameters into the ANC chip 203, so that the ANC chip 203 processes, based on the first group of filtering parameters, an audio signal collected by a related microphone, to generate an anti-noise signal.

The reference microphone 205 is configured to collect external ambient noise.

The talk microphone 206 is configured to collect a sound signal of the user when the user makes a call.

The error microphone 207 is configured to collect a noise signal in the ear canal of the user.

Optionally, the semi-open ANC earphone may further include another element, for example, an optical proximity sensor. The optical proximity sensor is configured to detect whether the semi-open ANC earphone is in an ear. If the semi-open ANC earphone is a wireless headset, the semi-open ANC earphone may further include a wireless communication module. The wireless communication module may be a wireless local area network (WLAN) (for example, a WI-FI network) module or a BLUETOOTH (BT) module. The BLUETOOTH module is used by the semi-open ANC earphone to communicate with another device through BLUETOOTH.

It may be understood that the structure shown in this embodiment does not constitute a specific limitation on the semi-open ANC earphone. In other embodiments, the semi-open ANC earphone may include more or fewer components than those shown in the figure, or combine some components, or split some components, or have different component arrangements. The components shown in the figure may be implemented by hardware, software, or a combination of software and hardware.

Figure 3:
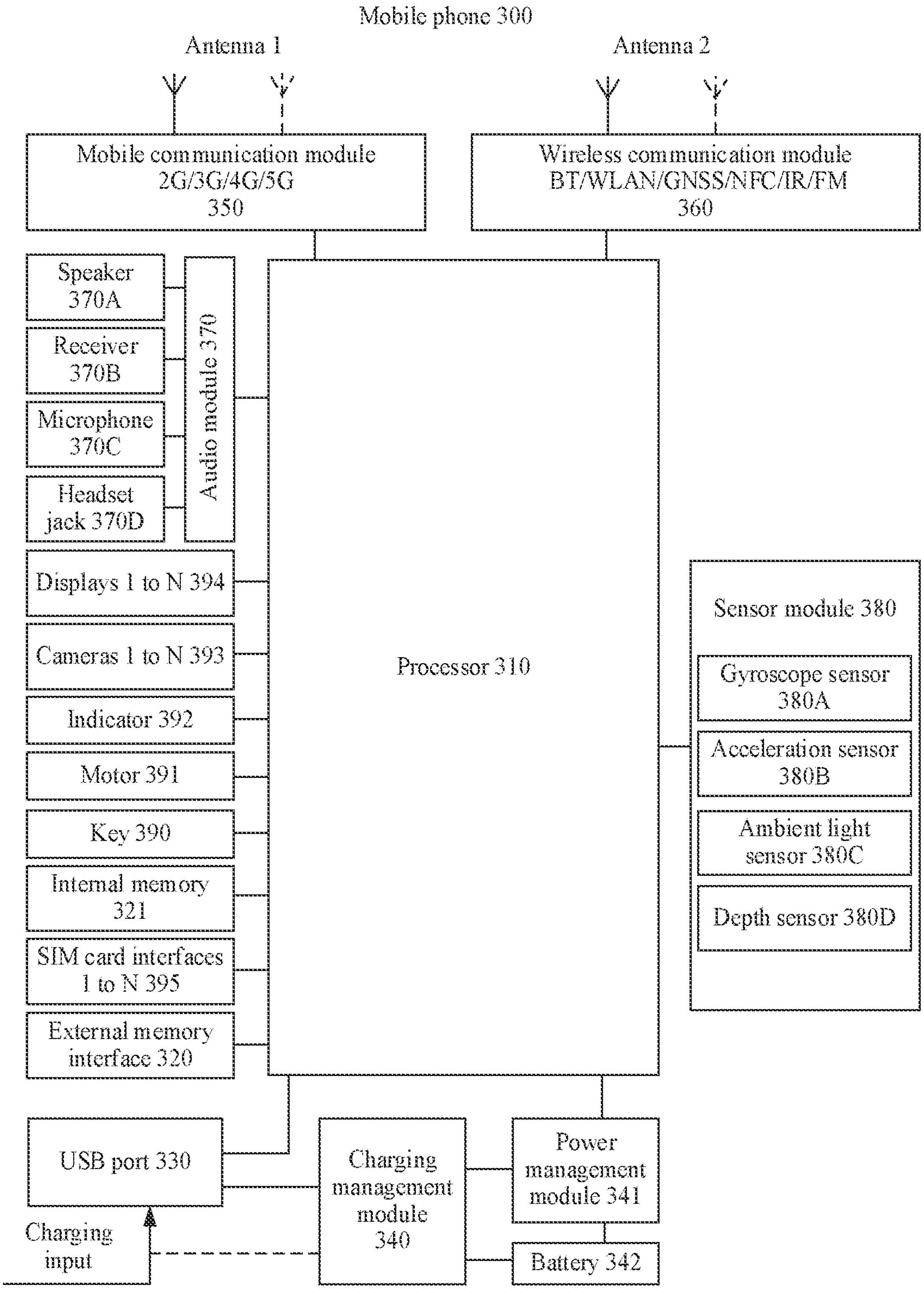
FIG. 3 is a schematic diagram of hardware of a mobile phone according to an embodiment.

For example, the electronic device 102 shown in FIG. 1 is a mobile phone. FIG. 3 is a schematic diagram of a hardware structure of a mobile phone according to an embodiment. As shown in the FIG. 3, a mobile phone 300 may include a processor 310, a memory (including an external memory interface 320 and an internal memory 321), a Universal Serial Bus (USB) port 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (SIM) card interface 395, and the like. The sensor module 380 may include a gyroscope sensor 380A, an acceleration sensor 380B, an ambient optical sensor 380C, a depth sensor 380D, a magnetic sensor, a pressure sensor, a distance sensor, an optical proximity sensor, a heart rate sensor, a barometric pressure sensor, a fingerprint sensor, a temperature sensor, and a touch sensor, bone conduction sensor, and the like.

It may be understood that a structure illustrated in this embodiment does not constitute a specific limitation on the mobile phone 300. In other embodiments, the mobile phone 300 may include more or fewer components than those shown in the figure, or combine some components, or split some components, or have different component arrangements. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video or audio codec, a digital signal processor (DSP), a baseband processor, a neural-network processing unit (NPU), and/or the like. Different processing units may be independent components, or may be integrated into one or more processors.

The controller may be a nerve center and a command center of the mobile phone 300. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache memory. The memory may store instructions or data just used or cyclically used by the processor 310. If the processor 310 needs to use the instructions or the data again, the processor may directly invoke the instructions or the data from the memory. This avoids repeated access, and reduces waiting time of the processor 310, to improve system efficiency.

In some embodiments, the processor 310 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and/or the like.

The I2C interface is a two-way synchronization serial bus, and includes one serial data line (SDA) and one serial clock line (SCL). In some embodiments, the processor 310 may include a plurality of groups of I2C buses. The processor 310 may be separately coupled to the touch sensor, a charger, a flash, the camera 393, and the like through different I2C bus interfaces. For example, the processor 310 may be coupled to the touch sensor through the I2C interface, so that the processor 310 communicates with the touch sensor 3 through the I2C bus interface, to implement a touch function of the mobile phone 300.

The I2S interface may be used for audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communication module 360 through the I2S interface, to implement a function of answering a call through a BLUETOOTH headset.

The PCM interface may also be used to perform audio communication, and sample, quantize, and code an analog signal. In some embodiments, the audio module 370 may be coupled to the wireless communication module 360 through a PCM bus interface. In some embodiments, the audio module 370 may also transmit an audio signal to the wireless communication module 360 through the PCM interface, to implement a function of answering a call through a BLUETOOTH headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 310 to the wireless communication module 360. For example, the processor 310 communicates with a BLUETOOTH module in the wireless communication module 360 through the UART interface, to implement a BLUETOOTH function. In some embodiments, the audio module 370 may transmit an audio signal to the wireless communication module 360 through the UART interface, to implement a function of playing music through a BLUETOOTH headset.

The MIPI interface may be configured to connect the processor 310 to a peripheral component such as the display 394 or the camera 393. The MIPI interface includes a camera serial interface (CSI), a display serial interface (DSI), and the like. In some embodiments, the processor 310 communicates with the camera 393 through the CSI interface, to implement a photographing function of the mobile phone 300. The processor 310 communicates with the display 394 through the DSI interface, to implement a display function of the mobile phone 300.

The GPIO interface may be configured by software. The GPIO interface may be configured as a control signal or a data signal. In some embodiments, the GPIO interface may be configured to connect the processor 310 to the camera

393, the display 394, the wireless communication module 360, the audio module 370, the sensor module 380, and the like. The GPIO interface may alternatively be configured as the I2C interface, the I2S interface, the UART interface, the MIPI interface, or the like.

It may be understood that an interface connection relationship between the modules shown in this embodiment is merely an example for description, and does not constitute a limitation on the structure of the mobile phone 300. In some other embodiments, the mobile phone 300 may alternatively use an interface connection manner different from that in the foregoing embodiment, or use a combination of a plurality of interface connection manners.

The charging management module 340 is configured to receive a charging input from the charger. The power management module 341 is configured to connect the battery 342 and the charging management module 340 to the processor 310. The power management module 341 receives an input from the battery 342 and/or the charging management module 340, and supplies power to the processor 310, the internal memory 321, the display 394, the camera 393, the wireless communication module 360, and the like. The power management module 341 may be further configured to monitor parameters such as a battery capacity, a battery cycle count, and a battery health status (electric leakage or impedance).

A wireless communication function of the mobile phone 300 may be implemented by using the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone 300 may be configured to cover one or more communication frequency bands. Different antennas may be further reused, to improve antenna utilization. For example, the antenna 1 may be reused as a diversity antenna of a wireless local area network. In some other embodiments, the antenna may be used in combination with a tuning switch.

The mobile communication module 350 may provide a solution to wireless communication that includes second generation (2G)/third generation (3G)/fourth generation (4G)/fifth generation (5G) or the like and that is applied to the mobile phone 300. The mobile communication module 350 may include at least one filter, a switch, a power amplifier, a low noise amplifier (LNA), and the like. The mobile communication module 350 may receive an electromagnetic wave through the antenna 1, perform processing such as filtering or amplification on the received electromagnetic wave, and transmit the electromagnetic wave to the modem processor for demodulation. The mobile communication module 350 may further amplify a signal modulated by the modem processor, and convert the signal into an electromagnetic wave for radiation through the antenna 1. In some embodiments, at least some functional modules in the mobile communication module 350 may be disposed in the processor 310. In some embodiments, at least some functional modules of the mobile communication module 350 and at least some modules of the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 370A, the receiver 370B, or the like), or displays an image or a video by using the display 394. In some embodiments, the modem processor may be an independent component. In some other embodiments, the modem processor may be independent of the processor 310, and is disposed in a same device with the mobile communication module 350 or another functional module.

The wireless communication module 360 may provide a solution for wireless communication including a wireless local area network (WLAN) (for example, a WI-FI network), BLUETOOTH (BT), a global navigation satellite system (GNSS), frequency modulation (FM), a near-field communication (NFC) technology, and an infrared (IR) technology, and the like in the mobile phone 300. The wireless communication module 360 may be one or more components integrating at least one communication processing module. The wireless communication module 360 receives an electromagnetic wave through the antenna 2, performs frequency modulation and filtering processing on an electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 of the mobile phone 300 is coupled to the mobile communication module 350, and the antenna 2 is coupled to the wireless communication module 360, so that the mobile phone 300 can communicate with a network and another device by using a wireless communication technology. The wireless communication technology may include a Global System for mobile Communications (GSM), a General Packet Radio Service (GPRS), code-division multiple access (CDMA), wideband CDMA (WCDMA), time-division synchronous CDMA (TD-SCDMA), Long-Term Evolution (LTE), New Radio (NR), BT, a GNSS, a WLAN, NFC, FM, an IR technology, and/or the like.

The mobile phone 300 implements a display function by using the GPU, the display 394, the application processor, and the like. The GPU is a microprocessor for image processing, and is connected to the display 394 and the application processor. The GPU is configured to: perform mathematical and geometric computation, and render an image. In this embodiment, the GPU may be configured to perform three-dimensional model rendering and virtual-physical superposition. The processor 310 may include one or more GPUs that execute program instructions to generate or change display information.

The display 394 is configured to display an image, a video, and the like. In this embodiment, the display 394 may be configured to display an image obtained after virtual superposition. The display 394 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the mobile phone 300 may include one or N displays 394, where N is a positive integer greater than 1.

The mobile phone 300 may implement a photographing function by using the ISP, the camera 393, the video codec, the GPU, the display 394, the application processor, and the like.

The ISP may be configured to process data fed back by the camera 393. For example, during photographing, a shutter is pressed, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the mobile phone 300 may include one or N cameras 393, where N is a positive integer greater than 1.

The digital signal processor is configured to process a digital signal, for example, process a digital image signal or a digital audio signal, and may further process another digital signal. For example, when the mobile phone 300 selects a frequency, the digital signal processor is configured to perform Fourier transform on frequency energy, and the like.

The video or audio codec is configured to compress or decompress a digital video or digital audio. The mobile phone 300 may support one or more audio codecs, for example, an Advanced Audio Distribution Protocol (A2DP) sub-band coding (SBC) encoder, and a Moving Picture Experts Group (MPEG) Advanced Audio Coding (AAC) encoder. In this way, the mobile phone 300 may play or record audio in a plurality of encoding formats.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the mobile phone 300 may be implemented by using the NPU, for example, image recognition, facial recognition, speech recognition, text understanding, and action generation.

The external memory interface 320 may be configured to connect to an external storage card, for example, a Micro Secure Digital (SD) card, to extend a storage capability of the mobile phone 300. The external memory card communicates with the processor 310 through the external memory interface 320, to implement a data storage function.

The internal memory 321 may be configured to store computer-executable program code. The executable program code includes instructions. The internal memory 321 may include a program storage area and a data storage area. The program storage area may store an operating system, an application required by at least one function (for example, a sound playing function or an image playing function), and the like. The data storage area may store data (such as audio data and a phone book) and the like created during use of the mobile phone 300. In addition, the internal memory 321 may include a high-speed random access memory, and may further include a nonvolatile memory, for example, at least one magnetic disk storage device, a flash memory device, or a universal flash storage (UFS). The processor 310 runs the instructions stored in the internal memory 321 and/or the instructions stored in the memory disposed in the processor, to execute various function applications of the mobile phone 300 and data processing.

The mobile phone 300 may implement an audio function such as music playing or recording by using the audio module 370, the speaker 370A, the receiver 370B, the microphone 370C, the headset jack 370D, the application processor, and the like.

The audio module 370 is configured to convert digital audio information into an analog audio signal for output, and is also configured to convert analog audio input into a digital audio signal. The audio module 370 may be further configured to encode and decode an audio signal.

The speaker 370A, also referred to as a "horn", is configured to convert an audio electrical signal into a sound signal. The mobile phone 300 may listen to music or answer a hands-free call through the speaker 370A.

The receiver 370B, also referred to as an "earpiece", is configured to convert an audio electrical signal into a sound signal. When a call is answered or a voice message is received by using the mobile phone 300, the receiver 370B may be put close to a human ear to listen to a voice.

The microphone 370C, also referred to as a "mike" or a "mic", is configured to convert a sound signal into an electrical signal. When making a call or sending a voice message, a user may place the mouth of the user near the microphone 370C to make a sound, to input a sound signal to the microphone 370C. At least one microphone 370C may be disposed in the mobile phone 300. In some other embodiments, two microphones 370C may be disposed in the mobile phone 300, to collect a sound signal and further implement a noise cancellation function (the microphone with the noise cancellation function is a feedback microphone). In some other embodiments, three, four, or more microphones 370C may alternatively be disposed in the mobile phone 300, to collect a sound signal, cancel noise, further identify a sound source, implement a directional recording function, and the like.

The gyroscope sensor 380A may be configured to determine a motion posture of the mobile phone 300. In some embodiments, the gyroscope sensor 380A may be used to determine angular velocities of the mobile phone 300 around three axes (namely, x, y, and z axes).

The acceleration sensor 380B may detect a movement direction and a movement acceleration of the mobile phone 300. When the mobile phone 300 is static, a value and a direction of gravity may be detected. The acceleration sensor 380B may be further configured to identify a posture of the mobile phone 300, and is applied to an application such as switching between landscape mode and portrait mode or a pedometer.

The ambient light sensor 380C is configured to sense ambient light brightness. The mobile phone 300 may adaptively adjust brightness of the display 394 based on the sensed ambient light brightness. The ambient light sensor 380C may also be configured to automatically adjust white balance during photographing. In some embodiments, the ambient light sensor 380C may further cooperate with the optical proximity sensor to detect whether the mobile phone 300 is in a pocket, thereby preventing an accidental touch.

The depth sensor 380D is configured to determine a distance from each point on the object to the mobile phone 300. In some embodiments, the depth sensor 380D may collect depth data of a target object, to generate a depth map of the target object. Each pixel in the depth map represents a distance from a point on an object corresponding to the pixel to the mobile phone 300.

The indicator 392 may be an indicator light, and may be configured to indicate a charging state and a power change, or may be configured to indicate a message, a missed call, a notification, and the like.

The button 390 includes a power button, a volume button, and the like. The button 390 may be a mechanical button, or may be a touch button. The motor 391 may generate a vibration prompt. The indicator 392 may be an indicator light, and may be configured to indicate a charging state and a power change, or may be configured to indicate a message, a missed call, a notification, and the like. The SIM card interface 395 is configured to connect to a SIM card. The SIM card may be inserted into the SIM card interface 395 or removed from the SIM card interface 395, to implement contact with or separation from the mobile phone 300.

Based on understanding of the foregoing hardware structure of the semi-open ANC earphone, the following explains and describes some concepts related to the ANC method and apparatus provided in embodiments.

1. Description to Filtering Parameters:

In this embodiment, a group of filtering parameters include a filtering parameter corresponding to a feedforward path, a filtering parameter corresponding to a feedback path, and a filtering parameter corresponding to a downlink compensation path. The ANC chip 203 separately processes sound signals in the feedforward path, the feedback path, and the downlink compensation path based on the filtering parameter, to implement ANC. For example, the feedforward path, the feedback path, and the downlink compensation path are separately briefly described with reference to the processing flowchart in FIG. 4.

Feedforward path: The feedforward path refers to a path for processing a sound signal collected by a reference microphone. A filtering parameter corresponding to the feedforward path is related to a signal processing method in the feedforward path. For example, if the feedforward path includes gain processing, biquadratic filtering processing, amplitude limiting processing, and the like, the filtering parameter corresponding to the feedforward path may include a gain of the feedforward path, a parameter of a biquad filter in the feedforward path, a parameter of a limiter, and the like.

Feedback path: The feedback path refers to a path for processing a sound signal collected by an error microphone. Similarly, a filtering parameter corresponding to the feedback path is also related to a signal processing method in the feedback path. For example, the filtering parameter corresponding to the feedback path may include a gain of the feedback path, a parameter of a biquad filter in the feedback path, a parameter of a limiter, and the like.

Downlink compensation path: The downlink compensation path refers to a path for processing a downlink signal (for example, music played by a user). A filtering parameter corresponding to the downlink compensation path may include a gain of the downlink compensation path, a parameter of a downlink compensation filter, and the like.

Figure 4:
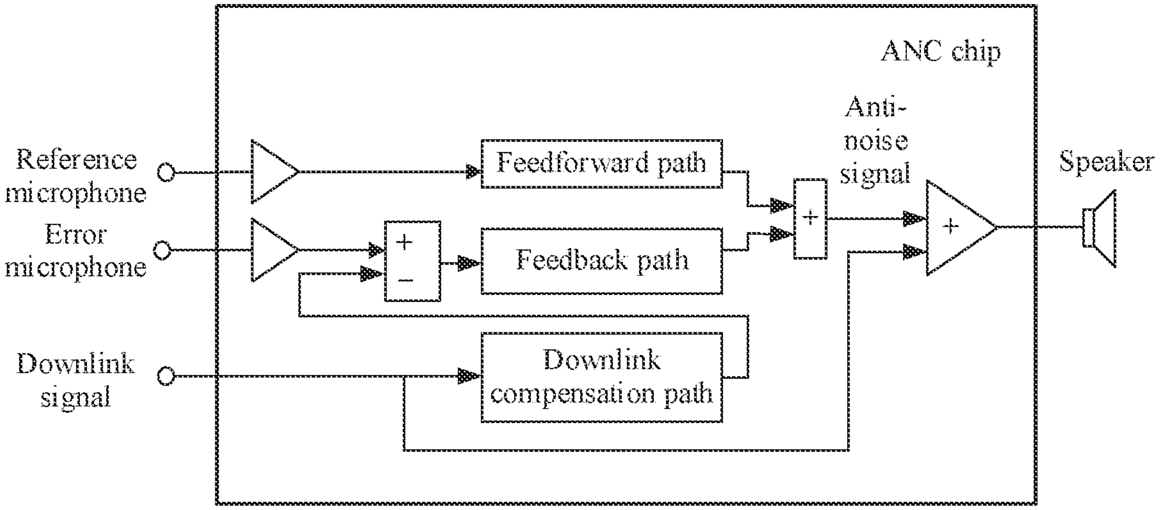
FIG. 4 is a schematic diagram of a processing procedure of an ANC method according to an embodiment.

With reference to FIG. 4, it should be noted that, in a process of processing, through the feedback path, the signal collected by the error microphone, the signal obtained after the downlink signal is processed through the downlink compensation path is used as an input signal in the feedback path, so that the signal collected by the error microphone and the processed downlink signal are processed through the feedback path, to obtain an anti-noise signal in the feedback path. In addition, the sound signal collected by the reference microphone is processed through the feedforward path, to obtain an anti-noise signal in the feedforward path. Further, a directional noise signal in the feedforward path and the anti-noise signal in the feedback path are summed up to obtain an anti-noise signal.

2. Leakage State:

In this embodiment, the leakage states are formed by the headset and different ear canal environments. The ear canal environment is related to an ear canal feature (which refers to a physiological feature of an ear canal, for example, a width and a shape of the ear canal) of a user and a posture of wearing the headset by the user. For example, different ear canal environments may include: ear canal environments formed by the headset at different locations of an ear canal of a same user, ear canal environments formed by the headset at same locations of ear canals of different users, or a combination of the two cases. This is not limited in this embodiment.

It should be understood that, the ear canal may be classified into a small ear canal, a middle ear canal, a large ear canal, and the like based on a size of the ear canal of the user. When a user wears the semi-open ANC earphone, for a user with a small ear canal, a sealing degree between the earphone and the ear canal is high, and less sound played by the earphone leaks, that is, a leakage degree of the sound played by the earphone is low; and for a user with a large ear canal, a sealing degree between the earphone and the ear canal is low (there is a gap between the earphone and the ear canal), more sound played by the earphone leaks, and a leakage degree of the sound is high. Certainly, the leakage degree of the sound played by the headset is further related to the posture of wearing the headset by the user. For example, if the headset is located at different locations of the ear canal, the leakage degrees may be different. In conclusion, it can be learned that the leakage state may reflect the sealing degree between the headset and the ear canal of the user. A lower leakage degree indicates a higher sealing degree between the headset and the ear canal of the user, and a lower probability of sound leakage.

3. Description of an Abnormal Noise Type in this Embodiment:

Howling: It is a sudden increase in amplitude or energy of a single-frequency sound signal. Howling of a semi-open ANC earphone may be caused by an action such as squeezing the earphone or quickly changing a wearing posture of the earphone by a user. A sound signal generated during howling is referred to as howling noise. Howling may cause discomfort of the user, interfere with playing of a downlink signal, and severely affect audio playing effect.

Clipping: Clipping is a phenomenon that a low-frequency signal overflows and generates crack noise. The generated crack noise is called clipping noise. Generally, clipping occurs when there is burst low-frequency large noise in an environment. For example, the low-frequency large noise is generated when a vehicle bumps or an aircraft lands.

Noise floor: that is, ground noise. The noise floor may also be referred to as background noise. The noise floor is noise caused by performance limitation of hardware (for example, a circuit or another component in a headset) of a device, for example, rustling in television sound other than program sound. In a noisy environment, the noise floor cannot be perceived (heard) by the user. In a quiet environment, the user can perceive the noise floor. Excessive ground noise is not only irritating, but also submerges weaker details of the sound.

Wind noise: It is whirring sound generated when there is wind in the environment. The wind noise affects normal use of the headset. In addition, because a direction of the wind noise is random, the wind noise has different impact on two ears of the user, that is, the left ear and the right ear have different listening experience under the impact of the wind noise.

The howling noise, the clipping noise, the noise floor, and the wind noise severely affect the listening experience of the user, and are all abnormal noise.

It should be understood that, for application to the semi-open ANC earphone, the ANC method provided in this embodiment includes the following three specific phases:

Phase 1: A process of designing $N_1$ groups of filtering parameters

Phase 2: A process of determining a group of filtering parameters suitable for a specific user Phase 3: After determining the group of filtering parameters for the user, in a process of noise cancellation by using the group of filtering parameters, a process of detecting abnormal noise and updating the filtering parameters, or, after determining the group of filtering parameters for the user, in a process in which the user uses the earphone, a process of updating the filtering parameters as a wearing posture of the earphone changes The following embodiment separately describes content related to the foregoing three phases in detail.

Phase 1: The process of designing $N_1$ groups of filtering parameters

In this embodiment, the filters for the feedforward path, the feedback path, and the downlink compensation path may be FIR filters, or may be IIR filters. In the following embodiment, a method for generating $N_1$ groups of filtering parameters is described by using an example in which the filters for the feedforward path, the feedback path, and the downlink compensation path are the FIR filters.

Figure 5:
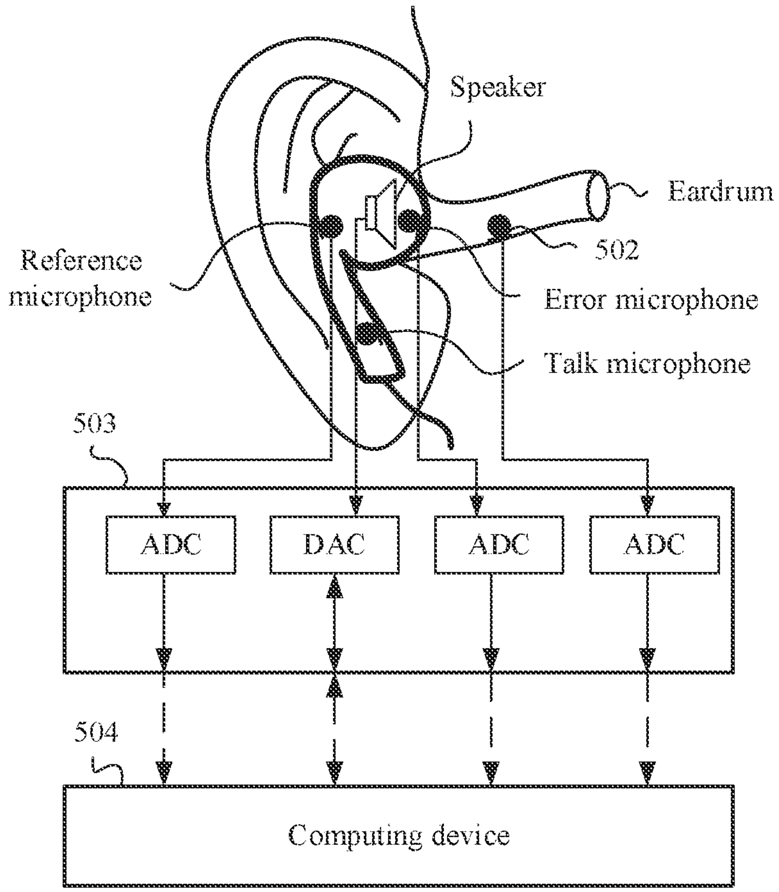
FIG. 5 is a schematic diagram of hardware of a recording device according to an embodiment.

It should be noted that a process of generating the $N_1$ groups of filtering parameters is completed by a recording device. As shown in FIG. 5, the recording device 500 includes a semi-open ANC earphone 501, a tympanic microphone 502, an ANC circuit board 503, and a computing device 504. A hardware structure of the semi-open ANC earphone 501 is the same as the structure of the semi-open ANC earphone shown in FIG. 2. The tympanic microphone 502 is a tiny microphone that can be placed at a tympanic membrane of an ear canal. A reference microphone, an error microphone, and a speaker of the semi-open ANC earphone 501 are separately connected to the ANC circuit board 503, and the tympanic microphone 502 is also connected to the ANC circuit board 503. The ANC circuit board 503 is connected to the computing device 504 by using an IIS digital audio transmission interface. In this way, signals of the reference microphone, the error microphone, the speaker, and the tympanic microphone are sent to the computing device 504 by using the ANC circuit board 503, to complete recording, further, the computing device 504 processes the recorded signal to generate $N_1$ groups of filtering parameters, and subsequently, the $N_1$ groups of filtering parameters are prestored in a memory of the semi-open ANC earphone.

It should be understood that the foregoing $N_1$ groups of filtering parameters are obtained by processing, based on the foregoing recording device, signals recorded in $N_1$ ear canal environments. In this example, the $N_1$ groups of filtering parameters are determined based on a recording signal in a secondary path SP mode and a recording signal in a primary path PP mode. The recording signal in the SP mode includes a downlink signal, a signal of the tympanic microphone, and a signal of the error microphone of the semi-open ANC earphone. The recording signal in the PP mode includes a signal of the tympanic microphone, a signal of the error microphone of the semi-open ANC earphone, and a signal of the reference microphone.

For one ear canal environment, a process of generating a group of filtering parameters includes step 601 to step 609.

Step 601: When there is a downlink signal, obtain the downlink signal of the speaker, the signal of the error microphone, and the signal of the tympanic microphone.

Step 602: When there is no downlink signal, obtain the signal of the reference microphone, the signal of the error microphone, and the signal of the tympanic microphone.

The signal collected in the step 601 may be used to perform secondary path modeling. A recording process in which there is the downlink signal in the step 601 is referred to as the secondary path (SP) mode for short. The signal collected in the step 602 may be used to perform primary path modeling. A recording process in which there is no downlink signal in the step 602 is referred to as the primary path (PP) mode for short.

Step 603: Perform secondary path modeling based on the downlink signal, the signal of the error microphone, and the signal of the tympanic microphone that are obtained in the step 601, to obtain a filtering parameter corresponding to the downlink compensation path.

It should be understood that, in this embodiment, secondary path modeling includes secondary path modeling from the speaker to the error microphone and secondary path modeling from the speaker to the tympanic microphone.

Step 604: Determine a filtering parameter corresponding to the feedforward path and a filtering parameter corresponding to the feedback path with reference to a model of the secondary path from the speaker to the error microphone, a model of the secondary path from the speaker to the tympanic microphone, and the signal obtained in the PP mode.

Figure 6:
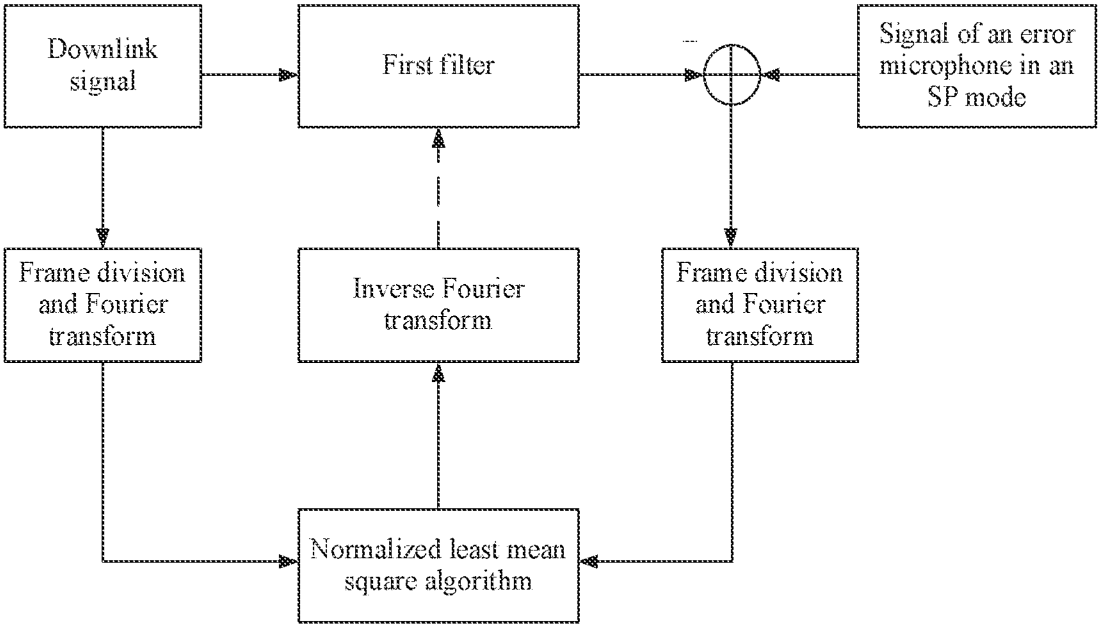
FIG. 6 is a schematic flowchart of secondary path modeling from a speaker to an error microphone according to an embodiment.

FIG. 6 is a schematic flowchart of secondary path modeling from the speaker to the error microphone. With reference to FIG. 6, a process of secondary path modeling from the speaker to the error microphone includes step 6031*a* to step 6031*d*.

Step 6031*a*: Filter the downlink signal by using a first filter.

It should be noted that, during initialization, the first filter is an FIR filter, and parameters of the first filter may be a group of preset parameters, or may be all set to 0, or may be a group of randomly generated parameters. This is not limited in this embodiment.

Step 6031*b*: Superimpose the signal of the error microphone obtained in the SP mode and an inversion signal of the filtered downlink signal to obtain a residual signal of the error microphone.

Step 6031*c*: Perform frame division processing on the residual signal of the error microphone, and perform Fourier transform; and perform frame division processing on the downlink signal and perform Fourier transform.

Step 6031*d*: Process the Fourier-transformed downlink signal as a reference signal and the Fourier-transformed residual signal as an error according to an NLMS algorithm, and perform inverse Fourier transform on a processing result, where the Fourier-transformed result is a parameter of the first filter.

In this embodiment, the parameter of the first filter initialized in the step 6031*a* is updated by using the parameter of the first filter obtained in the step 6031*d*, and the step 6031*a* to the step 6031*d* are repeatedly performed. Finally, a model of the first filter that converges (which refers to convergence of the residual signal of the error microphone) is the model of the secondary path from the speaker to the error microphone.

In this embodiment, a group of converged parameters of the filter is used as the filtering parameters corresponding to the downlink compensation path.

Figure 7:
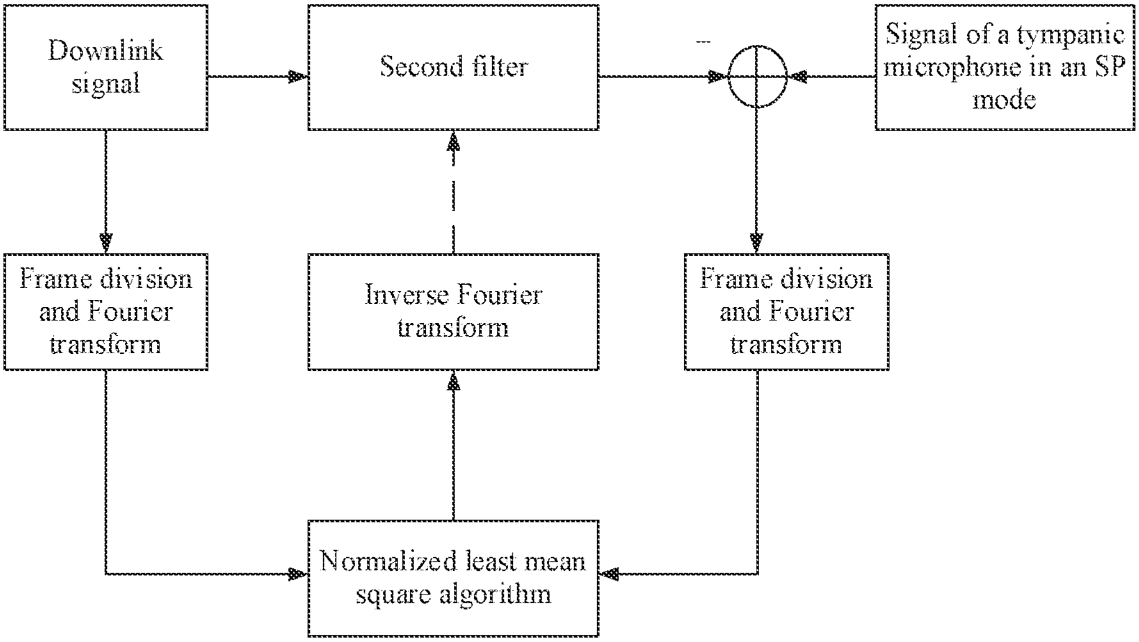
FIG. 7 is a schematic flowchart of secondary path modeling from a speaker to a tympanic microphone according to an embodiment.

FIG. 7 is a schematic flowchart of secondary path modeling from the speaker to the tympanic microphone. With reference to FIG. 7, a process of secondary path modeling from the speaker to the tympanic microphone includes step 6032*a* to step 6032*d*.

Step 6032*a*: Filter the downlink signal by using a second filter.

It should be noted that, during initialization, the second filter is an FIR filter, and parameters of the second filter may be a group of preset parameters, or may be all set to 0, or may be a group of randomly generated parameters. This is not limited in this embodiment.

Step 6021*b*: Superimpose the signal of the tympanic microphone obtained in the SP mode and an inversion signal of the filtered downlink signal to obtain a residual signal of the tympanic microphone.

Step 6031*c*: Perform frame division processing on the residual signal of the tympanic microphone, and perform Fourier transform; and perform frame division processing on the downlink signal, and perform Fourier transform.

Step 6031*d*: Process the Fourier-transformed downlink signal as a reference signal and the Fourier-transformed residual signal as an error according to an NLMS algorithm, and perform inverse Fourier transform on a processing result, where the Fourier-transformed result is a parameter of the second filter.

In this embodiment, the parameter of the second filter initialized in the step 6032*a* is updated by using the parameter of the second filter obtained in the step 6032*d*, and the step 6032*a* to the step 6032*d* are repeatedly performed. Finally, a model of the second filter that converges (which refers to convergence of the residual signal of the tympanic microphone) is the model of the secondary path from the speaker to the tympanic microphone.

Figure 8:
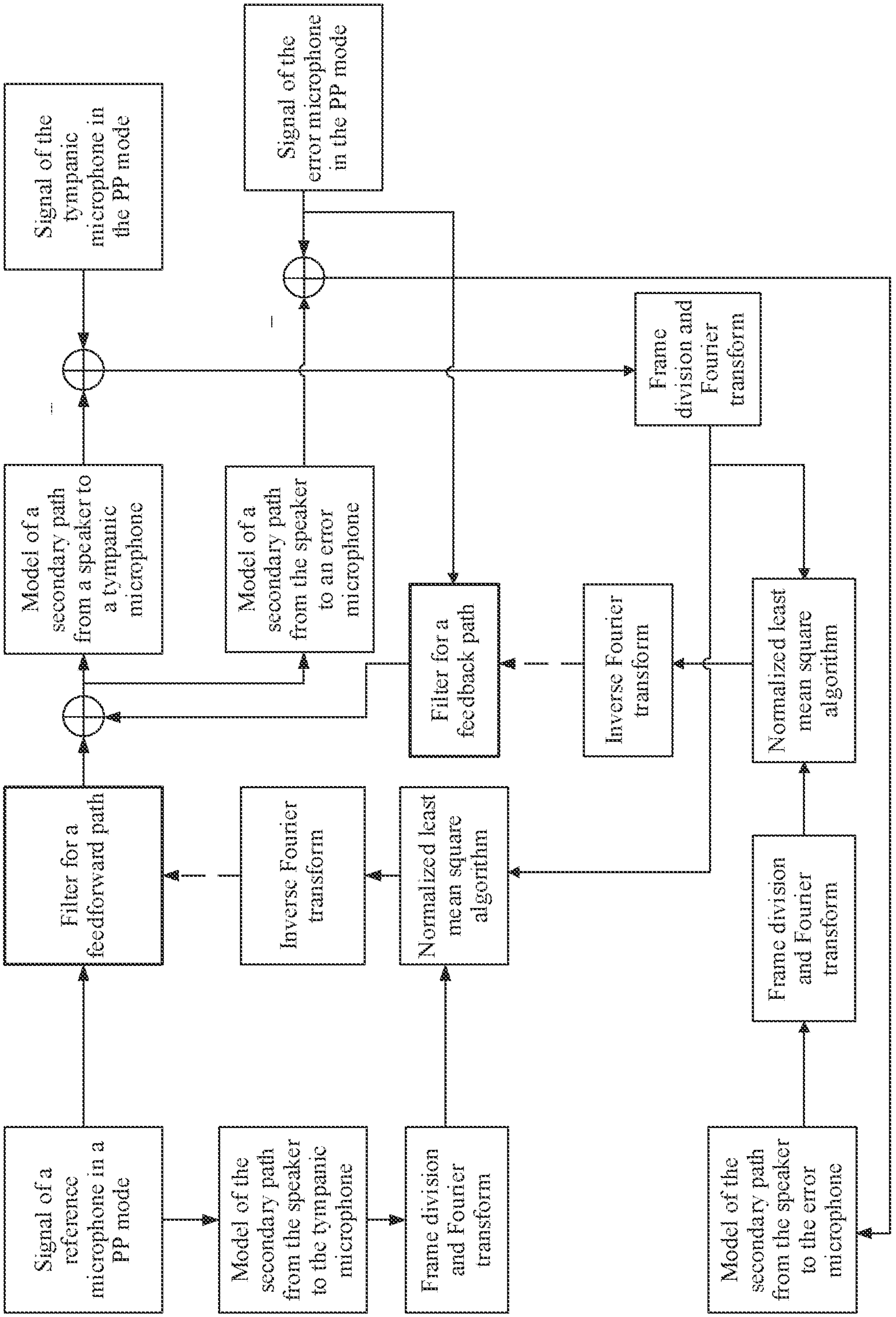
FIG. 8 is a schematic flowchart of determining a filtering parameter according to an embodiment.

FIG. 8 is a schematic flowchart of determining the filtering parameter corresponding to the feedforward path and the filtering parameter corresponding to the feedback path. With reference to FIG. 8, a process of determining the filtering parameter corresponding to the feedforward path and the filtering parameter corresponding to the feedback path further includes step 6041*a* to step 6041*i*.

Step 6041*a*: Filter, by using the filter for the feedforward path, the signal of the reference microphone obtained in the PP mode, to obtain an anti-noise signal (denoted as an ANTIFF signal) in the feedforward path.

Similarly, when the step 6041*a* is performed for the first time, parameters of the filter for the feedforward path is a group of initialized parameters. For example, the parameters of the filter for the feedforward path may be a group of preset parameters, or all parameters of the filter for the feedforward path may be set to 0, or the parameters of the filter for the feedforward path are a group of randomly generated parameters. This is not limited in this embodiment.

Step 6041*b*: Process the residual signal of the error microphone by using the filter for the feedback path, to obtain an anti-noise signal (denoted as an ANTIFB signal) in the feedback path.

It should be noted that, the residual signal of the error microphone in the step 6041*b* is obtained by inverting a processing result obtained after an anti-noise signal (denoted as an ANTI signal) at a previous moment is processed by the model of the secondary path from the speaker to the error microphone and then summing up an inversion result and the signal of the error microphone obtained in the PP mode. The ANTI signal at the previous moment is a sum of an ANTIFF signal at the previous moment and an ANTIFB signal at a moment previous to the previous moment.

Step 6041*c*: Superimpose (that is, sum up) the ANTIFF signal in the step 6041*a* and the ANTIFB signal in the step 6041*b* to obtain an anti-noise signal (that is, an ANTI signal). The residual signal of the tympanic microphone is obtained by inverting a processing result obtained after the ANTI signal is processed by the model of the secondary path from the speaker to the tympanic microphone and then superimposing an inversion result and the signal of the tympanic microphone in the PP mode.

Step 6041*d*: Process the signal of the reference microphone in the PP mode by using the model of the secondary path from the speaker to the tympanic microphone.

Step 6041*e*: Perform frame division processing on a processing result in the step 6041*d*, and perform Fourier transform; and perform frame division processing on the residual signal of the tympanic microphone, and perform Fourier transform.

Step 6041*f*: Process the Fourier-transformed signal (which refers to a signal obtained by performing frame division and Fourier transform on the processing result in the step 6041*d*) in the step 6041*e* as a reference signal and the Fourier-transformed residual signal of the tympanic microphone in the step 6041*e* as an error according to an NLMS algorithm, and perform inverse Fourier transform on a processing result, where the inverse Fourier-transformed result is the parameter of the filter for the feedforward path.

Step 6041*g*: Process the residual signal of the error microphone by using the model of the secondary path from the speaker to the error microphone.

Step 6041*h*: Perform frame division processing on a processing result in the step 6041*g*, and perform Fourier transform; and perform frame division processing on the residual signal of the tympanic microphone, and perform Fourier transform.

Step 6041*i*: Process the Fourier-transformed signal (which refers to a signal obtained by performing frame division and Fourier transform on the processing result in the step 6041*g*) in the step 6041*h* as a reference signal and the Fourier-transformed residual signal of the tympanic microphone in the step 6041*h* as an error according to an NLMS algorithm, and perform inverse Fourier transform on a processing result, where the inverse Fourier-transformed result is the parameter of the filter for the feedback path.

In this embodiment, the initialized parameters of the filter for the feedforward path are updated by using the parameters of the filter for the feedforward path obtained in the step 6041*f*, and the initialized parameters of the filter for the feedback path are updated by using the parameters of the filter for the feedback path obtained in the step 6041*i*. In addition, the step 6041*a* to the step 6041*i* are repeatedly performed, and finally the parameters of the converged filter (the parameters of the filter for the feedforward path and the parameters of the filter for the feedback path) are used as the filtering parameter corresponding to the feedforward path and the filtering parameter corresponding to the feedback path.

In conclusion, recording signals corresponding to $N_1$ different ear canal environments are processed by using the foregoing filtering parameter generation method to obtain $N_1$ groups of filtering parameters, and the $N_1$ groups of filtering parameters are stored in the memory of the semi-open ANC earphone. It should be understood that the $N_1$ groups of filtering parameters are used to perform noise cancellation on ambient sound in $N_1$ leakage states, and are universally applicable, to meet personalized requirements of different people.

When the user wears the semi-open ANC earphone, and the semi-open ANC earphone is in an ANC working mode, the $N_1$ groups of filtering parameters are used as alternative filtering parameters for selection.

Figure 9:
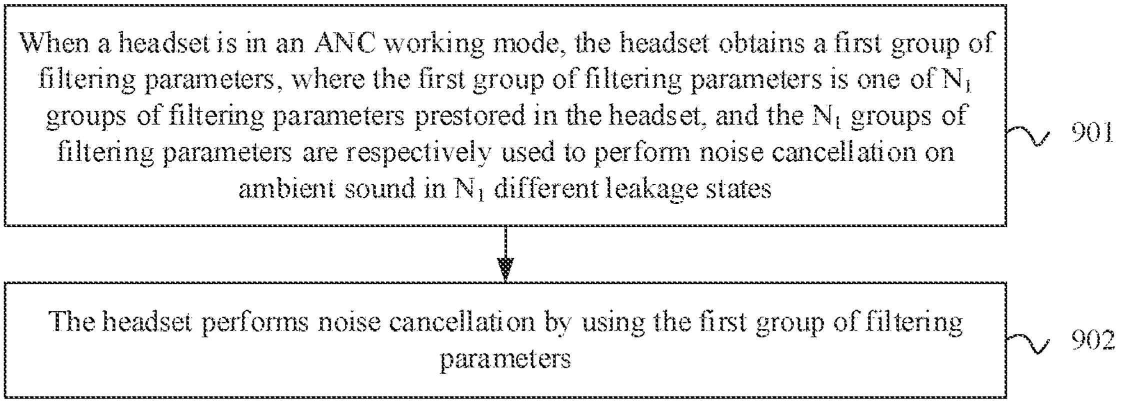
FIG. 9 is a schematic diagram of an ANC method according to an embodiment.

Phase 2: The process of determining a group of filtering parameters suitable for a specific user As shown in FIG. 9, an embodiment provides an ANC method. The method is applied to a headset having an ANC function (for example, the semi-open ANC earphone shown in FIG. 1). The ANC method includes step 901 to step 902.

Step 901: When the headset is in the ANC working mode, the headset obtains a first group of filtering parameters. The first group of filtering parameters is one of $N_1$ groups of filtering parameters prestored in the headset. The $N_1$ groups of filtering parameters are respectively used to perform noise cancellation on ambient sound in $N_1$ leakage states.

The foregoing $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2.

In this embodiment, the leakage states are formed by the headset and different ear canal environments. The ear canal environment is related to an ear canal feature of the user and a posture of wearing the headset by the user. Combinations of different ear canal features and different postures of wearing the headset may form a plurality of ear canal environments, and also correspond to a plurality of leaking states.

It should be understood that the foregoing $N_1$ leakage states may represent $N_1$ ranges of fitness between the headset and a human ear, and may represent $N_1$ sealing degrees between the headset and the human ear. Any leakage state does not specifically refer to a specific wearing state of the headset, but is a typical or differentiated leakage scenario obtained by performing a large amount of statistics collection based on an impedance characteristic of the leakage state.

A wearing state of the headset corresponds to an ear canal environment, to form a leakage state. The wearing state of the headset varies with the ear canal feature of the user and a change in the posture of wearing the headset by the user. The current wearing state of the headset corresponds to a stable ear canal environment, that is, corresponds to a stable ear canal feature and wearing posture. Noise cancellation effect obtained when the foregoing $N_1$ groups of filtering parameters are applied to the headset varies with the wearing state of the headset. The foregoing first group of filtering parameters is a group of filtering parameters with optimal noise cancellation effect when the headset performs noise cancellation on same ambient sound by using the $N_1$ groups of filtering parameters t in the current wearing state.

In this embodiment, the ambient noise is noise formed by an external environment in the ear canal of the user, and the ambient noise includes background noise in different scenarios, for example, a high-speed railway scenario, an office scenario, and an aircraft flight scenario. This is not limited in this embodiment.

It can be learned from the description of the foregoing embodiment that a group of filtering parameters includes a filtering parameter (FF coefficient) corresponding to the feedforward path, a filtering parameter (FB coefficient) corresponding to the feedback path, and a filtering parameter (SPE coefficient) corresponding to the downlink compensation path.

In this embodiment, the first group of filtering parameters may be determined by the user performing a subjective test based on a terminal, or determined by the terminal, or determined by the headset executing a parameter matching algorithm. Based on this, that the headset obtains the first group of filtering parameters includes that the headset obtains the first group of filtering parameters from the terminal or the headset determines the first group of filtering parameters. Specific details are described in detail in the following embodiment.

Step 902: The headset performs noise cancellation by using the first group of filtering parameters.

In this embodiment, with reference to FIG. 3, performing noise cancellation by using the first group of filtering parameters specifically includes: processing, by using the first group of filtering parameters, a sound signal collected by the reference microphone of the headset and a sound signal collected by the error microphone of the headset, to generate an anti-noise signal. The anti-noise signal can weaken some ambient noise signals in the ear canal, to weaken a noise signal in the ear canal of the user, so as to implement noise cancellation on ambient sound.

According to the ANC method provided in this embodiment, a group of filtering parameters (that is, the foregoing first group of filtering parameters) that matches a current leakage state (which may also be understood as a current wearing state) may be determined based on a leakage state formed by the headset and an ear canal environment of a user when the user wears the headset, and noise cancellation is performed on ambient sound based on the group of filtering parameters. This can meet a personalized noise cancellation requirement of the user, and improve noise cancellation effect.

In an implementation, when the first group of filtering parameters is obtained from the terminal, the terminal determines the first group of filtering parameters from the $N_1$ groups of filtering parameters, and sends indication information to the headset, to indicate the first group of filtering parameters.

In another implementation, when the first group of filtering parameters is determined by the headset (the semi-open ANC earphone shown in FIG. 1), the headset executes the matching algorithm to determine the first group of filtering parameters. In this example, the following step 1001 to step 1004, or step 1101 to step 1105, or step 1201 to step 1204, or step 1301 to step 1304, or step 1401 to step 1403 are included.

Figure 10:
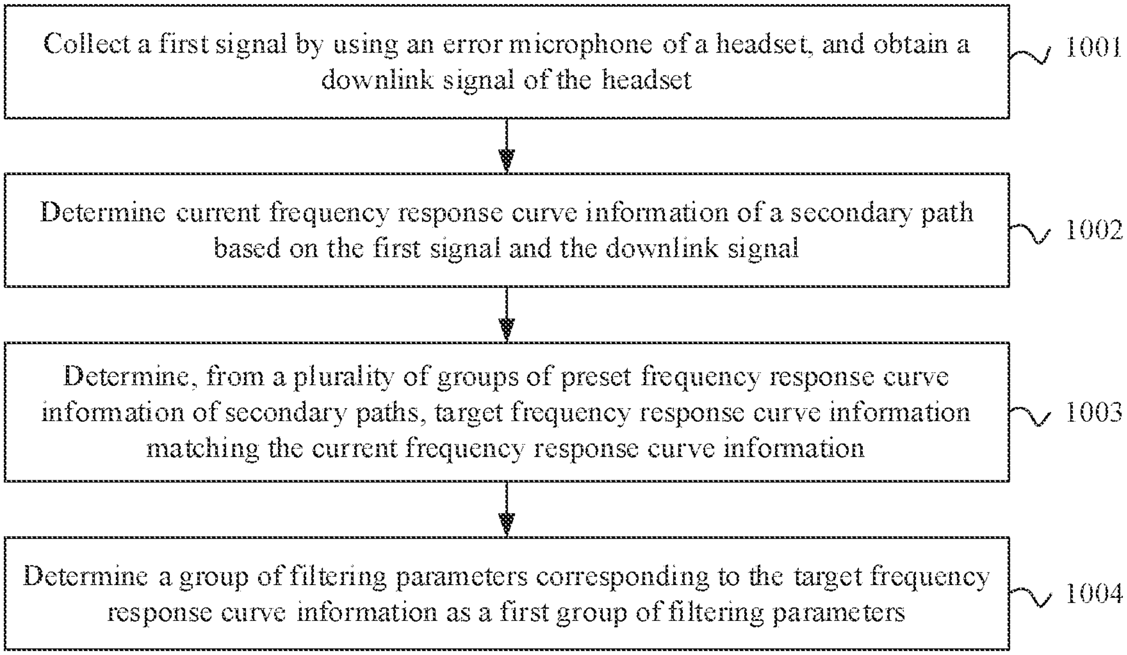
FIG. 10 is a schematic diagram of a method for determining a first group of filtering parameters according to an embodiment.

As shown in FIG. 10, a method for determining, by the headset, the first group of filtering parameters from the $N_1$ groups of filtering parameters includes step 1001 to step 1004.

Step 1001: Collect a first signal by using the error microphone of the headset, and obtain a downlink signal of the headset.

Step 1002: Determine current frequency response curve information of a secondary path based on the first signal and the downlink signal.

In this embodiment, a frequency response of the secondary path is a ratio of a spectrum (that is, an amplitude) of the Fourier-transformed first signal to a spectrum of the Fourier-transformed downlink signal. The current frequency response curve information of the secondary path is a curve describing a change trend of the ratio of the spectrum of the Fourier-transformed first signal to the spectrum of the Fourier-transformed downlink signal.

In an implementation, the downlink signal may be a test audio signal (for example, a customized music signal played online), and a frequency response curve of the secondary path is obtained by testing in a frequency range of 100 Hertz (Hz) to 500 Hz. Certainly, the frequency range may be another frequency range. This is specifically determined based on an actual requirement, and is not limited in this embodiment.

Step 1003: Determine, from a plurality of groups of preset frequency response curve information of the secondary paths, target frequency response curve information matching the current frequency response curve information.

In this embodiment, the foregoing plurality of groups of preset frequency response curve information of the secondary paths are offline tested frequency response curve information of secondary paths of different users (which specifically refer to users with different ear canal features, for example, a large ear canal, a middle ear canal, or a small ear canal), and a test frequency range is also 100 Hz to 500 Hz.

Optionally, a quantity of the foregoing plurality of groups of preset frequency response curve information of the secondary paths may be determined based on an actual situation. This is not limited in this embodiment. For example, the quantity of the foregoing plurality of groups of preset frequency response curve information of the secondary paths is 9, and nine groups of frequency response curves of the secondary paths are frequency response curves that can reflect different ear canal features.

Step 1004: Determine a group of filtering parameters corresponding to the target frequency response curve information as the first group of filtering parameters.

The foregoing $N_1$ groups of filtering parameters correspond to frequency response curve information of $N_1$ secondary paths.

Figure 11:
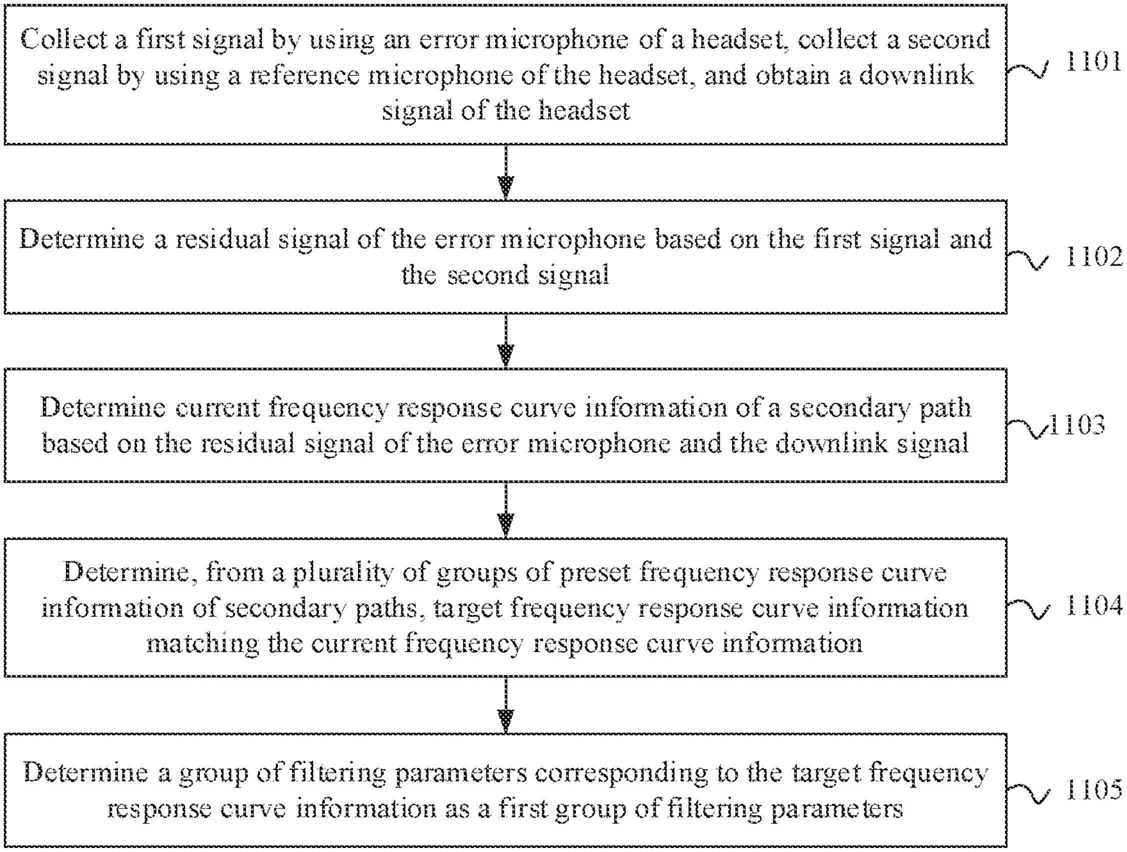
FIG. 11 is a schematic diagram of a method for determining a first group of filtering parameters according to an embodiment.

As shown in FIG. 11, a method for determining, by the headset, the first group of filtering parameters from the $N_1$ groups of filtering parameters includes step 1101 to step 1105.

Step 1101: Collect a first signal by using the error microphone of the headset, collect a second signal by using the reference microphone of the headset, and obtain a downlink signal of the headset.

Step 1102: Determine a residual signal of the error microphone based on the first signal and the second signal.

Specifically, short-time Fourier transform is separately performed on the first signal and the second signal, and then the Fourier-transformed second signal as a reference signal and the Fourier-transformed first signal as a target signal are processed through Kalman filtering and NLMS filtering, to obtain the residual signal of the error microphone. It should be understood that the residual signal of the error microphone is a spectrum (that is, an amplitude) of the residual signal.

Step 1103: Determine current frequency response curve information of a secondary path based on the residual signal of the error microphone and the downlink signal.

It should be understood that, in this case, a current frequency response of the secondary path is a ratio of a spectrum of the residual signal of the error microphone to a spectrum of the Fourier-transformed downlink signal. A current frequency response curve of the secondary path is a curve describing a change trend of the ratio of the spectrum of the residual signal of the error microphone to the spectrum of the Fourier-transformed downlink signal.

Optionally, time linear recursive smoothing may be performed on the current frequency response curve of the secondary path, to remove an abnormal point or a noise point on the frequency response curve.

Step 1104: Determine, from a plurality of groups of preset frequency response curve information of the secondary paths, target frequency response curve information matching the current frequency response curve information.

Step 1105: Determine a group of filtering parameters corresponding to the target frequency response curve information as the first group of filtering parameters.

The $N_1$ groups of filtering parameters correspond to frequency response curve information of $N_1$ secondary paths.

In this embodiment, a state of external ambient noise and a sound signal of a wearer (user) affect accuracy of the frequency response curve of the secondary path. Therefore, to improve accuracy of the frequency response curve of the secondary path, the ambient noise and the sound signal of the wearer are filtered out by using an adaptive filtering algorithm, and then the frequency response curve information of the secondary path is calculated, to improve accuracy of the frequency response curve of the secondary path.

Optionally, the downlink signal used to determine the first group of filtering parameters may be a prompt tone when the ANC function is enabled, that is, the prompt tone when the ANC function is enabled is used as a test signal, and no separate test is required. This can improve working efficiency of the headset.

Figure 12:
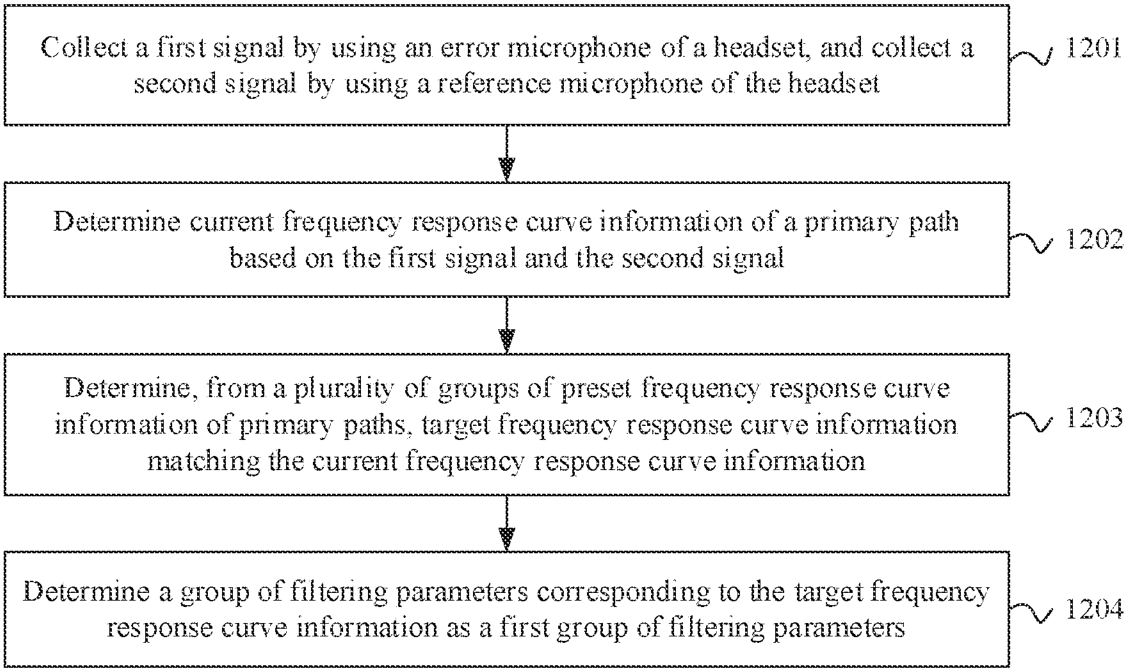
FIG. 12 is a schematic diagram of a method for determining a first group of filtering parameters according to an embodiment.

As shown in FIG. 12, a method for determining, by the headset, the first group of filtering parameters from the $N_1$ groups of filtering parameters includes step 1201 to step 1204.

Step 1201: Collect a first signal by using the error microphone of the headset, and collect a second signal by using the reference microphone of the headset.

Step 1202: Determine current frequency response curve information of a primary path based on the first signal and the second signal.

In this embodiment, a frequency response of the primary path is a ratio of a spectrum (that is, an amplitude) of the Fourier-transformed first signal to a spectrum of the Fourier-transformed second signal. The current frequency response curve information of the secondary path is a curve describing a change trend of the ratio of the spectrum of the Fourier-transformed first signal to the spectrum of the Fourier-transformed downlink signal.

Step 1203: Determine, from a plurality of groups of preset frequency response curve information of the primary paths, target frequency response curve information matching the current frequency response curve information.

The foregoing plurality of groups of preset frequency response curve information of the primary paths are offline tested frequency response curve information of primary paths of different users (which specifically refer to users with different ear canal features, for example, a large ear canal, a middle ear canal, or a small ear canal).

Optionally, the plurality of groups of frequency response curve information of the primary paths may be matched with the current frequency response curve information in a target frequency band, to determine the target frequency response curve information. For example, if the target frequency band is 1000 Hz to 2000 Hz, information about a frequency band of 1000 Hz to 2000 Hz for the plurality of groups of frequency response curve information of the primary paths is matched with information about the frequency band of 1000 Hz to 2000 Hz for the current frequency response curve information, to determine the target frequency response curve information. Certainly, the target frequency band may alternatively be another frequency band. This is specifically determined based on an actual requirement, and is not limited in this embodiment.

Step 1204: Determine a group of filtering parameters corresponding to the target frequency response curve information as the first group of filtering parameters.

The foregoing $N_1$ groups of filtering parameters correspond to frequency response curve information of $N_1$ primary paths.

Optionally, in this embodiment, the current frequency response curve information of the primary path may be further determined by using an adaptive filtering algorithm, to further determine the target frequency response curve information of the primary path. A method for determining the current frequency response curve information of the primary path by using the adaptive filtering algorithm includes: separately performing short-time Fourier transform on the first signal and the second signal; and then processing the Fourier-transformed second signal as a reference signal and the Fourier-transformed first signal as a target signal through Kalman filtering or NLMS filtering, to minimize a residual signal of the error microphone, where an amplitude-frequency curve of a finally converged Kalman filter or NLMS filter is a frequency response curve of the primary path.

Figure 13:
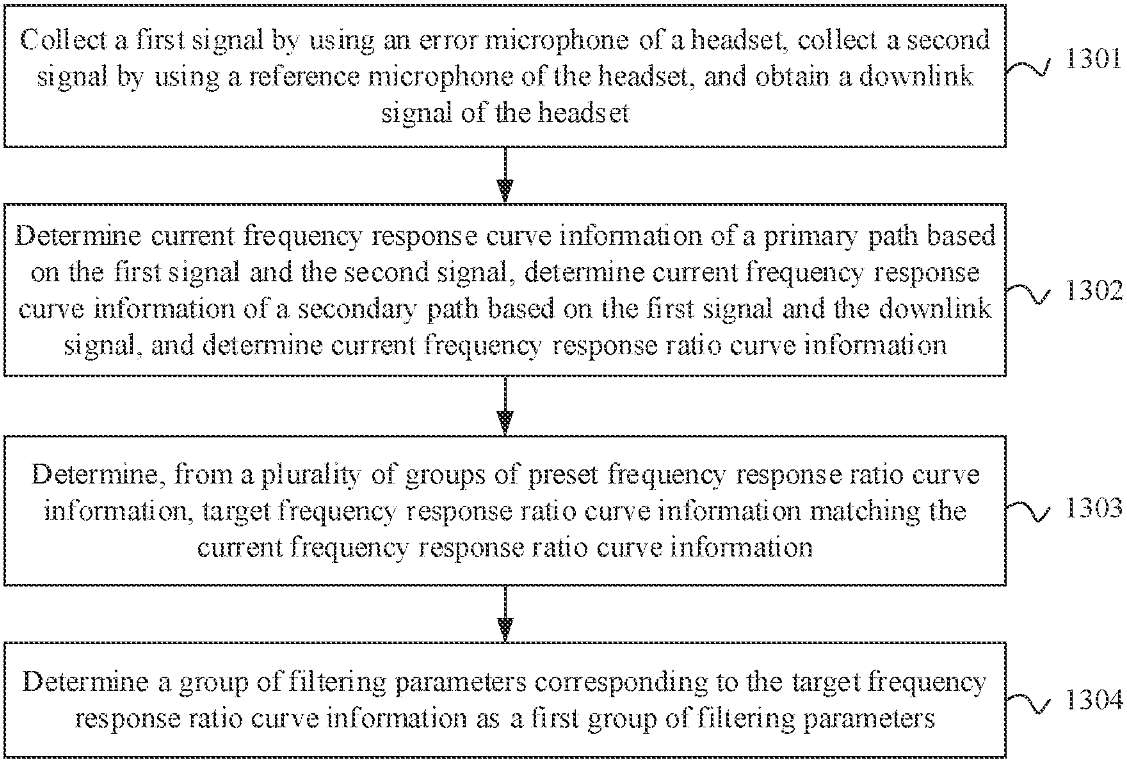
FIG. 13 is a schematic diagram of a method for determining a first group of filtering parameters according to an embodiment.

As shown in FIG. 13, a method for determining, by the headset, the first group of filtering parameters from the $N_1$ groups of filtering parameters includes step 1301 to step 1304.

Step 1301: Collect a first signal by using the error microphone of the headset, collect a second signal by using the reference microphone of the headset, and obtain a downlink signal of the headset.

Step 1302: Determine current frequency response curve information of a primary path based on the first signal and the second signal, determine current frequency response curve information of a secondary path based on the first signal and the downlink signal, and determine current frequency response ratio curve information.

The current frequency response ratio curve information is a ratio of the current frequency response curve information of the primary path to the current frequency response curve information of the secondary path.

Step 1303: Determine, from a plurality of groups of preset frequency response ratio curve information, target frequency response ratio curve information matching the current frequency response ratio curve information.

Step 1304: Determine a group of filtering parameters corresponding to the target frequency response ratio curve information as the first group of filtering parameters.

The $N_1$ groups of filtering parameters correspond to $N_1$ pieces of frequency response ratio curve information.

Figure 14:
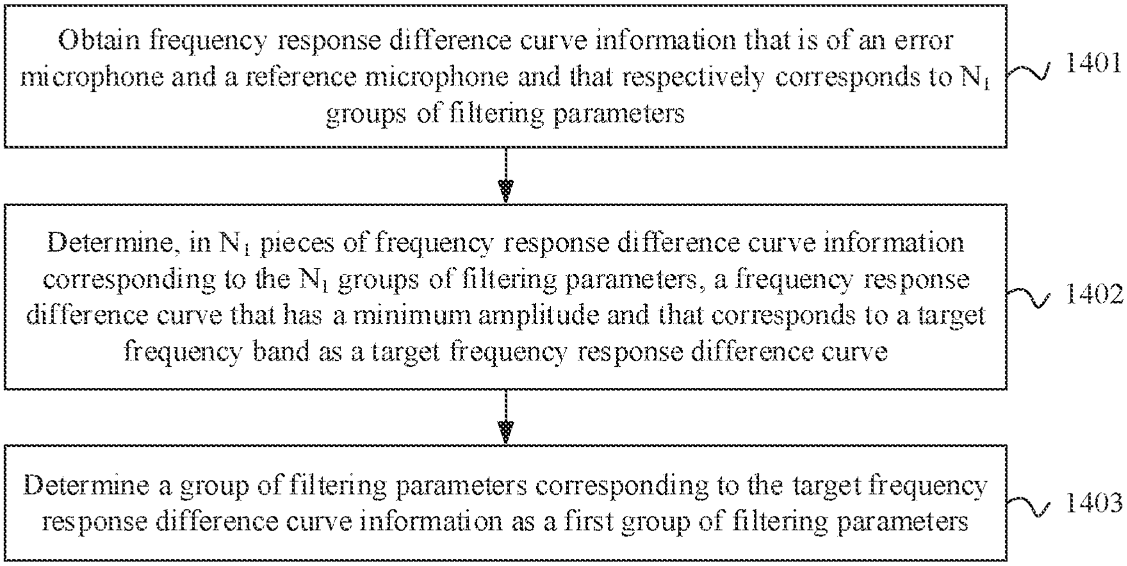
FIG. 14 is a schematic diagram of a method for determining a first group of filtering parameters according to an embodiment.

As shown in FIG. 14, a method for determining, by the headset, the first group of filtering parameters from the $N_1$ groups of filtering parameters includes step 1401 to step 1403.

Step 1401: Obtain frequency response difference curve information that is of the error microphone and the reference microphone and that respectively corresponds to the $N_1$ groups of filtering parameters.

In this embodiment, a group of filtering parameters is used as an example. A method for obtaining frequency response difference curve information that is of the error microphone and the reference microphone and that respectively corresponds to one group of filtering parameters may include: setting filtering parameters of the semi-open ANC earphone as the group of filtering parameters, collecting a first signal by using the error microphone of the semi-open ANC earphone, and collecting a second signal by using the reference microphone of the semi-open ANC earphone; determining frequency response curve information of the error microphone and frequency response curve information of the reference microphone based on the first signal and the second signal, and determining the frequency response difference curve information of the error microphone and the reference microphone. The frequency response difference curve information of the error microphone and the reference microphone is a difference between the frequency response curve information of the error microphone and the frequency response curve information of the reference microphone.

Step 1402: Determine, in $N_1$ pieces of frequency response difference curve information corresponding to the $N_1$ groups of filtering parameters, a frequency response difference curve that has a minimum amplitude and that corresponds to a target frequency band as a target frequency response difference curve.

Step 1403: Determine a group of filtering parameters corresponding to the target frequency response difference curve information as the first group of filtering parameters.

Figure 15:
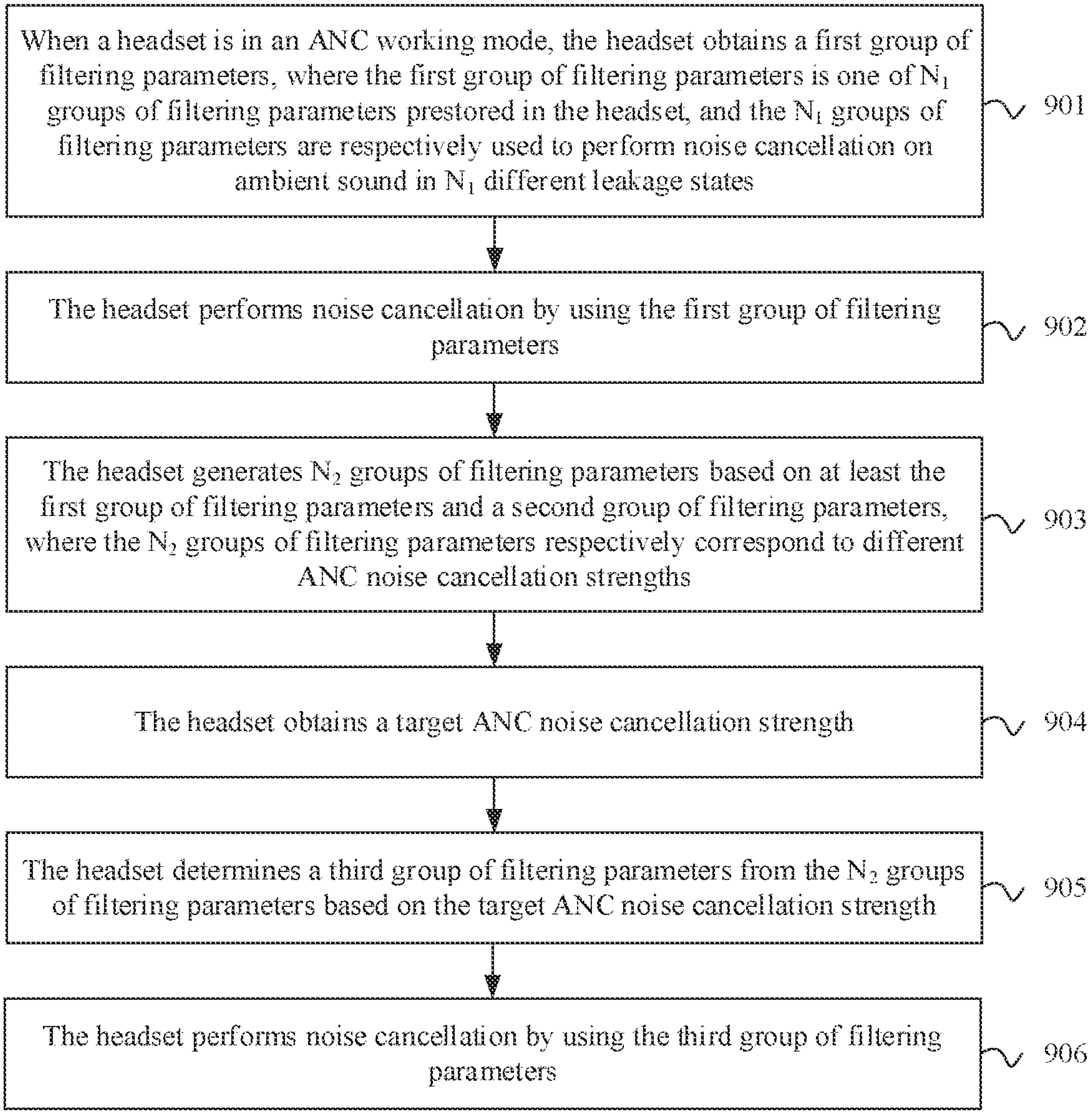
FIG. 15 is a schematic diagram of an ANC method according to an embodiment.

Optionally, with reference to FIG. 9, as shown in FIG. 15, the ANC method provided in this embodiment further includes step 903.

Step 903: The headset generates $N_2$ groups of filtering parameters based on at least the first group of filtering parameters and a second group of filtering parameters. The $N_2$ groups of filtering parameters respectively correspond to different ANC noise cancellation strengths.

The second group of filtering parameters is one of the $N_1$ groups of filtering parameters prestored in the headset. The second group of filtering parameters is used to perform noise cancellation on ambient sound in a state with a minimum leakage degree in the $N_1$ leakage states.

It may be understood that the foregoing $N_1$ groups of filtering parameters are used to perform noise cancellation on ambient sound in the $N_1$ leakage states. Optionally, leakage degrees corresponding to the $N_1$ leakage states increase sequentially. The foregoing second group of filtering parameters is a group of filtering parameters corresponding to the leakage state with the minimum leakage degree.

In this embodiment, the step 903 may be implemented by using step 9031.

Step 9031: The headset performs interpolation on the first group of filtering parameters and the second group of filtering parameters to generate the $N_2$ groups of filtering parameters.

In this embodiment, it is assumed that one group of filtering parameters includes K parameters. When the $N_2$ groups of filtering parameters are generated, the first group of filtering parameters is used as an $(N_2)^{th}$ group of filtering parameters in the $N_2$ groups of filtering parameters, and is denoted as $P_{N_2,1}$, $P_{N_2,2}$, . . . , and $P_{N_2,K}$. The second group of filtering parameters is used as a first group of filtering parameters in the $N_2$ groups of filtering parameters, and is denoted as $P_{1,1}$, $P_{1,2}$, . . . , and $P_{1,K}$. Linear interpolation is performed on the first group of filtering parameters and the $(N_2)^{th}$ group of filtering parameters by using a linear interpolation method, and (N−2) groups of new filtering parameters are inserted. It should be understood that the first group of filtering parameters, the (N−2) groups of filtering parameters obtained through interpolation, and the second group of filtering parameters form the $N_2$ groups of filtering parameters.

Specifically, an $i^{th}$ group of filtering parameters is determined based on the following formula, where a value of i is 2, 3, . . . , or $N_2-1$.

$$P_{i,1} = P_{1,1} + (i-1)\times\Delta 1, \quad \text{where } \Delta 1 = \left(P_{N_2,1} - P_{1,1}\right)/(N_2-1)$$

$$P_{i,2} = P_{1,2} + (i-1)\times\Delta 2, \quad \text{where } \Delta 2 = \left(P_{N_2,2} - P_{1,2}\right)/(N_2-1)$$

$$\ldots$$

$$P_{i,K} = P_{1,K} + (i-1)\times\Delta K, \quad \text{where } \Delta K = \left(P_{N_2,K} - P_{1,K}\right)/(N_2-1)$$

It should be understood that Δ1, Δ2, . . . , and ΔK are respectively step factors of K parameters in a group of filtering parameters.

In conclusion, i is 2, 3, . . . , or $N_2-1$, and $N_2$ groups of filtering parameters may be obtained through interpolation.

It should be noted that the step 902 and the 903 are not subject to a specific sequence in this embodiment. The step 902 may be performed before the step 903, or the step 903 may be performed before the step 902, or the step 902 and the step 903 may be simultaneously performed.

Optionally, as shown in FIG. 15, after the foregoing step 903, the ANC method provided in this embodiment further includes step 904 to step 906.

Step 904: The headset obtains a target ANC noise cancellation strength.

Optionally, in this embodiment, the target ANC noise cancellation strength may be determined by the user performing a subjective test based on the terminal, or determined by the headset, or determined by the terminal. When the target ANC noise cancellation strength is determined by the headset, the headset determines the target ANC noise cancellation strength based on a status of current ambient noise. For example, when a current environment is quiet, the headset adaptively selects a low ANC noise cancellation strength based on a status of ambient noise; or when a current environment is noisy, the headset adaptively selects a high ANC noise cancellation strength based on a status of ambient noise.

Step 905: The headset determines a third group of filtering parameters from the $N_2$ groups of filtering parameters based on the target ANC noise cancellation strength.

In this embodiment, there is a correspondence between the ANC noise cancellation strength and the $N_2$ groups of filtering parameters. Noise cancellation effect varies with noise cancellation strengths corresponding to the $N_2$ groups of filtering parameters. The third group of filtering parameters corresponding to the target ANC noise cancellation strength is determined from the $N_2$ groups of filtering parameters based on the correspondence between the ANC noise cancellation strength and the $N_2$ groups of filtering parameters.

Step 906: The headset performs noise cancellation by using the third group of filtering parameters.

It should be understood that, based on the step 904 and the step 905, the foregoing first group of filtering parameters is replaced with the third group of filtering parameters, that is, the sound signal collected by the reference microphone of the headset and the sound signal collected by the error microphone of the headset are processed by using the third group of filtering parameters, to generate an anti-noise signal. The anti-noise signal can weaken some ambient noise signals in the ear canal, to implement noise cancellation on ambient sound.

In conclusion, in the ANC method provided in this embodiment, after the first group of filtering parameters is determined, the $N_2$ groups of filtering parameters adapted to a current user are generated based on the first group of filtering parameters and the second group of filtering parameters, and the third group of filtering parameters corresponding to the target ANC noise cancellation strength is further determined from the $N_2$ groups of filtering parameters, to perform noise cancellation by using the third group of filtering parameters. In this way, an appropriate ANC noise cancellation strength can be selected based on a status of ambient noise, so that noise cancellation effect better meets a user requirement.

Figure 16:
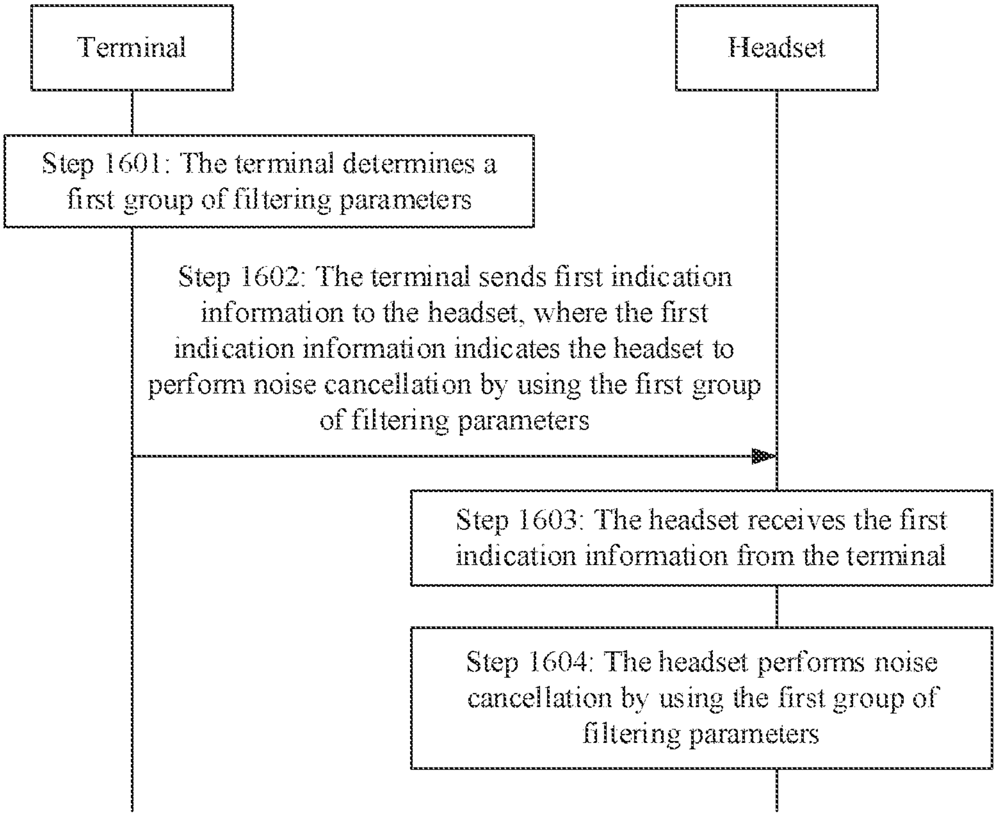
FIG. 16 is a schematic diagram of an ANC method according to an embodiment.

The following describes content in the foregoing second phase (the process of determining the group of filtering parameters suitable for the specific user) from a perspective of interaction between the terminal and the headset. For example, as shown in FIG. 16, the ANC method provided in this embodiment includes step 1601 to step 1604.

Step 1601: The terminal determines a first group of filtering parameters.

The first group of filtering parameters is one of $N_1$ groups of filtering parameters prestored in the headset. The $N_1$ groups of filtering parameters are respectively used to perform noise cancellation on ambient sound in $N_1$ leakage states. The $N_1$ leakage states are formed by the headset and $N_1$ different ear canal environments. In a current wearing state of the headset, for same ambient noise, noise cancellation effect obtained when the first group of filtering parameters is applied to the headset is better than noise cancellation effect obtained when another filtering parameter in the $N_1$ groups of filtering parameters is applied to the headset. $N_1$ is a positive integer greater than or equal to 2.

Step 1602: The terminal sends first indication information to the headset. The first indication information indicates the headset to perform noise cancellation by using the first group of filtering parameters.

Step 1603: The headset receives the first indication information from the terminal.

In this embodiment, after receiving the first indication information sent by the terminal, the headset determines, from the $N_1$ groups of filtering parameters stored in the headset, the first group of filtering parameters indicated by the first indication information.

Step 1604: The headset performs noise cancellation by using the first group of filtering parameters.

According to the ANC method provided in this embodiment, a group of filtering parameters (that is, the first group of filtering parameters) that matches a current leakage state may be determined based on a leakage state formed by the headset and an ear canal environment of a user when the user wears the headset, and noise cancellation is performed on ambient sound based on the group of filtering parameters. This can meet a personalized noise cancellation requirement of the user, and improve noise cancellation effect.

In an implementation, the foregoing step 1601 (that is, the terminal determines the first group of filtering parameters) may be implemented by the terminal executing a matching algorithm, and further includes the following step 16011*a* to step 16011*e*, or step 16012*a* to step 16012*e*, or step 16013*a* to step 16013*e*, or step 16014*a* to step 16014*d*, or step 16015*a* to step 16015*d*.

Optionally, a method for determining the first group of filtering parameters by the terminal includes step 16011*a* to step 16011*e*.

Step 16011*a*: The terminal receives a first signal collected by the error microphone of the headset and a second signal collected by the reference microphone of the headset, and obtains a downlink signal of the headset.

Step 16011*b*: The terminal determines a residual signal of the error microphone based on the first signal and the second signal.

Step 16011*c*: The terminal determines current frequency response curve information of a secondary path based on the residual signal of the error microphone and the downlink signal.

Step 16011*d*: The terminal determines, from preset frequency response curve information of $N_1$ secondary paths, target frequency response curve information matching the current frequency response curve information.

Step 16011*e*: The terminal determines filtering parameters corresponding to the target frequency response curve information as the first group of filtering parameters. The $N_1$ groups of filtering parameters correspond to the frequency response curve information of the $N_1$ secondary paths.

Optionally, a method for determining the first group of filtering parameters by the terminal includes step 16012*a* to step 16012*e*.

Step 16012*a*: The terminal receives a first signal collected by the error microphone of the headset and a second signal collected by the reference microphone of the headset, and obtains a downlink signal of the headset.

Step 16012*b*: The terminal determines a residual signal of the error microphone based on the first signal and the second signal.

Step 16012*c*: The terminal determines current frequency response curve information of a secondary path based on the residual signal of the error microphone and the downlink signal.

Step 16012*d*: The terminal determines, from preset frequency response curve information of $N_1$ secondary paths, target frequency response curve information matching the current frequency response curve information.

Step 16012*e*: The terminal determines filtering parameters corresponding to the target frequency response curve information as the first group of filtering parameters. The $N_1$ groups of filtering parameters correspond to the frequency response curve information of the $N_1$ secondary paths.

Optionally, a method for determining the first group of filtering parameters by the terminal includes step 16013*a* to step 16013*e*.

Step 16013*a*: The terminal receives a first signal collected by the error microphone of the headset and a second signal collected by the reference microphone of the headset, and obtains a downlink signal of the headset.

Step 16013*b*: The terminal determines a residual signal of the error microphone based on the first signal and the second signal.

Step 16013*c*: The terminal determines current frequency response curve information of a secondary path based on the residual signal of the error microphone and the downlink signal.

Step 16013*d*: The terminal determines, from preset frequency response curve information of $N_1$ secondary paths, target frequency response curve information matching the current frequency response curve information.

Step 16013*e*: The terminal determines filtering parameters corresponding to the target frequency response curve information as the first group of filtering parameters. The $N_1$ groups of filtering parameters correspond to the frequency response curve information of the $N_1$ secondary paths.

Optionally, a method for determining the first group of filtering parameters by the terminal includes step 16014*a* to step 16014*d*.

Step 16014*a*: The terminal receives a first signal collected by the error microphone of the headset and a second signal collected by the reference microphone of the headset.

Step 16014*b*: The terminal determines current frequency response curve information of a primary path based on the first signal and the second signal.

Step 16014*c*: The terminal determines, from preset frequency response curve information of $N_1$ primary paths, target frequency response curve information matching the current frequency response curve information.

Step 16014*d*: The terminal determines filtering parameters corresponding to the target frequency response curve information as the first group of filtering parameters. The $N_1$ groups of filtering parameters correspond to the frequency response curve information of the $N_1$ primary paths.

Optionally, a method for determining the first group of filtering parameters by the terminal includes step 16015*a* to step 16015*d*.

Step 16015*a*: The terminal receives a first signal collected by the error microphone of the headset and a second signal collected by the reference microphone of the headset, and obtains a downlink signal of the headset.

Step 16015*b*: The terminal determines current frequency response curve information of a primary path based on the first signal and the second signal, determines current frequency response curve information of a secondary path based on the first signal and the downlink signal, and determines current frequency response ratio curve information.

The current frequency response ratio curve information is a ratio of the current frequency response curve information of the primary path to the current frequency response curve information of the secondary path.

Step 16015*c*: The terminal determines, from $N_1$ pieces of preset frequency response ratio curve information, target frequency response ratio curve information matching the current frequency response ratio curve information.

Step 16015*d*: The terminal determines filtering parameters corresponding to the target frequency response ratio curve information as the first group of filtering parameters. The $N_1$ groups of filtering parameters correspond to the $N_1$ pieces of frequency response ratio curve information.

It should be understood that the ANC method provided in this embodiment is applied to a scenario in which the headset is in the ANC working mode. It can be learned that the headset being in the ANC working mode is a trigger condition for determining the first group of filtering parameters. In this example, a method for enabling the headset to work in the ANC working mode includes the following manner 1 or manner 2.

The foregoing manner 1 includes step A1 to step A3.

Step A1: The terminal receives an operation for a first option on a first interface of the terminal. The first interface is an interface for setting a working mode of the headset.

Step A2: The terminal sends a first instruction to the headset in response to the operation for the first option. The first instruction controls the headset to work in the ANC working mode.

In an application scenario of this embodiment, an application (App) corresponding to the headset is installed on the terminal. After the user starts the application and establishes a communication connection to the headset (a left earphone and/or a right earphone), the user performs a corresponding operation on the first interface displayed by the terminal, to control the headset to be in different working modes, for example, a general mode or an ANC mode. It should be understood that the general mode herein is a mode in which a noise cancellation function is not enabled.

Optionally, the first operation may be a touchscreen operation, a button operation, or the like. This is not specifically limited in this embodiment of the present disclosure. For example, the touchscreen operation is a press operation, a touch and hold operation, a slide operation, a tap operation, a floating operation (an operation performed by the user near a touchscreen), or the like performed by the user on the touchscreen of the terminal. The button operation corresponds to an operation such as a tap operation, a double-tap operation, a touch and hold operation, or a combined-button operation of the user on a button such as a power button, a volume button, or a home button of the terminal.

Figure 17:
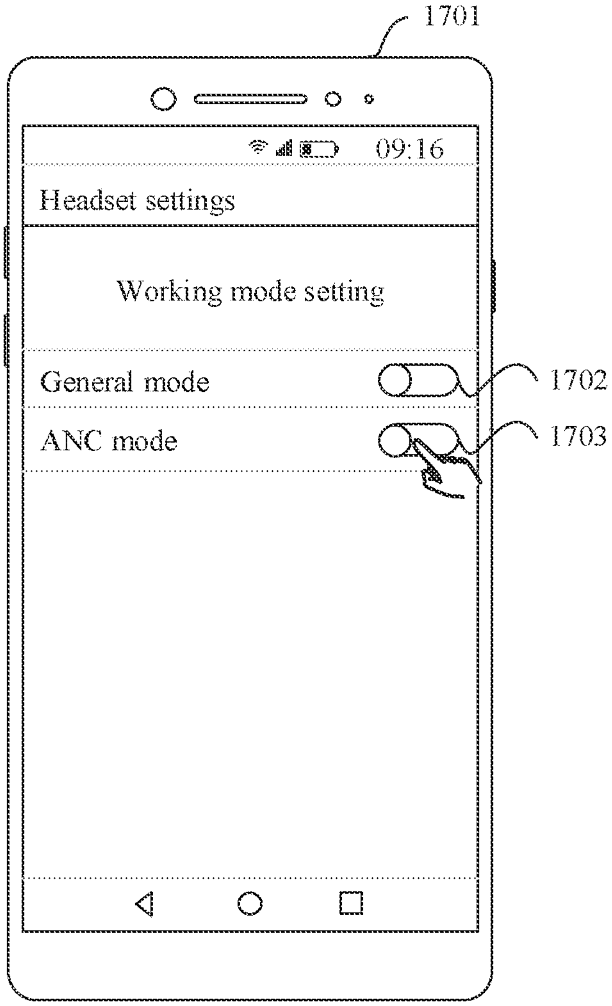
FIG. 17 is a schematic diagram of display effect in an ANC method according to an embodiment.

An interface 1701 shown in FIG. 17 is an example of the foregoing first interface. The first interface includes different options for setting the working mode of the headset. The user sets the working mode of the headset by selecting different options. It should be understood that the first option corresponds to the ANC working mode. For example, the first interface 1701 includes a "general mode" option 1702 and an "ANC mode" option 1703, and the "ANC mode" option 1703 is the first option. When the user selects the "ANC mode" option 1703 on the first interface 1701, for example, the user taps the "ANC mode" option 1703, and the headset may be controlled to work in the ANC working mode.

Step A3: The headset receives the first instruction. The headset works in the ANC working mode.

Optionally, in another implementation, the first instruction may alternatively be an operation instruction performed by the user on the headset. For example, the headset has a button or a button for enabling an ANC function. After the user wears the headset, the user presses the button (which is equivalent to the first instruction) for enabling the ANC function, and the headset enters the ANC working mode.

The foregoing manner 2 includes step B1 to step B2.

Step B1: Detect whether the headset is in an ear.

In this embodiment, an in-ear detection technology is used to detect whether the headset is in the ear. For example, with reference to the description of the structure of the headset in the foregoing embodiment, it can be learned that the headset includes an optical proximity sensor, and whether the headset is in the ear may be detected based on a signal collected by the optical proximity sensor.

Step B2: When it is detected that the headset is in the ear, the headset works in the ANC working mode.

In this embodiment, in an application scenario, when the headset detects that the headset is in the ear, the headset may automatically enable the ANC function, so that the headset works in the ANC working mode. Optionally, when it is detected that the headset is in the ear, the headset plays an in-ear prompt tone, and after a preset time period in which the prompt tone ends (indicating that the headset is stable in the ear), the headset works in the ANC working mode.

In conclusion, the terminal performs the step of determining the first group of filtering parameters, or the headset performs the step of obtaining the first group of filtering parameters.

Optionally, another trigger condition for determining (or obtaining) the first group of filtering parameters is as follows: When the headset is already in the ANC working mode, the user performs an auxiliary operation on the terminal or the headset based on an actual requirement, to trigger the terminal to determine the first group of filtering parameters or the headset to obtain the first group of filtering parameters.

In an implementation, in the foregoing manner 1, when the ANC function is enabled, the headset plays a prompt tone indicating that ANC is enabled, and determines the first group of filtering parameters in a process of playing the in-ear prompt tone, that is, uses the in-ear prompt tone as a test signal. The user determines the first group of filtering parameters based on subjective listening experience.

In another implementation, when it is detected that the headset is in the ear, the headset works in the ANC working mode, and the headset plays an in-ear prompt tone at the same time. The headset determines the first group of filtering parameters in a process of playing the in-ear prompt tone, that is, uses the in-ear prompt tone as a test signal. The user determines the first group of filtering parameters based on subjective listening experience.

Optionally, after the terminal receives the operation for the first option on the first interface of the terminal, the ANC method provided in this embodiment further includes: display an ANC control list. The ANC control list includes at least one of the following options: a first control option, a second control option, or a third control option. The first control option is used to trigger determining of the first group of filtering parameters. The second control option is used to trigger generation of $N_2$ groups of filtering parameters. The third control option is used to trigger redetermining of the first group of filtering parameters.

Figure 18A:
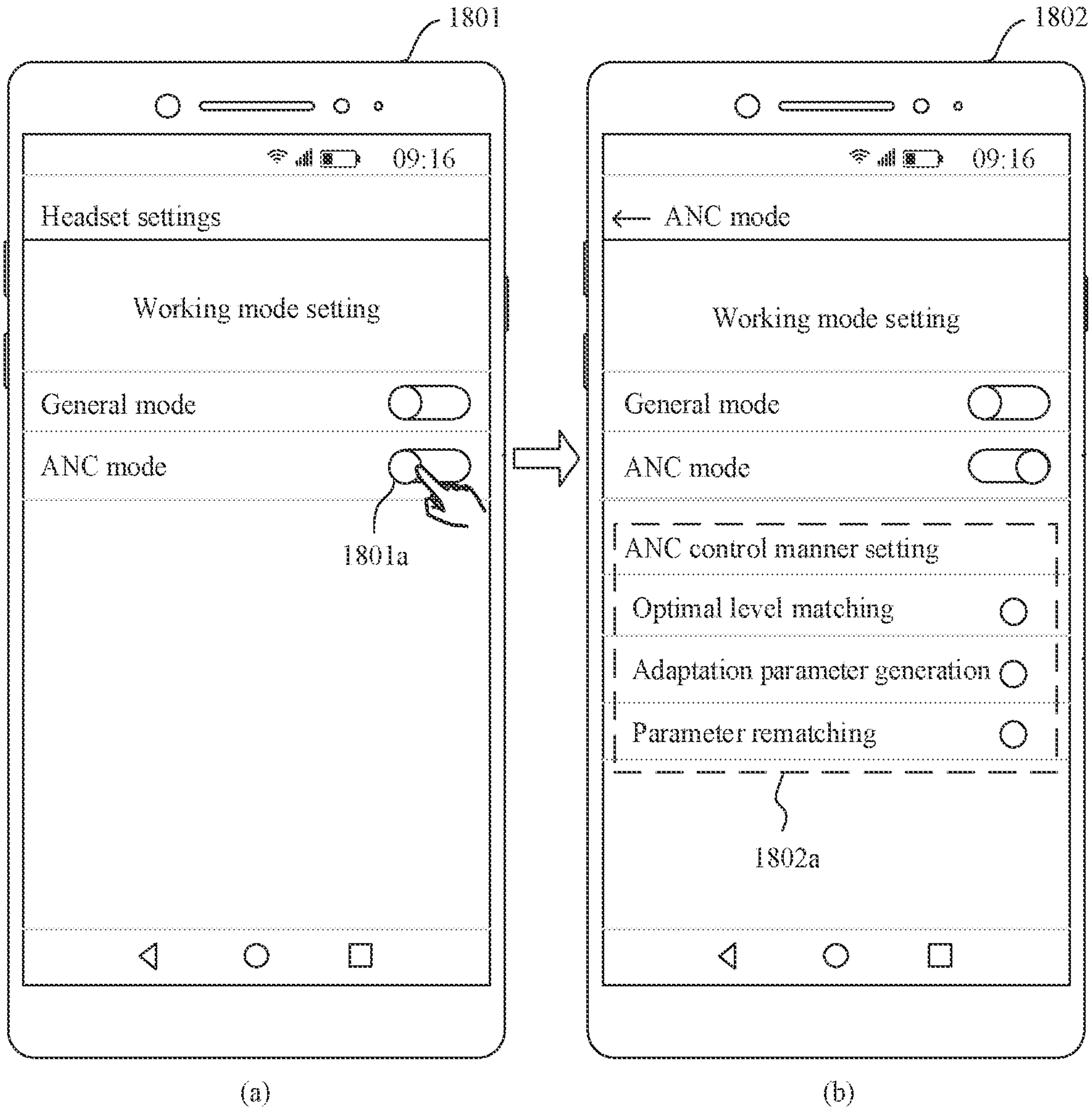
FIG. 18A is a schematic diagram of display effect in an ANC method according to an embodiment.

In an implementation, FIG. 18A is a schematic diagram of display effect of the ANC control list. An interface shown in (a) in FIG. 18A is a first interface 1801, and the first option is an "ANC mode" option 1801*a* on the first interface. After the user taps the "ANC mode" option 1801*a* on the first interface 1801 shown in (a) in FIG. 18A, the terminal displays an interface 1802 shown in (b) in FIG. 18A. It can be learned that on the interface 1802, the ANC control list 1802*a* is displayed below the "ANC mode" option. In the ANC control list 1802*a*, the first control option is an "optimal level matching" option, the second control option is an "adaptation parameter generation" option, and the third control option is a "parameter rematching" option. In this way, the user may select an ANC control manner from the ANC control list based on a requirement. Certainly, the ANC control list may further include another option used to set the ANC control manner. This is specifically determined based on an actual requirement, and is not limited in this embodiment.

Figure 18B:
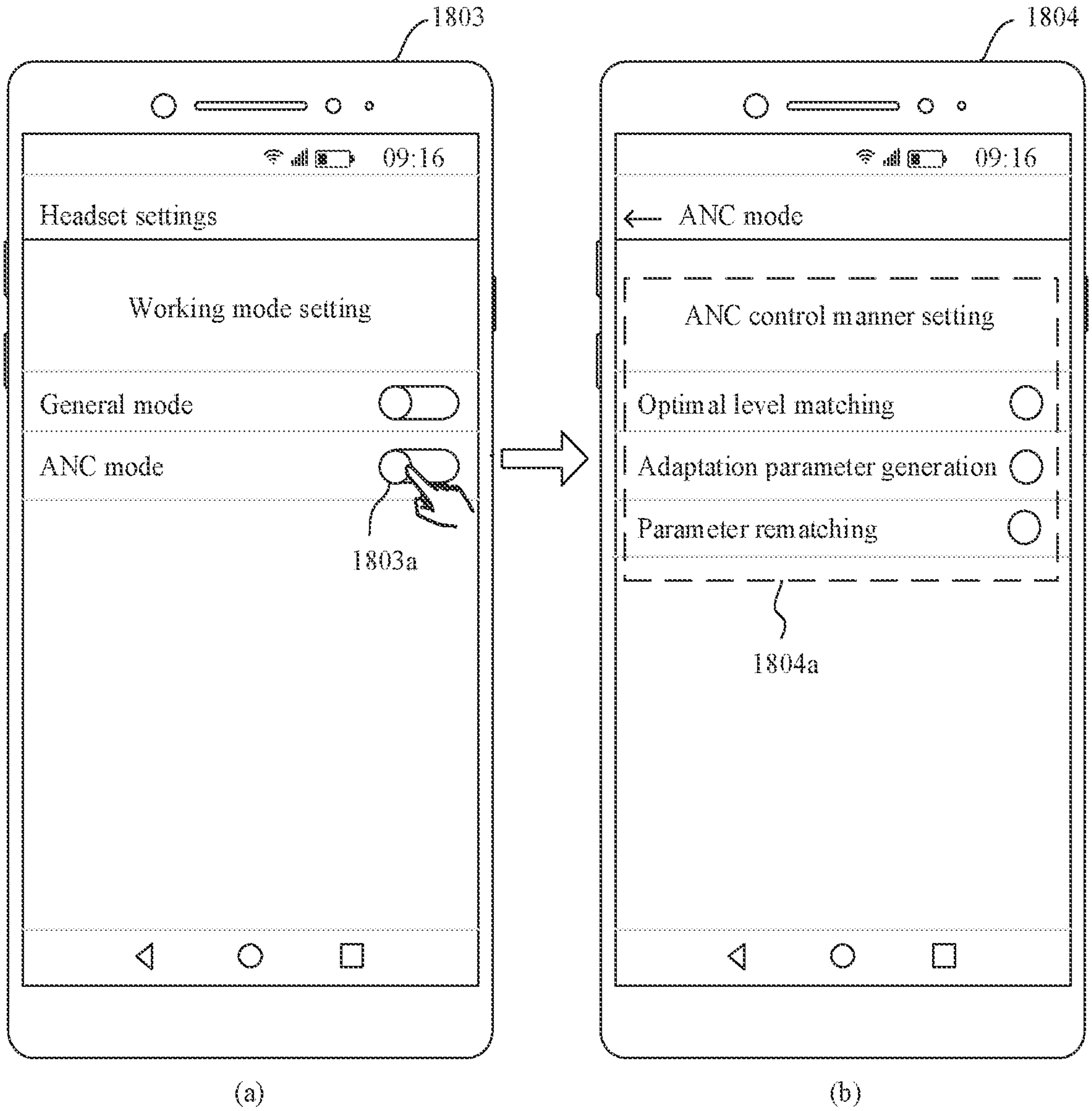
FIG. 18B is a schematic diagram of display effect in an ANC method according to an embodiment.

In another implementation, FIG. 18B is a schematic diagram of other display effect of the ANC control list. An interface shown in (a) in FIG. 18B is a first interface 1803, and the first option is an "ANC mode" option 1803*a* on the first interface 1803. After the user taps the "ANC mode" option 1803*a* on the first interface 1803 shown in (a) in FIG. 18B, the terminal displays an interface 1804 shown in (b) in FIG. 18B. The interface 1804 includes an ANC control list

1804*a*, and the ANC control list 1804*a* includes an "optimal level matching" option, an "adaptation parameter generation" option, and a "parameter rematching" option.

In this embodiment, the step 1601 (that is, the terminal determines the first group of filtering parameters) may include step 1601*a* to step 1601*c*.

Step 1601*a*: The terminal receives an operation for the first control option in the ANC control list, and displays a first control. The first control includes $N_1$ preset locations. The $N_1$ preset locations correspond to the $N_1$ groups of filtering parameters.

Step 1601*b*: The terminal receives an operation for a first location in the first control. The first location is one of the $N_1$ preset locations.

In this embodiment, noise cancellation effect obtained when a group of filtering parameters corresponding to the first location is applied to the headset is better than noise cancellation effect obtained when a filtering parameter corresponding to another location in the $N_1$ preset locations is applied to the headset.

Step 1601*c*: The terminal determines, in response to the operation for the first location, the group of filtering parameters corresponding to the first location as the first group of filtering parameters.

Figure 19A:
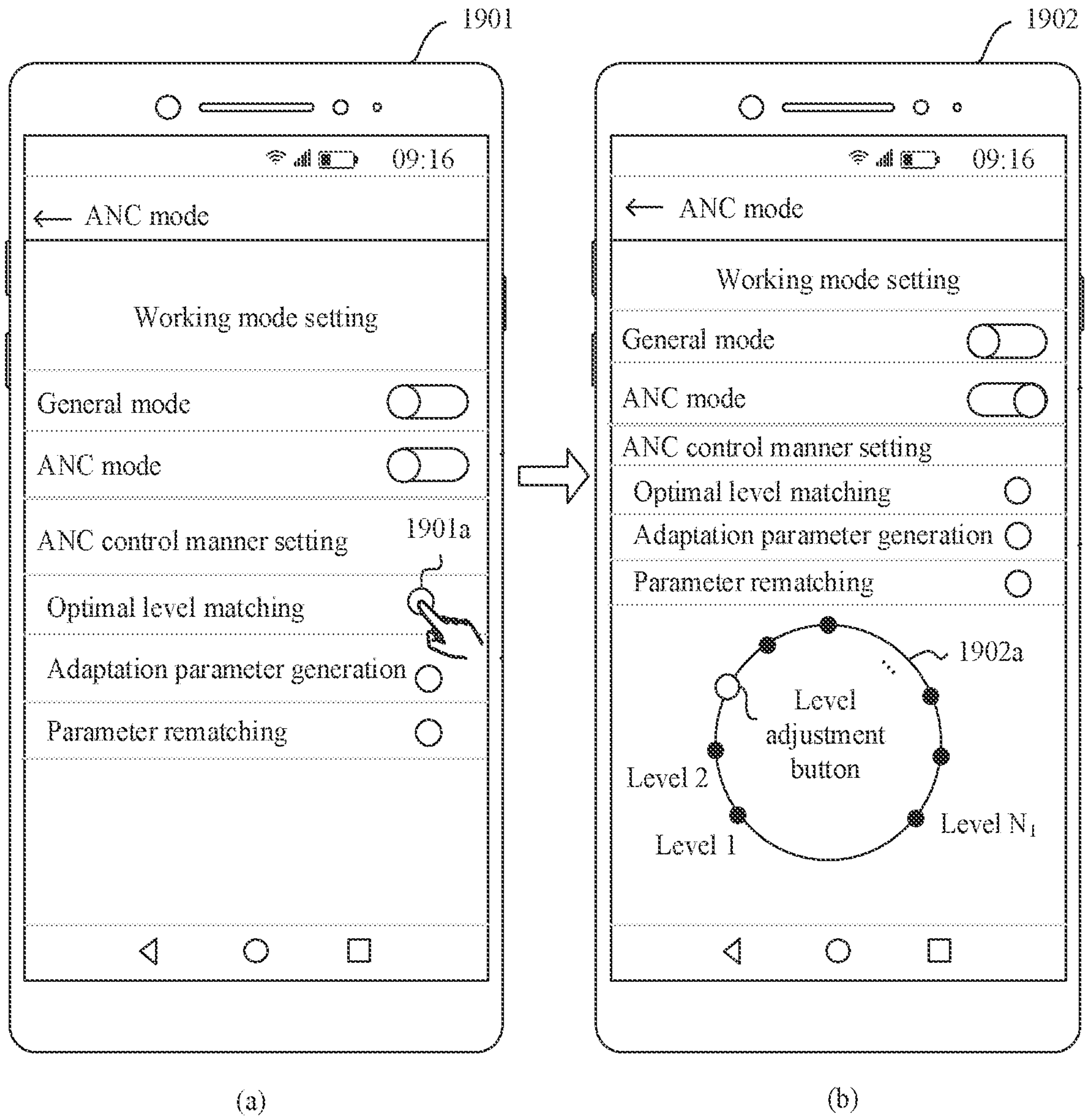
FIG. 19A is a schematic diagram of display effect in an ANC method according to an embodiment.

In an implementation, FIG. 19A is a schematic diagram of display effect of the foregoing first control. After the user selects the "ANC mode" 1703 in FIG. 17, the terminal displays an interface 1901 shown in (a) in FIG. 19A (that is, (b) in FIG. 18A), and the interface 1901 includes an ANC control list. Further, after the user selects a first control option on the interface 1901, for example, an "optimal level matching" option 1901*a*, the terminal displays an interface 1902 shown in (b) in FIG. 19A. On the interface 1902, a first control 1902*a* is displayed below the ANC control list. Optionally, the first control 1902*a* may be in a disk shape (the first control 1902*a* may also be referred to as a level disk). The first control 1902*a* includes a level adjustment button and $N_1$ levels. Therefore, the user performs an operation in the first control 1902*a* to determine the first group of filtering parameters.

Figure 19B:
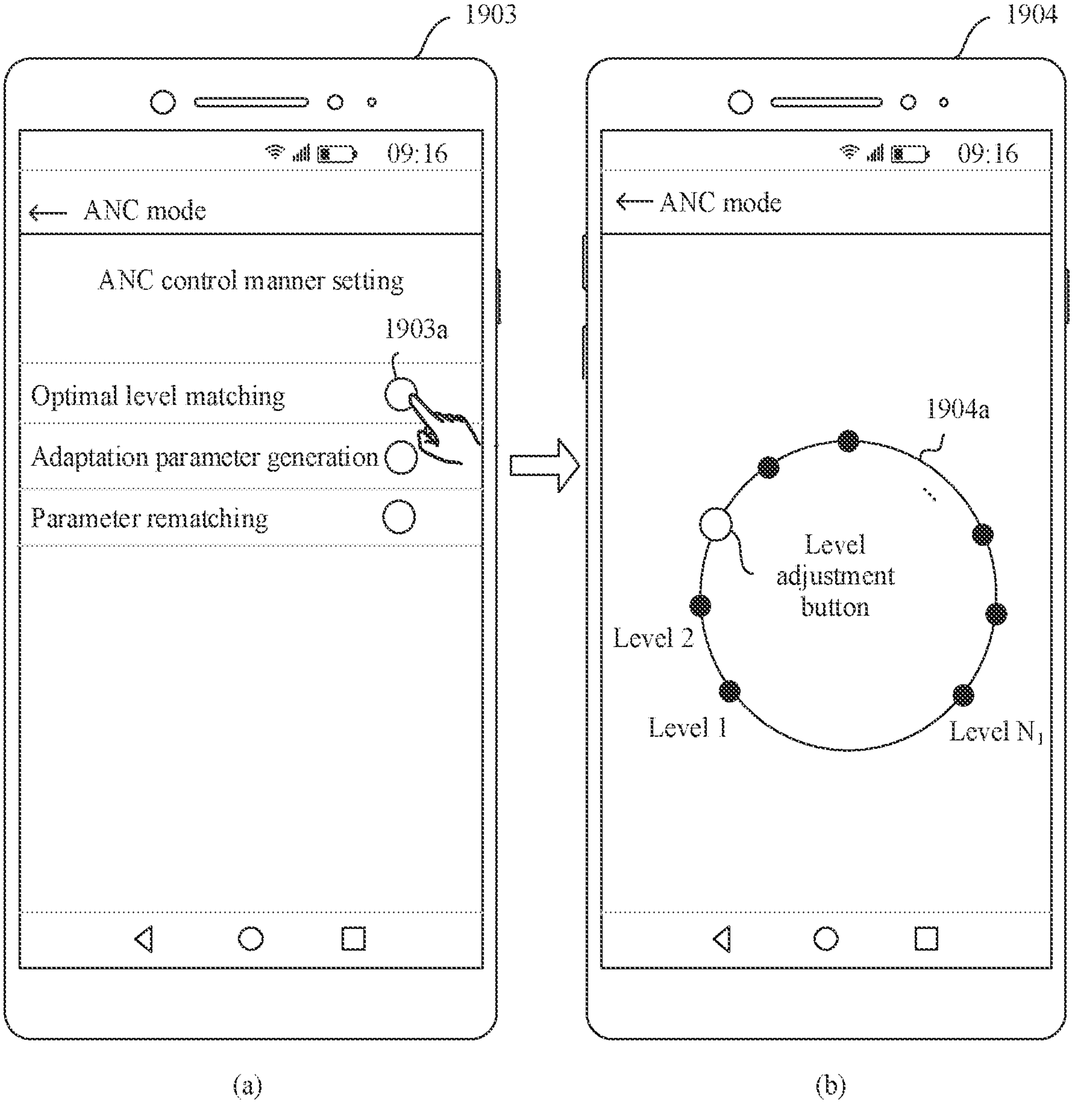
FIG. 19B is a schematic diagram of display effect in an ANC method according to an embodiment.

In another implementation, FIG. 19B is a schematic diagram of other display effect of the foregoing first control. After the user selects the "ANC mode" 1703 in FIG. 17, the terminal displays an interface 1903 shown in (a) in FIG. 19B (that is, (b) in FIG. 18B), and the interface 1903 includes an ANC control list. Further, after the user selects a first control option on the interface 1903, for example, an "optimal level matching" option 1903*a*, the terminal displays an interface 1904 shown in (b) in FIG. 19B. The interface 1904 includes a first control 1904*a*. Similarly, the first control 1904*a* may be in a disk shape. The first control 1904*a* includes a level adjustment button and $N_1$ levels. Therefore, the user performs an operation in the first control 1904*a* to determine the first group of filtering parameters.

Optionally, after the user selects the "optimal level matching" option, the headset or the terminal executes the matching algorithm to determine the first group of filtering parameters, and presents, in the displayed first control, a level corresponding to the first group of filtering parameters. For example, a location that corresponds to the level adjustment button and that is in the first control is a current level corresponding to the first group of filtering parameters. Refer to (b) in FIG. 19A and (b) in FIG. 19B.

Optionally, the $N_1$ levels are distributed in the first control, and the first control may be in a disk shape. In this case, the $N_1$ levels are arranged in the first control in a disk shape. Alternatively, the first control may be in a strip shape, and the $N_1$ levels are arranged in the first control in a strip shape. Certainly, the first control may alternatively be a control in another shape. This is not limited in this embodiment.

In this embodiment, the user slides the level adjustment button in the first control, so that the level adjustment button traverses the $N_1$ levels, that is, traverses the $N_1$ preset locations. The corresponding noise cancellation effect varies with different levels. If the foregoing level adjustment button is adjusted to the first location, the user experiences best effect of audio played by the headset, and the user no longer adjusts the location of the level adjustment button, so that filtering parameters corresponding to the location that is subjectively perceived by the user and that has best noise cancellation effect are determined as the first group of filtering parameters.

In this embodiment, the user performs an operation for the first location in the first control to determine the first group of filtering parameters. With reference to a display manner in FIG. 19B, as shown in (a) in FIG. 20, in an implementation, when the user wears the headset to listen to audio, the operation for the first location may be an operation in which the user slides a level adjustment button 2001 to the first location and stays for duration greater than preset duration (for example, 10 seconds). For example, if the user slides a level adjustment button 2003 to the first location, the user listens to currently played audio by using the headset, and the user experiences good sound effect of the current audio (meeting a user requirement). The user no longer slides the level adjustment button 2001, and the level adjustment button 2001 stays at the first location for more than 10 seconds. In this case, the terminal detects this operation, and determines, in response to the operation for the first location, the group of filtering parameters corresponding to the first location as the first group of filtering parameters.

Figure 20:
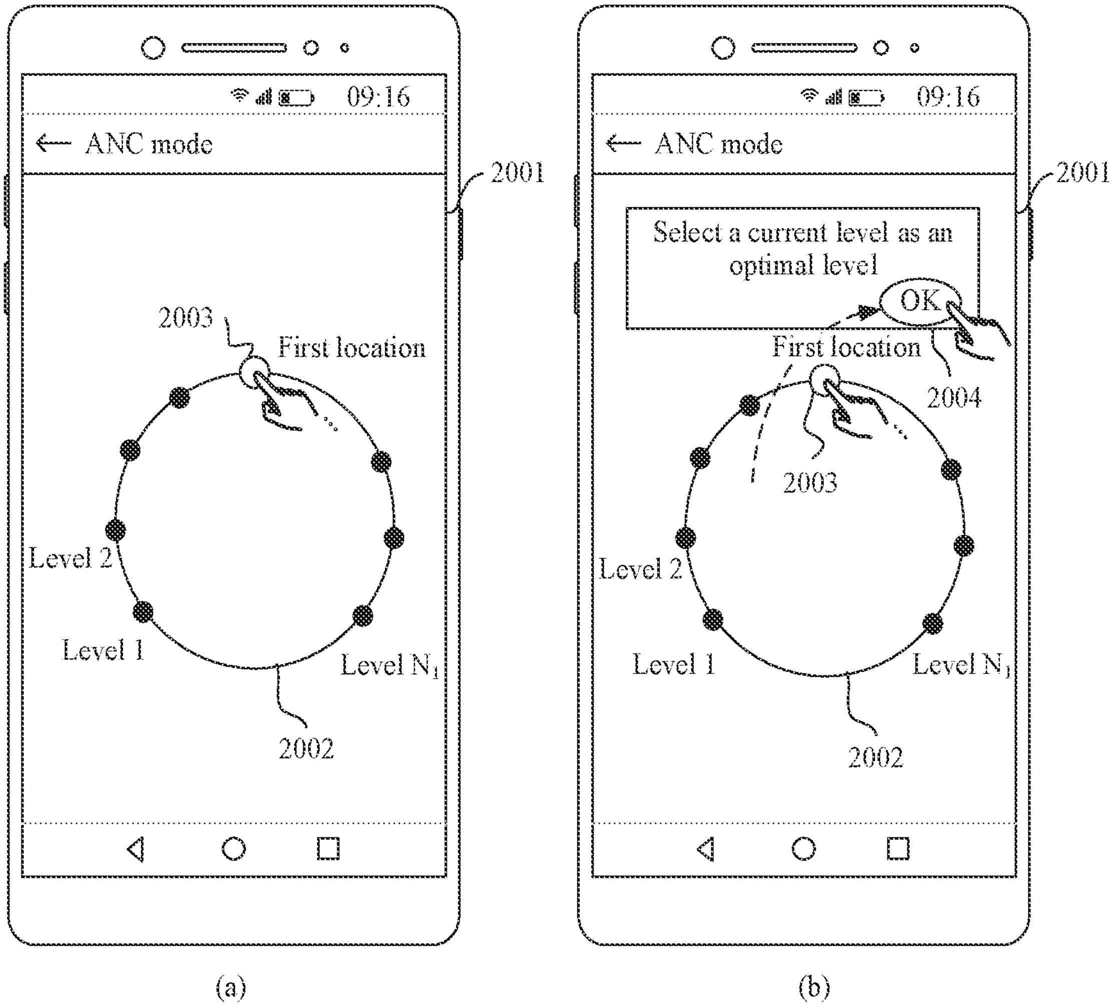
FIG. 20 is a schematic diagram of display effect in an ANC method according to an embodiment.

With reference to a display manner in FIG. 19B, as shown in (b) in FIG. 20, in another implementation, the interface on which the first control is located further includes a selection box 2002. When the user wears the headset to listen to audio, the operation for the first location may be an operation in which the user selects an "OK" button in the selection box 2002 after the user slides the level adjustment button 2003 to the first location. For example, if the user slides the level adjustment button 2001 to the first location, the user listens to currently played audio by using the headset, and the user experiences good sound effect of the current audio (meeting a user requirement). The user no longer slides the level adjustment button 2001, and the user taps the OK button in the selection box 2002 to select a current level as an optimal level. In this case, the terminal detects this operation, and determines, in response to the operation for the first location, the group of filtering parameters corresponding to the first location as the first group of filtering parameters.

Optionally, with reference to the ANC control list, the step of obtaining the first group of filtering parameters further includes step C1 to step C3.

Step C1: The terminal receives an operation for the third control option in the ANC control list.

Step C2: The terminal sends a second instruction to the headset in response to the operation for the third control option. The second instruction instructs the headset to obtain the first group of filtering parameters.

It should be understood that the first group of filtering parameters obtained based on an indication of the second instruction is different from a filtering parameter used by the headset before receiving the second instruction.

In this embodiment, in a case, after the first group of filtering parameters is determined, the headset performs noise cancellation based on the first group of filtering parameters. Subsequently, when the headset works, the user may further redetermine, based on an actual situation (for example, noise cancellation effect obtained by using the first group of filtering parameters cannot meet a user requirement), a group of filtering parameters for noise cancellation. In this case, the second instruction may also be sent to instruct the headset to obtain the first group of filtering parameters. In another case, alternatively, in another working phase of the headset, the user may redetermine the first group of filtering parameters based on an actual requirement. This is not limited in this embodiment.

With reference to the interface shown in (b) in FIG. 18A or (b) in FIG. 18B, the "parameter rematching" option in the ANC control list on the interface is the foregoing third control option. If the user taps the "parameter rematching" option, the terminal sends the second instruction to the headset, to instruct the headset to obtain the first group of filtering parameters.

Step C3: The headset receives the second instruction. The headset obtains the first group of filtering parameters.

Optionally, in a manner, a method for obtaining the first group of filtering parameters by the headset is that the headset executes a matching algorithm to determine the first group of filtering parameters from the $N_1$ groups of filtering parameters. In another manner, the terminal displays, in response to the operation for the third control option, the interface including the first control, to redetermine the first group of filtering parameters by performing an operation on the first control.

Figure 21A:
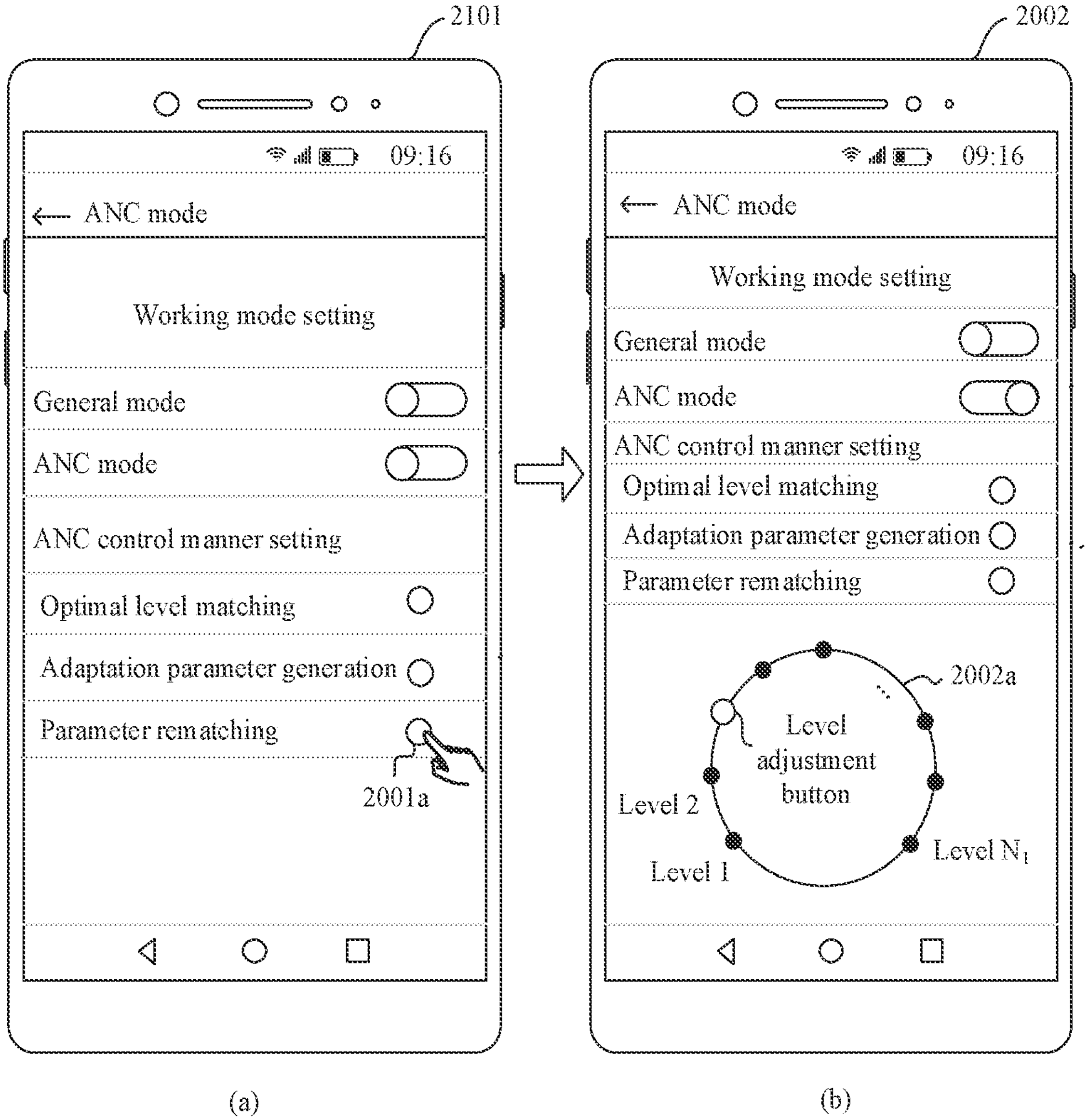
FIG. 21A is a schematic diagram of display effect in an ANC method according to an embodiment.

Refer to FIG. 21A. After the user taps a "parameter rematching" option 2101*a* on an interface 2101 shown in (a) in FIG. 21A, the terminal displays an interface 2102 shown in (b) in FIG. 21A. On the interface 2102, a first control 2102*a* is displayed below an ANC control list, so that the user performs an operation in the first control 2102*a* to redetermine the first group of filtering parameters.

Figure 21B:
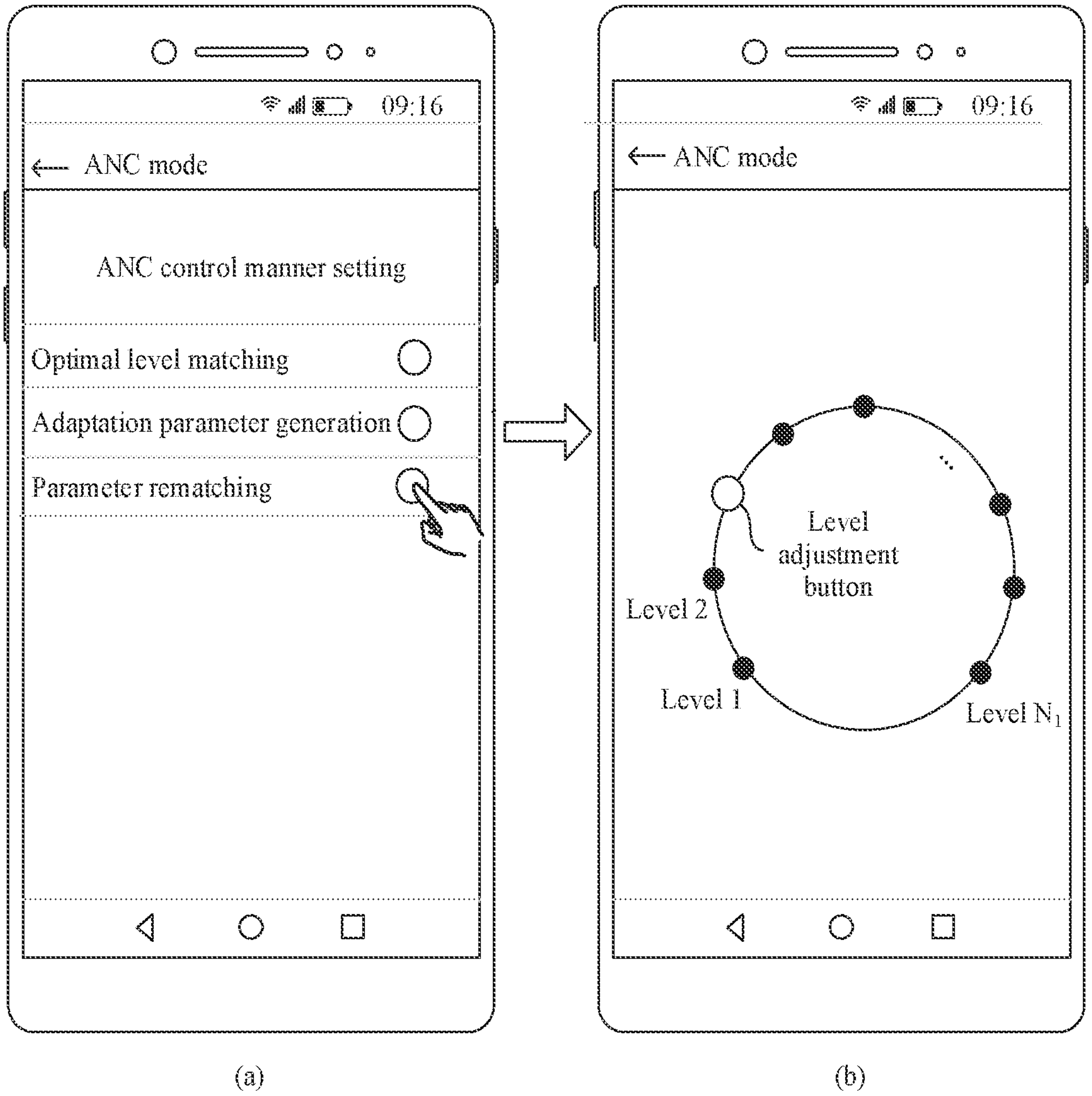
FIG. 21B is a schematic diagram of display effect in an ANC method according to an embodiment.

Refer to FIG. 21B. After the user taps a "parameter rematching" option 2103*a* on an interface 2103 shown in (a) in FIG. 21B, the terminal displays an interface 2104 shown in (b) in FIG. 21B. The interface 2104 includes a first control 2104*a*, so that the user performs an operation in the first control 2104*a* to redetermine the first group of filtering parameters.

Optionally, after the user selects the "parameter rematching" option, the headset or the terminal executes the matching algorithm to determine the first group of filtering parameters, and presents, in the displayed first control, a level corresponding to the first group of filtering parameters. For example, a location that corresponds to the level adjustment button and that is in the first control is a current level corresponding to the first group of filtering parameters. Refer to (b) in FIG. 21A and (b) in FIG. 21B.

In this embodiment, for specific details of obtaining the first group of filtering parameters by the headset, refer to related descriptions in the foregoing method embodiment. Details are not described herein again.

Optionally, the ANC method provided in this embodiment further includes steps D1 to D2.

Step D1: The terminal receives an operation for the third control option in the ANC control list.

Step D2: The terminal redetermines the first group of filtering parameters in response to the operation for the third control option.

For detailed descriptions of the step D2, refer to descriptions of the step 1601 and related content. Details are not described herein again.

Figure 22:
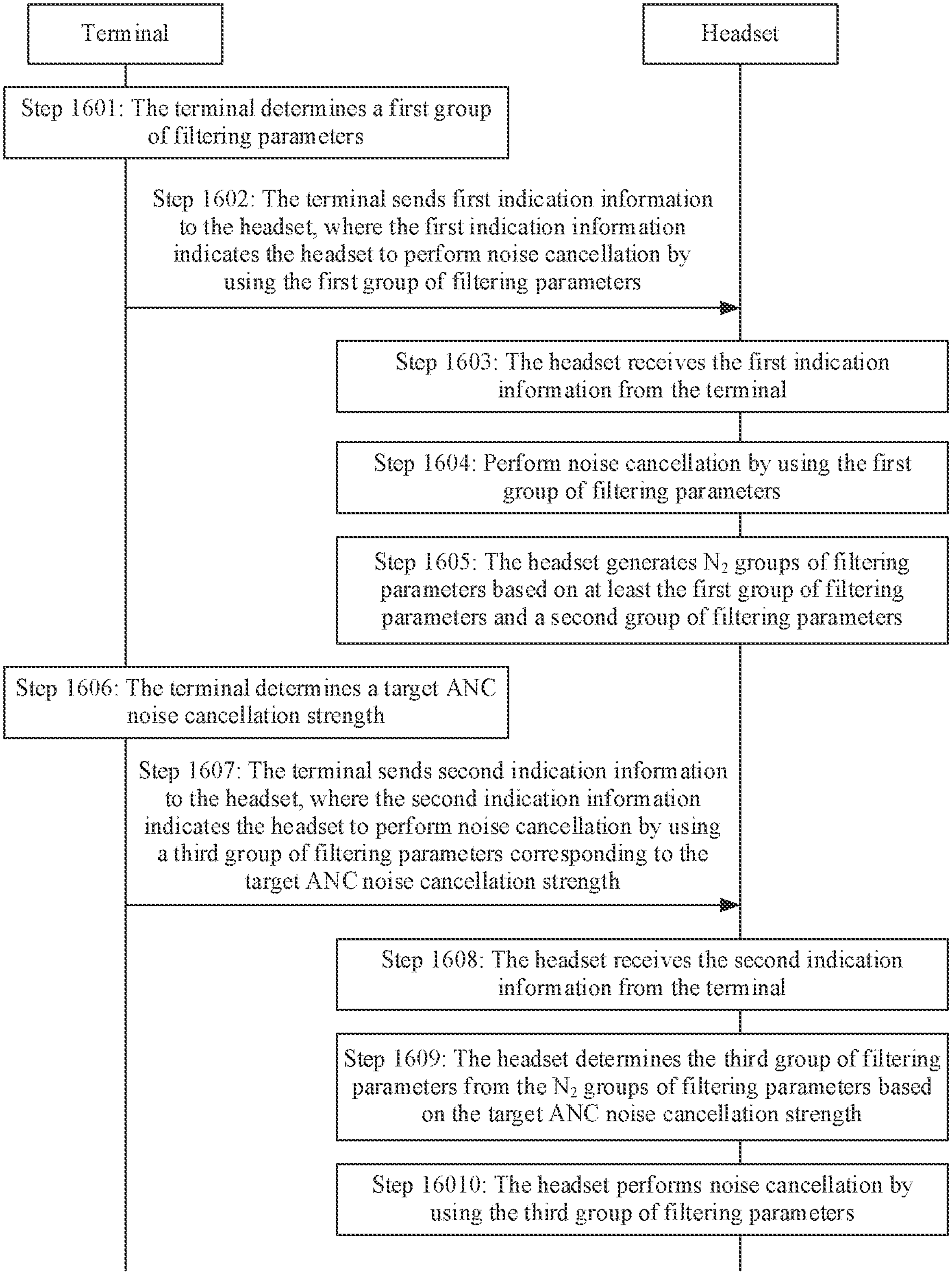
FIG. 22 is a schematic diagram of an ANC method according to an embodiment.

Optionally, with reference to FIG. 16, as shown in FIG. 22, the ANC method provided in this embodiment further includes step 1605 to step 16010.

Step 1605: The headset generates $N_2$ groups of filtering parameters based on at least the first group of filtering parameters and a second group of filtering parameters.

In this embodiment, the $N_2$ groups of filtering parameters respectively correspond to different ANC noise cancellation strengths. The second group of filtering parameters is one of the $N_1$ groups of filtering parameters prestored in the headset. The second group of filtering parameters is used to perform noise cancellation on ambient sound in a state with a minimum leakage degree in the $N_1$ leakage states.

For detailed descriptions of the step 1605, refer to the descriptions of the step 903 (including the step 9031) in the foregoing embodiment. Details are not described herein again.

Optionally, in this embodiment, the user may alternatively perform an operation on the terminal to control the headset to generate the $N_2$ groups of filtering parameters. In other words, after the first group of filtering parameters is determined, the ANC method provided in this embodiment further includes step E1 to step E3.

Step E1: The terminal receives an operation for the second control option in the ANC control list of the terminal.

Step E2: The terminal sends a third instruction to the headset in response to the operation for the second control option. The third instruction triggers the headset to generate the $N_2$ groups of filtering parameters.

For example, with reference to the interface shown in (b) in FIG. 18A or (b) in FIG. 18B, the "adaptation parameter generation" option on the interface is the second control option. If the user taps the "adaptation parameter generation" option, the terminal sends the third instruction to the headset, to trigger the headset to generate the $N_2$ groups of filtering parameters.

Step E3: The headset receives the third instruction.

In this embodiment, after the headset receives the third instruction, the headset generates the $N_2$ groups of filtering parameters based on the first group of filtering parameters and the second group of filtering parameters. The $N_2$ groups of filtering parameters correspond to different ANC noise cancellation strengths (for example, the $N_2$ groups of filtering parameters correspond to $N_2$ ANC noise cancellation strengths). The $N_2$ groups of filtering parameters are $N_2$ groups of filtering parameters adapted to the canal environment of the current user, and the noise cancellation strengths increase sequentially when the headset performs noise cancellation by using the $N_2$ groups of filtering parameters.

Step 1606: The terminal determines a target ANC noise cancellation strength.

In an implementation, the terminal may determine the target ANC noise cancellation strength based on a status of current ambient noise. For example, when a current environment is quiet, the terminal adaptively selects a low ANC noise cancellation strength based on a status of ambient noise; or when a current environment is noisy, the terminal adaptively selects a high ANC noise cancellation strength based on a status of ambient noise.

In another implementation, after the terminal receives the operation for the second control option in the ANC control list of the terminal, the user may interact with the terminal to determine the target ANC noise cancellation strength. A specific method includes step 1606*a* to step 1606*c*.

Step 1606*a*: The terminal displays a second control. The second control includes $N_2$ preset locations. The $N_2$ preset locations correspond to $N_2$ ANC noise cancellation strengths. The $N_2$ ANC noise cancellation strengths correspond to the $N_2$ groups of filtering parameters.

Figure 23A:
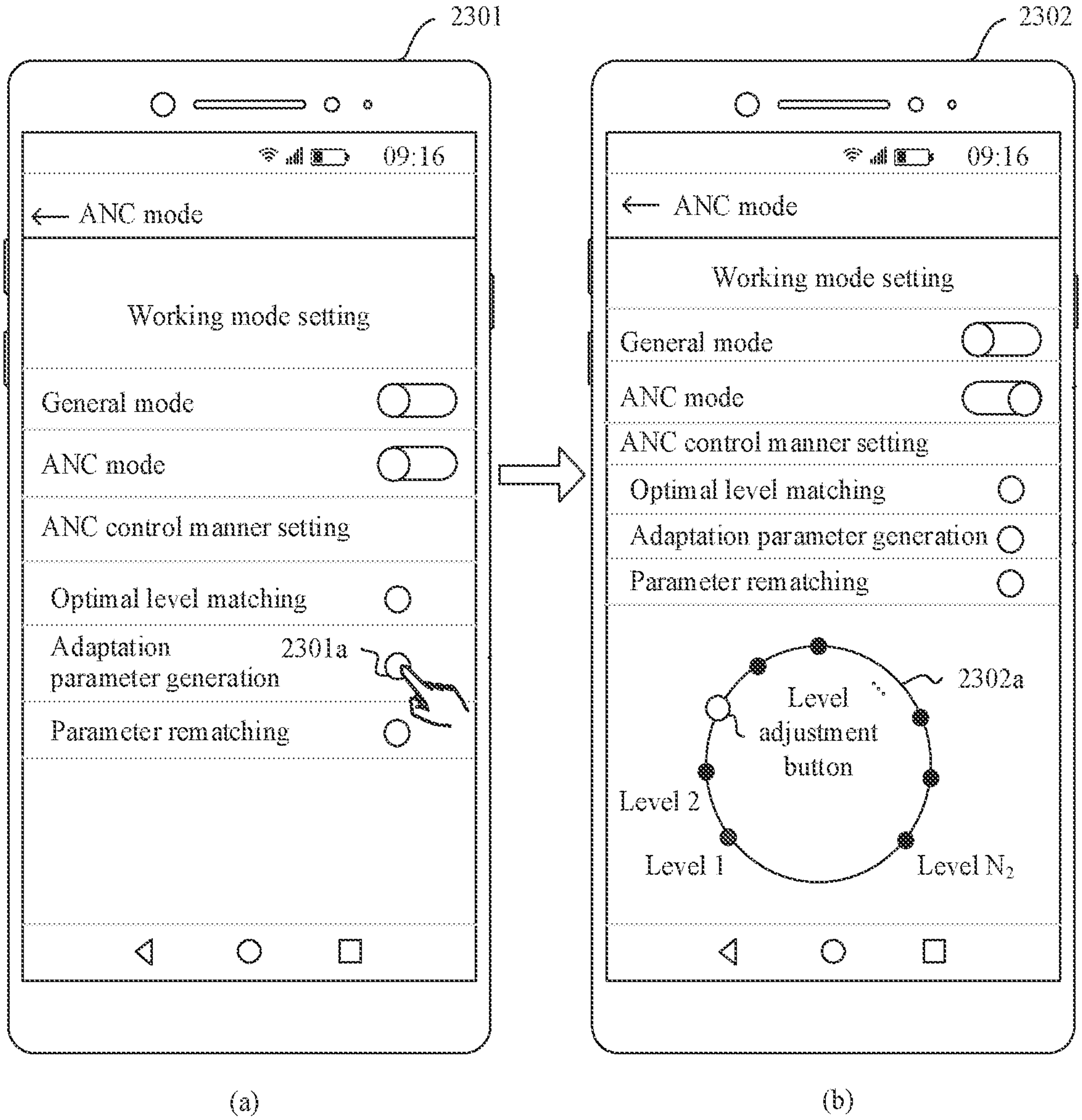
FIG. 23A is a schematic diagram of display effect in an ANC method according to an embodiment.

For example, in an implementation, refer to FIG. 23A. After the user taps an "adaptation parameter generation" option 2301*a* on an interface 2301 shown in (a) in FIG. 23A, the terminal displays an interface 2302 shown in (b) in FIG. 23A. On the interface 2302, a second control 2302*a* (a level disk) is displayed below an ANC control list. The second control 2302*a* includes a level adjustment button and $N_2$ levels. The $N_2$ levels correspond to $N_2$ preset locations. The $N_2$ preset locations correspond to $N_2$ groups of filtering parameters. It should be noted that noise cancellation strengths at $N_2$ levels in a first control shown in (b) in FIG. 23A increase in sequence, and ambient noise obtained after the $N_2$ groups of filtering parameters are used to perform noise cancellation is weakened in sequence.

Figure 23B:
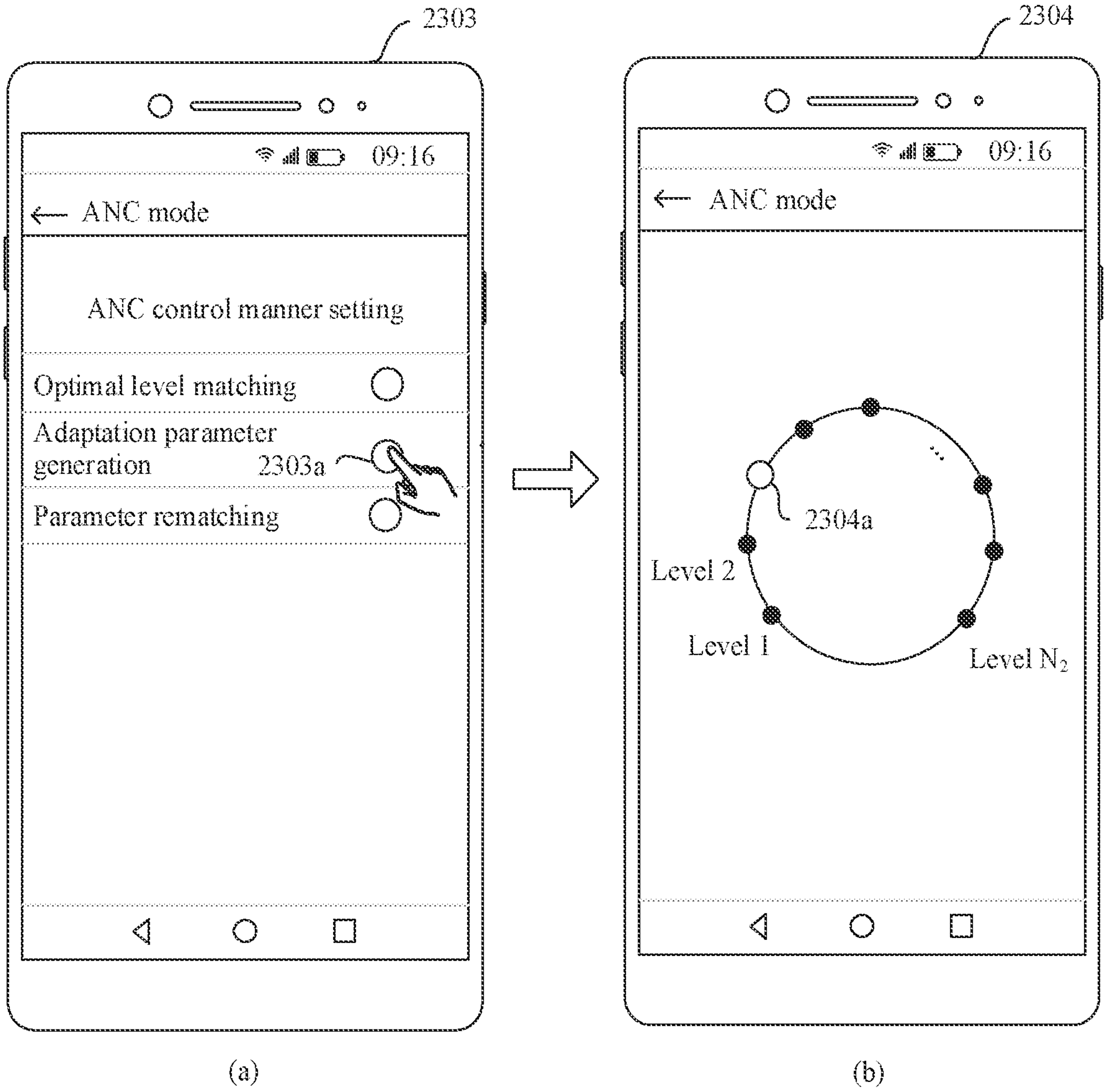
FIG. 23B is a schematic diagram of display effect in an ANC method according to an embodiment.

In another implementation, refer to FIG. 23B. After the user taps an "adaptation parameter generation" option 2303*a* on an interface 2303 shown in (a) in FIG. 23B, the terminal displays an interface 2304 shown in (b) in FIG. 23B. The interface 2304 includes a second control 2304*a* (a level disk). The second control 2304*a* includes a level adjustment button and $N_2$ levels. The $N_2$ levels correspond to $N_2$ preset locations. The $N_2$ preset locations correspond to $N_2$ groups of filtering parameters.

Step 1606*b*: The terminal receives an operation for a second location in the second control. The second location is one of the $N_2$ preset locations.

In this embodiment, the foregoing $N_2$ ANC noise cancellation strengths correspond to $N_2$ groups of filtering parameters. The $N_2$ groups of filtering parameters are generated based on the first group of filtering parameters and the second group of filtering parameters. Noise cancellation effect obtained when a filtering parameter corresponding to an ANC noise cancellation strength at the second location is applied to the headset is better than noise cancellation effect obtained when a filtering parameter corresponding to an ANC noise cancellation strength at another location in the $N_2$ preset locations is applied to the headset.

Step 1606*c*: The terminal determines, in response to the operation for the second location, the ANC noise cancellation strength corresponding to the second location as the target ANC noise cancellation strength.

In this embodiment, the second control is similar to the foregoing first control. The user slides the level adjustment button in the second control, so that the level adjustment button traverses the $N_2$ levels, that is, traverses the $N_2$ preset locations, to determine the target ANC noise cancellation strength. A process in which the user performs an operation for the second location in the second control to determine the target ANC noise cancellation strength is similar to the foregoing process in which the user performs an operation for the first location in the first control to determine the first group of filtering parameters. For details, refer to FIG. 20 and the content of the foregoing embodiment. Details are not described herein again.

Optionally, when the headset or the terminal determines the target ANC noise cancellation strength based on a status of ambient noise, a level corresponding to the target ANC noise cancellation strength is presented in the foregoing displayed second control. For example, a location corresponding to the level adjustment button in the second control is the level corresponding to the target ANC noise cancellation strength, refer to (b) in FIG. 23A and (b) in FIG. 23B.

Step 1607: The terminal sends second indication information to the headset. The second indication information indicates the headset to perform noise cancellation by using a third group of filtering parameters corresponding to the target ANC noise cancellation strength.

Step 1608: The headset receives the second indication information from the terminal.

Step 1609: The headset determines a third group of filtering parameters from the $N_2$ groups of filtering parameters based on the target ANC noise cancellation strength.

In this embodiment, after the headset receives the second indication information, the headset determines, as the third group of filtering parameters, filtering parameters that are indicated by the second indication information and are in the $N_2$ groups of filtering parameters.

Step 16010: The headset performs noise cancellation by using the third group of filtering parameters.

Optionally, the ANC method provided in this embodiment may be separately applied to an earphone (or a left earphone) corresponding to a left ear and an earphone (or a right earphone) corresponding to a right ear, to implement left ear noise cancellation and right ear noise cancellation. Alternatively, left ear noise cancellation and right ear noise cancellation are separately performed by using a same group of filtering parameters. This is not limited in this embodiment.

In a case, after the $N_2$ groups of filtering parameters are generated based on the first group of filtering parameters and the second group of filtering parameters, the third group of filtering parameters is determined from the $N_2$ groups of filtering parameters. The headset performs noise cancellation based on the third group of filtering parameters. Subsequently, when the headset works, the user may further redetermine, based on an actual requirement, a group of filtering parameters for noise cancellation, that is, the headset re-obtains the first group of filtering parameters. Refer to FIG. 18A or FIG. 18B. The user selects the "parameter rematching" option, and the headset restores the $N_2$ groups of filtering parameters in the headset to the $N_1$ groups of filtering parameters, to redetermine the first group of filtering parameters from the $N_1$ groups of filtering parameters, and perform noise cancellation by using the first group of filtering parameters. Further, optionally, $N_2$ groups of new filtering parameters may also be generated based on the redetermined first group of filtering parameters and the second group of filtering parameters, a third group of filtering parameters is determined from the $N_2$ groups of filtering parameters, and noise cancellation is performed by using the third group of filtering parameters.

It should be noted that, in this embodiment, the headset may also send information to the terminal. For example, after the headset executes the matching algorithm to determine the first group of filtering parameters or the third group of filtering parameters, the headset sends indication information to the terminal to indicate the first group of filtering parameters or the third group of filtering parameters, and further, the terminal presents, in the first control based on the indication information, a level corresponding to the first group of filtering parameters or presents, in the second control based on the indication information, a level corresponding to the third group of filtering parameters (that is, a level corresponding to the target ANC strength).

In conclusion, in the ANC method provided in this embodiment, after the first group of filtering parameters is determined, the $N_2$ groups of filtering parameters adapted to a current user are generated based on the first group of filtering parameters and the second group of filtering parameters, and the third group of filtering parameters corresponding to the target ANC noise cancellation strength is further determined from the $N_2$ groups of filtering parameters, to perform noise cancellation by using the third group of filtering parameters. The user can select an appropriate ANC noise cancellation strength based on a status of ambient noise, so that the noise cancellation effect better meets a user requirement.

Phase 3: The process of detecting the abnormal noise and updating the filtering parameters Optionally, in this embodiment, after the first group of filtering parameters or the third group of filtering parameters are determined for the user, when the user continues to use the headset, an environment in which the user is located may change, and abnormal noise is generated in the ear canal of the user. This severely affects listening experience of the user. In view of this, the ANC method provided in this embodiment further includes detecting and processing of abnormal noise.

Figure 24:
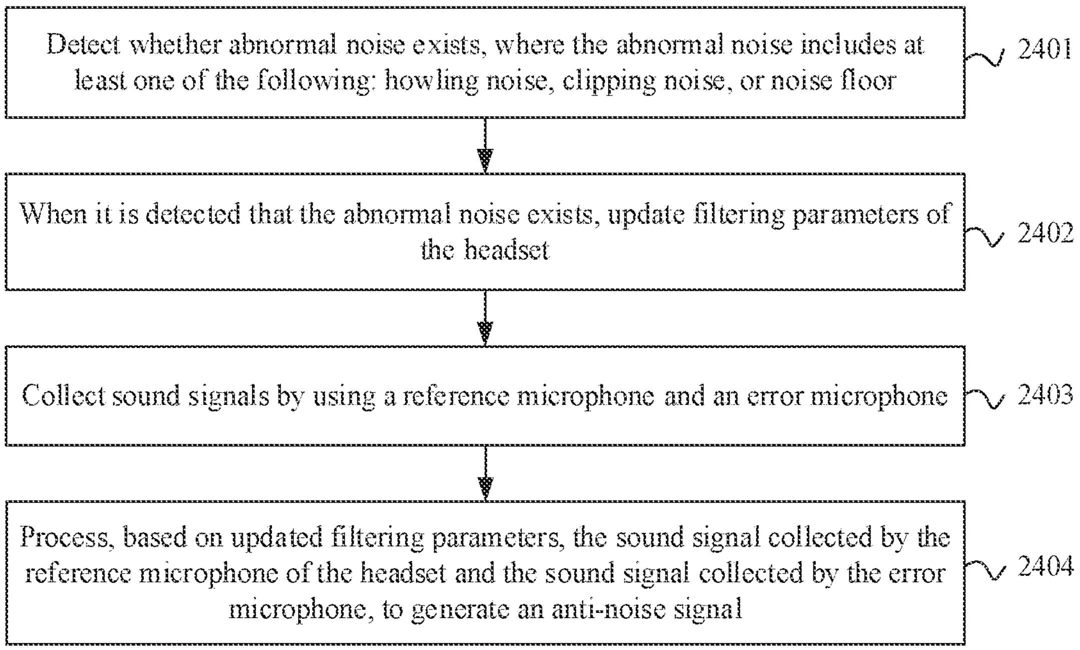
FIG. 24 is a schematic diagram of an ANC method according to an embodiment.

As shown in FIG. 24, the ANC method provided in this embodiment further includes step 2401 to step 2404.

Step 2401: Detect whether abnormal noise exists. The abnormal noise includes at least one of the following: howling noise, clipping noise, or noise floor.

In this embodiment, when the user uses the headset, the user enables (that is, enables the ANC function of the headset) the ANC function of the headset, or switches the working mode of the headset to the ANC working mode. In this way, whether at least one type of abnormal noise in the howling noise, the clipping noise, or the noise floor exists may be detected in real time in a process of using the headset, and noise cancellation processing is performed.

Optionally, the abnormal noise may further include other noise such as wind noise. It should be noted that, for different noise types, methods for detecting abnormal noise are different. A specific method is described in detail in the following embodiment.

Step 2402: When it is detected that the abnormal noise exists, update filtering parameters of the headset.

It should be understood that the filtering parameters of the headset may be the first group of filtering parameters or the third group of filtering parameters. When current filtering parameters of the headset are the first group of filtering parameters, the first group of filtering parameters is updated. When current filtering parameters of the headset are the third group of filtering parameters, the third group of filtering parameters is updated.

It should be noted that for different types of abnormal noise (for example, the howling noise, the clipping noise, the noise floor, and the wind noise), different parameters in the filtering parameters may be updated. A specific process is described in detail in the following embodiment.

Step 2403: Collect sound signals by using the reference microphone and the error microphone.

Step 2404: Process, based on an updated filtering parameter, the sound signal collected by the reference microphone of the headset and the sound signal collected by the error microphone, to generate the anti-noise signal.

In this embodiment, the anti-noise signal is used to weaken an intra-ear noise signal of the user, and the intra-ear noise signal may be understood as residual noise obtained after the ambient noise is isolated by the headset after the user wears the headset. A residual noise signal is related to external ambient noise, the headset, fitness between the headset and an ear canal, and other factors. After the headset generates the anti-noise signal, the headset plays the anti-noise signal. A phase of the anti-noise signal is opposite to that of the intra-ear noise signal of the user. In this way, the anti-noise signal can weaken the intra-ear noise signal of the user, thereby reducing abnormal intra-ear noise.

Figure 25:
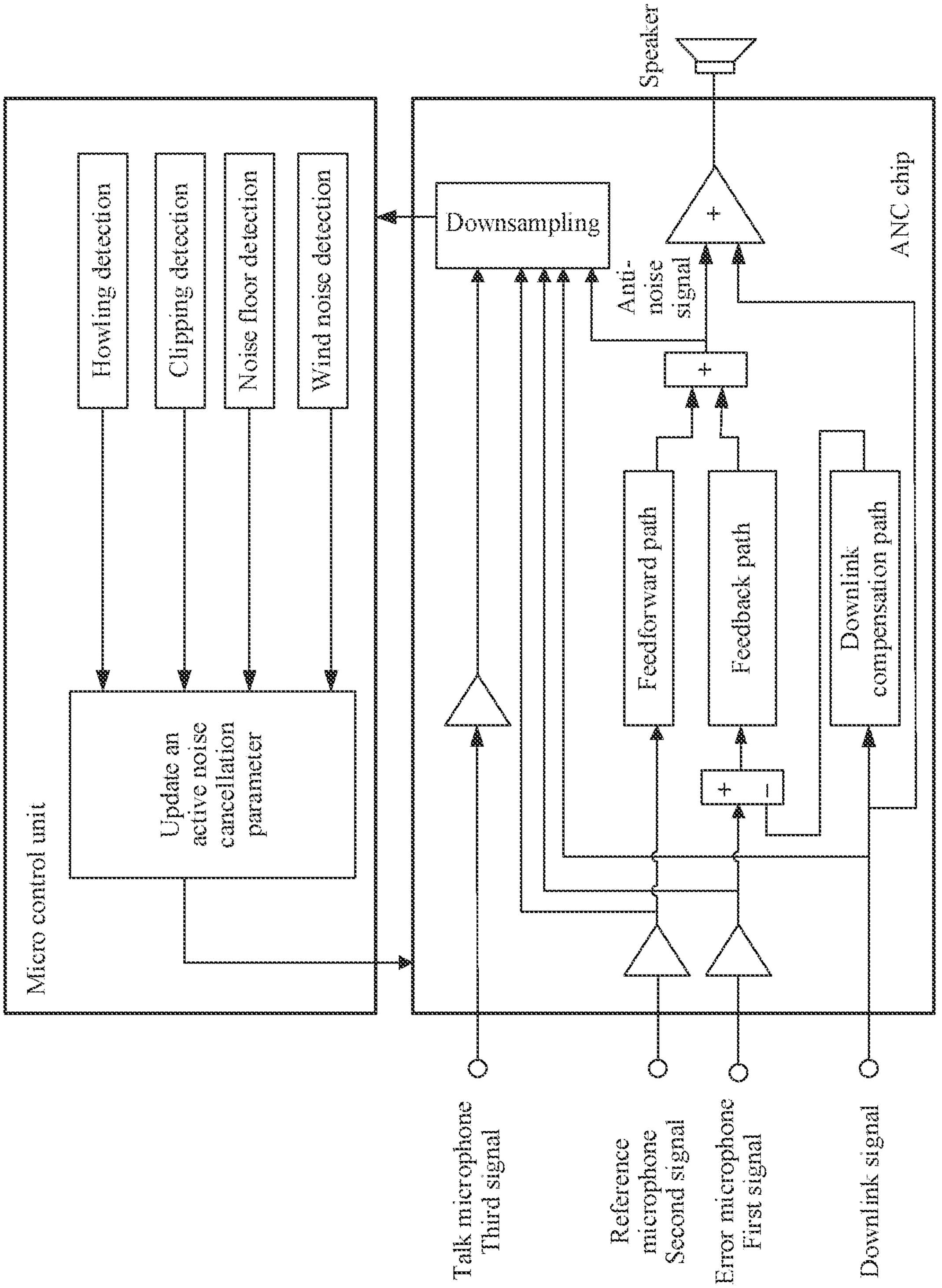
FIG. 25 is a schematic diagram of a working principle of a semi-open ANC earphone according to an embodiment.

With reference to a schematic diagram of a working principle of the headset shown in FIG. 25, the foregoing step 2401 of detecting the abnormal noise and the step 2402 of updating the filtering parameters are performed by a micro control unit of the headset. When it is detected that the abnormal noise exists, an ANC chip performs noise cancellation processing (step 2404). It should be understood that, in this embodiment, noise cancellation processing of the ANC chip includes processing of a signal (that is, the sound signal collected by the reference microphone) in the feed-forward path, processing of a signal (that is, the signal collected by the error microphone) in the feedback path, and processing of a signal (that is, downlink audio) in the downlink compensation path.

According to the ANC method provided in this embodiment, because the headset can detect the abnormal noise, and perform noise cancellation processing on the abnormal noise, interference of the abnormal noise is reduced, stability of the headset is improved, and listening experience of the user can be improved.

The following separately describes in detail an abnormal noise detection process and a noise signal processing process from perspectives of howling noise, clipping noise, noise floor, and wind noise.

Figure 26:
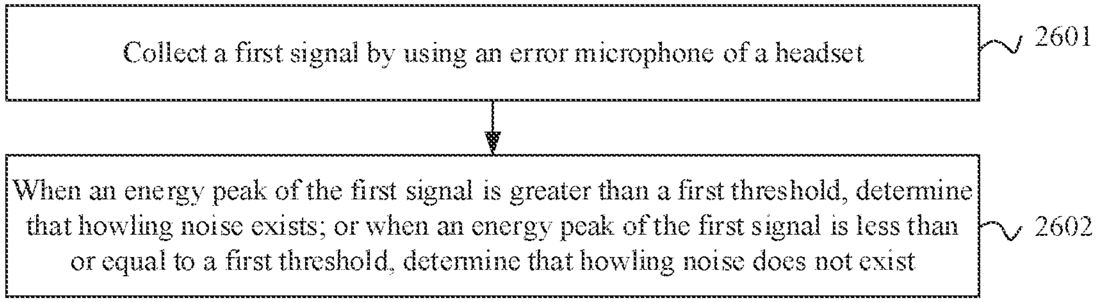
FIG. 26 is a schematic diagram of a howling detection method according to an embodiment.

For howling noise, as shown in FIG. 26, a method for detecting whether the howling noise exists further includes step 2601 and step 2602.

Step 2601: Collect a first signal by using the error microphone of the headset.

In this embodiment, after the first signal is collected, downsampling is performed on the first signal by using a frequency of 16 kilohertz (KHz), and howling noise detection is further performed based on the first signal.

Step 2602: When an energy peak of the first signal is greater than a first threshold, determine that the howling noise exists. When the energy peak of the first signal is less than or equal to the first threshold, determine that the howling noise does not exist.

The energy peak of the first signal is an energy value corresponding to a peak frequency of the first signal.

In this embodiment, after the first signal is collected by using the error microphone, the peak frequency of the first signal is determined by using a least mean square (LMS) algorithm within a specified howling detection frequency range (for example, 500 Hz to 7000 Hz). If the peak frequency of the first signal is within the howling detection frequency range, the energy peak of the first signal, that is, energy corresponding to the peak frequency of the first signal, is calculated by using a Goertzel algorithm, to determine, based on the energy peak of the first signal, whether the howling noise exists.

In this embodiment, the signal (that is, the foregoing first signal) of the error microphone is denoted as err. High-pass filtering is first performed on the first signal: $err_{hp}=H_{hp}*err$. $H_{hp}$ is a transfer function of a high-pass filter (which is specifically determined based on an actual situation), and $err_{hp}$ is a filtered first signal. A low-frequency cut-off frequency of the high-pass filter depends on a lowest howling frequency, for example, 600 Hz.

Then, for the filtered first signal, the peak frequency of the first signal is determined by using the LMS algorithm, and further, a coefficient error function e(n) is minimized:

$$e(n) = err_{hp}(n) + h_1(n) * err_{hp}(n-1) + err_{hp}(n-2).$$

-continued $$h_1(n+1) = h_1(n) - \mu\frac{e(n)*err_{hp}(n-1)}{E(err_{hp}(n-1))},\ h_1(L) = -2*\cos(w_m),$$

n is nth sampling point data of a current frame, n≤L, and L is a quantity of sampling point data included in the current frame.

Each sampling point of the current frame is iterated in sequence by using the LMS algorithm, and a frequency $w_m$ obtained after iteration of L sampling points is a converged peak frequency of the current frame, that is, the peak frequency of the first signal. It should be understood that the peak frequency of the current frame is saved as an initial frequency of a next frame, and a peak frequency of the next frame may be obtained by continuing to update the next frame, and so on.

If the peak frequency of the first signal is within the howling detection frequency range, the energy peak of the first signal, that is, energy corresponding to the peak frequency of the first signal, is calculated by using the Goertzel algorithm, to determine, based on the energy peak of the first signal, whether the howling noise exists.

Specifically, the peak energy of the first signal is denoted as $P_{err_{hp}}$, and $P_{err_{hp}}$ is determined according to the following formulas:

$$s(n)=err_{hp}(n)-h_1(L)*s(n-1)-s(n-2),\text{ and}$$

$$P_{err_{hp}}=s^2(L)+s^2(L-1)-h_1(L)*s(L)*s(L-1).$$

n is the nth sampling point data of the current frame, n≤L, and L is the quantity of sampling point data included in the current frame.

Each sampling point of the current frame is iterated in sequence by using the Goertzel algorithm, to obtain s(L) and s(L−1), so as to calculate the peak energy $P_{err_{hp}}$ of the first signal.

Figure 27:
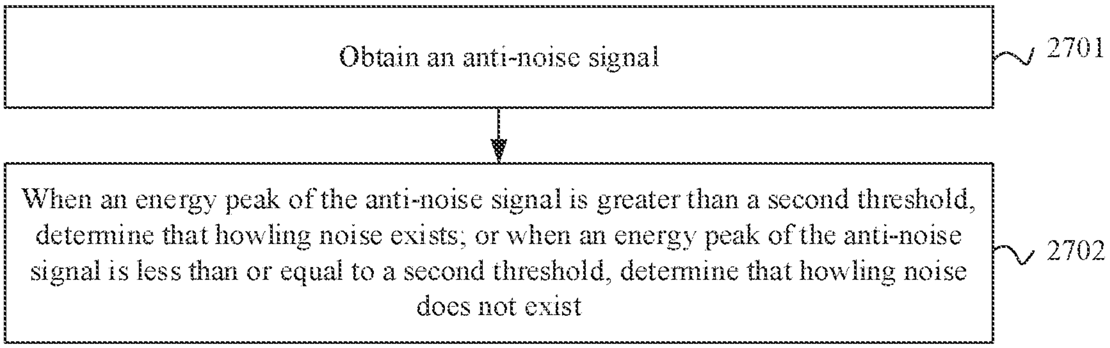
FIG. 27 is a schematic diagram of a howling detection method according to an embodiment.

Alternatively, as shown in FIG. 27, a method for detecting whether the howling noise exists further includes step 2701 to step 2702.

Step 2701: Obtain an anti-noise signal.

Similarly, downsampling is performed on the anti-noise signal by using a frequency of 16 KHz, and howling noise detection is further performed based on the anti-noise signal.

Step 2702: When an energy peak of the anti-noise signal is greater than a second threshold, determine that the howling noise exists. When the energy peak of the anti-noise signal is less than or equal to the second threshold, determine that the howling noise does not exist.

The energy peak of anti-noise is an energy value corresponding to a peak frequency of the anti-noise signal.

It should be understood that a method for determining the peak frequency and the energy peak of the anti-noise signal is similar to the method for determining the peak frequency and the energy peak of the first signal. For details, refer to related descriptions in the step 2602. Details are not described herein again.

Figure 28:
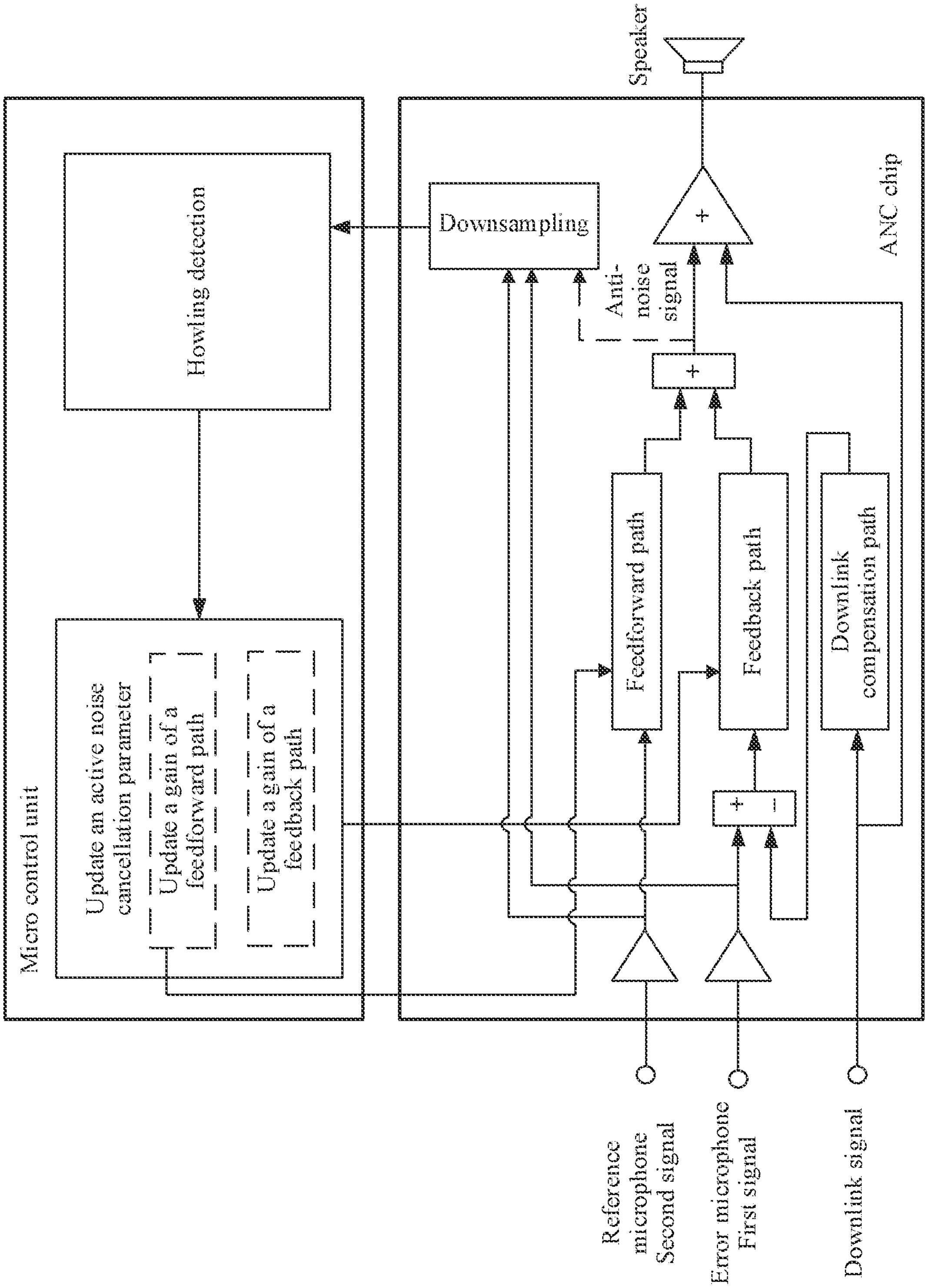
FIG. 28 is a schematic diagram of working principles of howling detection and noise cancellation processing according to an embodiment.

FIG. 28 is a schematic diagram of working principles of howling detection and noise cancellation processing. The ANC method described in this application is understood with reference to FIG. 28.

When it is detected that the howling noise exists, the foregoing method for updating the filtering parameters further includes step 24021*a* to step 24021*c*.

Step 24021*a*: Determine a type of the howling noise based on the first signal collected by the error microphone and the second signal collected by the reference microphone.

Optionally, the type of the howling noise may also be determined based on the anti-noise signal and the second signal. In this embodiment, the howling noise includes howling noise caused by the feedback path and howling noise caused by the feedforward path. For ease of description, the howling noise caused by the feedback path is referred to as first howling noise, and the howling noise caused by the feedforward path is referred to as second howling noise. The howling noise includes the first howling noise and the second howling noise.

In this embodiment, the peak frequency of the first signal collected by the error microphone is denoted as a first frequency. When a ratio of energy of the first signal at the first frequency to energy of the second signal at the first frequency is less than a preset threshold, it is determined that the howling noise is the first howling noise. When a ratio of energy of the first signal at the first frequency to energy of the second signal at the first frequency is greater than or equal to a preset threshold, it is determined that the howling noise is the second howling noise.

Step 24021*b*: When the howling noise is the first howling noise, reduce a gain of the feedback path in the filtering parameter. The first howling noise is the howling noise caused by the feedback path.

It may be understood that when the howling noise is caused by the feedback path, updating the filtering parameters means reducing the gain of the feedback path, for example, updating the gain of the feedback path to 0, or reducing the gain of the feedback path based on an actual requirement. This is not limited in this embodiment.

Step 24021*c*: When the howling noise is the second howling noise, reduce a gain of the feedforward path in the filtering parameter. The second howling noise is howling interference caused by the feedforward path.

It may be understood that when the howling noise is caused by the feedforward path, updating the filtering parameters means reducing the gain of the feedforward path, for example, updating the gain of the feedforward path to 0, or reducing the gain of the feedforward path based on an actual requirement. This is not limited in this embodiment.

Alternatively, when it is detected that the howling noise exists, the foregoing method for updating the filtering parameters further includes step 24022.

Step 24022: Reduce a gain of the feedforward path and a gain of the feedback path in the filtering parameter.

In this embodiment, in a convenient implementation, when it is detected that the howling noise exists, whether the howling noise is caused by the feedback path or the feedforward path does not need to be determined, but the gain of the feedforward path and the gain of the feedback path are reduced in parallel.

Optionally, the gain of the feedforward path and the gain of the feedback path may be reduced by a same amplitude (or multiple). For example, the gain of the feedforward path is reduced to 0.8 times of an original gain, and the gain of the feedback path is also reduced to 0.8 times of the original gain. Certainly, the gain of the feedforward path and the gain of the feedback path may be reduced by different amplitudes (or multiples). For example, the gain of the feedforward path is reduced to 0.8 times of the original gain, and the gain of the feedback path is also reduced to 0.6 times of the original gain. This is specifically determined based on an actual requirement, and is not limited in this embodiment.

In an implementation, when it is detected that the howling noise exists, the gain of the feedforward path and the gain of the feedback path may not be updated, but a gain of the ANTI signal (that is, a sum of an output signal in the feedforward path and an output signal in the feedback path) is updated (reduced). For example, the gain of the ANTI signal is updated to 0.

Based on the reduced gain of the feedforward path and/or the reduced gain of the feedback path, the signal in the feedforward path (that is, the sound signal collected by the reference microphone) and/or the signal in the feedback path (that is, the sound signal collected by the error microphone) are/is processed, to generate the anti-noise signal. This reduces the howling noise in the ear canal, reduces interference of the abnormal noise, improves stability of the headset, and further improves listening experience of the user.

Figure 29:
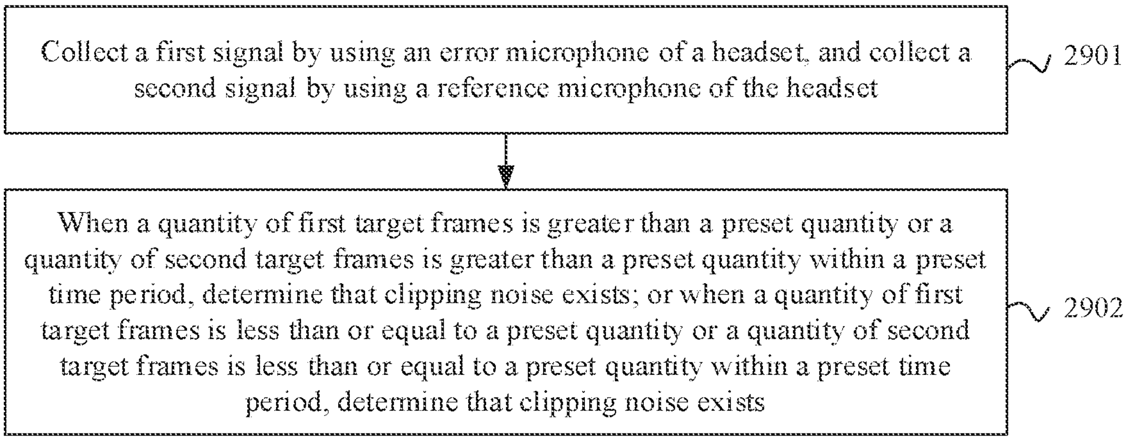
FIG. 29 is a schematic diagram of a clipping detection method according to an embodiment.

For clipping noise, as shown in FIG. 29, a method for detecting whether the clipping noise exists further includes step 2901 to step 2902.

Step 2901: Collect a first signal by using the error microphone of the headset, or collect a second signal by using the reference microphone of the headset.

Similarly, after the first signal or the second signal is collected, downsampling is performed on the first signal or the second signal by using a frequency of 16 KHz.

Step 2902: When a quantity of first target frames is greater than a preset quantity or a quantity of second target frames is greater than a preset quantity within a preset time period, determine that the clipping noise exists, or when a quantity of first target frames is less than or equal to a preset quantity or a quantity of second target frames is less than or equal to a preset quantity within a preset time period, determine that the clipping noise exists.

The first target frame is a signal frame whose energy is greater than a third threshold in signal frames included in the first signal. The second target frame is a signal frame whose energy is greater than a fourth threshold in signal frames included in the second signal.

It should be noted that the clipping noise in this embodiment refers to low-frequency clipping noise. After collecting the first signal or the second signal, the headset performs low-pass filtering on the first signal or the second signal to filter out a high-frequency stray signal in the first signal or the second signal, thereby improving accuracy of the first signal and the second signal, and further improving accuracy of detecting whether the clipping noise exists.

Optionally, the preset time period may be 100 milliseconds, 200 millimeters, 500 milliseconds, or the like. Duration of the preset time period may be adjusted based on an actual situation. This is not limited in this embodiment.

Optionally, the first target frame may be a signal frame whose maximum value of a signal is greater than a preset threshold in signal frames included in the first signal. The second target frame may be a signal frame whose maximum value of a signal is greater than a preset threshold in signal frames included in the second signal.

Figure 30:
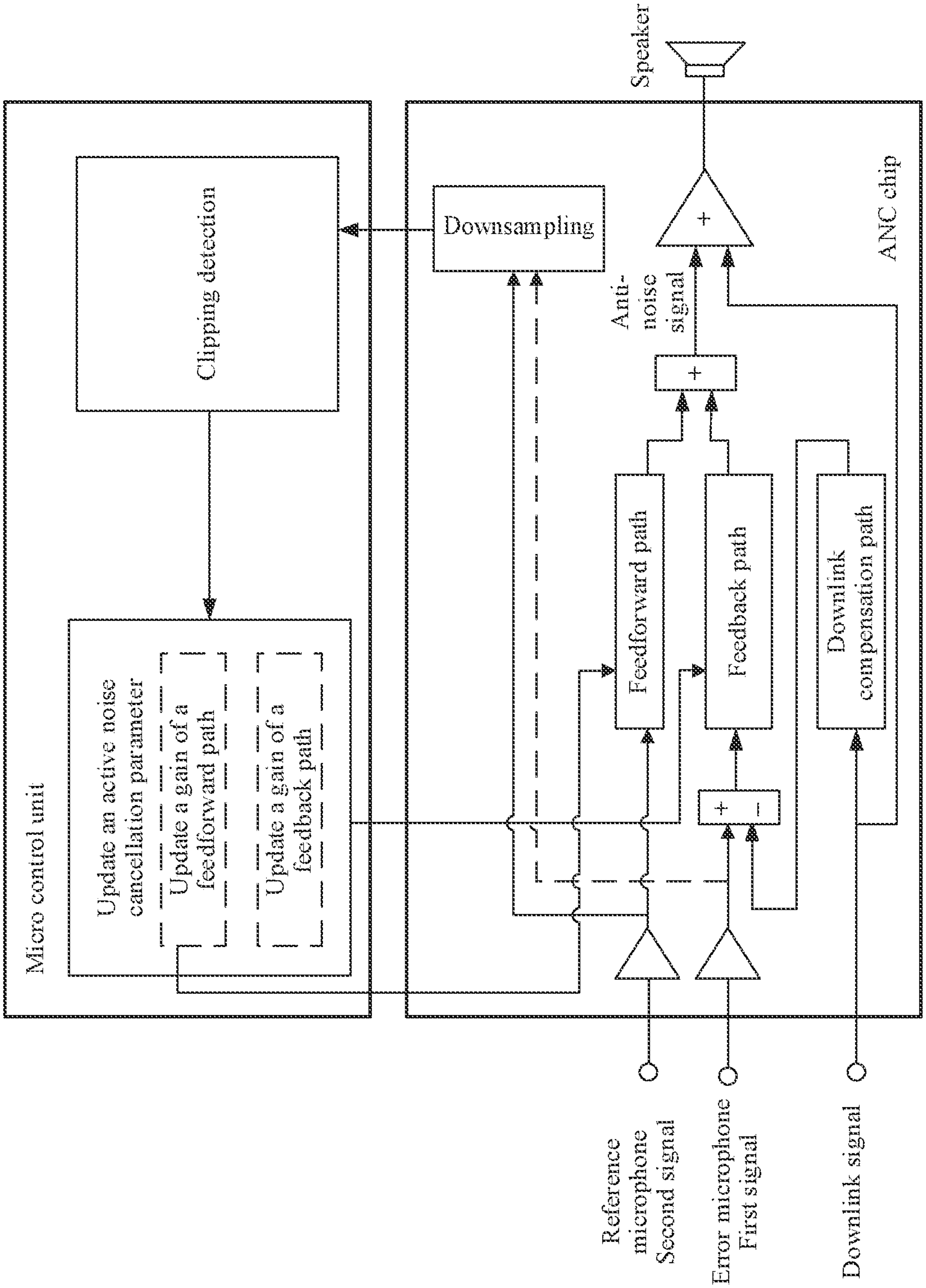
FIG. 30 is a schematic diagram of working principles of clipping detection and noise cancellation processing according to an embodiment.

FIG. 30 is a schematic diagram of working principles of clipping detection and noise cancellation processing. The ANC method described in this application is understood with reference to FIG. 30.

When it is detected that the clipping noise exists, the foregoing method for updating the filtering parameters further includes step 24023*a* to step 24023*b*.

Step 24023*a*: Determine an index corresponding to current filtering parameters. The index is an index of the current filtering parameters in a first filtering parameter set.

It should be understood that the index corresponding to the current filtering parameters is the index of the current filtering parameters in a plurality of groups of preset filtering parameters. The plurality of groups of filtering parameters may be the foregoing $N_1$ groups of filtering parameters or $N_2$ groups of filtering parameters. The $N_1$ groups of filtering parameters form the first filtering parameter set, and the $N_2$ groups of filtering parameters form a second filtering parameter set.

Step 24023*b*: Update, by using filtering parameters corresponding to the index in a third filtering parameter set, the filtering parameter corresponding to the feedforward path and/or the filtering parameter corresponding to the feedback path in the filtering parameters.

The third filtering parameter set includes a plurality of groups of filtering parameters corresponding to the feedforward path and/or a plurality of groups of filtering parameters corresponding to the feedback path.

For example, in the foregoing embodiment, if the current filtering parameters are the third group of filtering parameters in nine groups of filtering parameters included in the first filtering parameter set, the index of the filtering parameters is 3. In this way, some or all of the filtering parameters corresponding to the feedforward path and/or the filtering parameters corresponding to the feedback path in the third group of filtering parameters in the third filtering parameter set are used to replace the filtering parameters corresponding to the feedforward path and/or the filtering parameters corresponding to the feedback path in the current filtering parameters.

Figure 31:
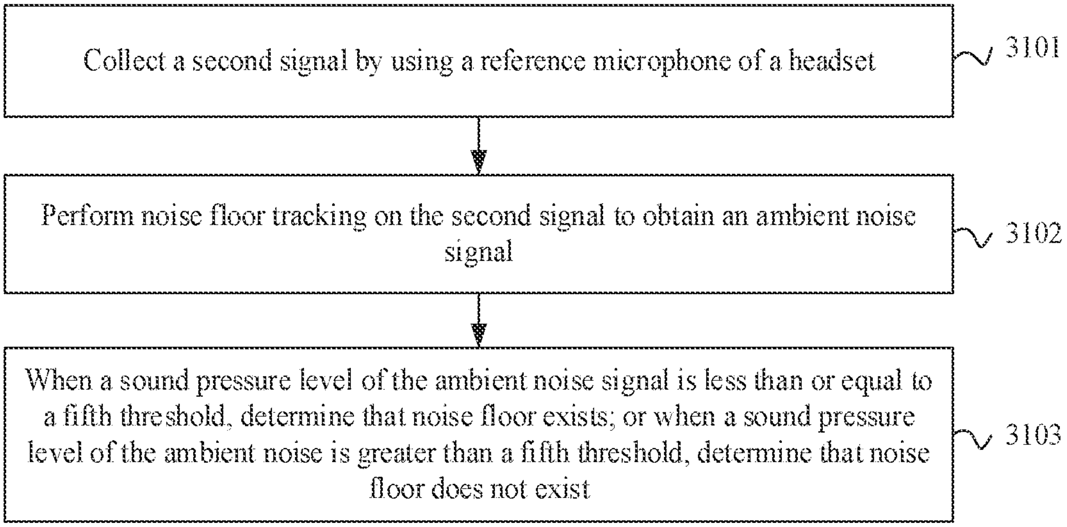
FIG. 31 is a schematic diagram of a noise floor detection method according to an embodiment.

For noise floor, as shown in FIG. 31, a method for detecting whether the noise floor exists further includes step 3101 to step 3103.

Step 3101: Collect a second signal by using the reference microphone of the headset.

Similarly, after the second signal is collected, downsampling is performed on the second signal by using a frequency of 16 KHz.

Step 3102: Perform noise floor tracking on the second signal to obtain an ambient noise signal.

In this embodiment, the second signal is used as an input of a noise floor tracking (NFT) algorithm, to output a sound pressure level of the ambient noise signal. For detailed descriptions of the NFT algorithm, refer to the conventional technology. Details are not described herein again.

Step 3103: When the sound pressure level of the ambient noise signal is less than or equal to a fifth threshold, determine that the noise floor exists, or when the sound pressure level of the ambient noise signal is greater than a fifth threshold, determine that the noise floor does not exist.

It should be understood that, when the sound pressure level of the ambient noise signal is less than or equal to the fifth threshold, it indicates that the environment is quiet. It can be learned from the description of the foregoing embodiment that when the environment is quiet, the user can perceive the noise floor. In other words, when the environment is quiet enough, the noise floor can be detected. Therefore, in this embodiment, when the sound pressure level of the ambient noise signal is less than or equal to the fifth threshold, it is determined that the noise floor exists, and the noise floor needs to be reduced.

Figure 32:
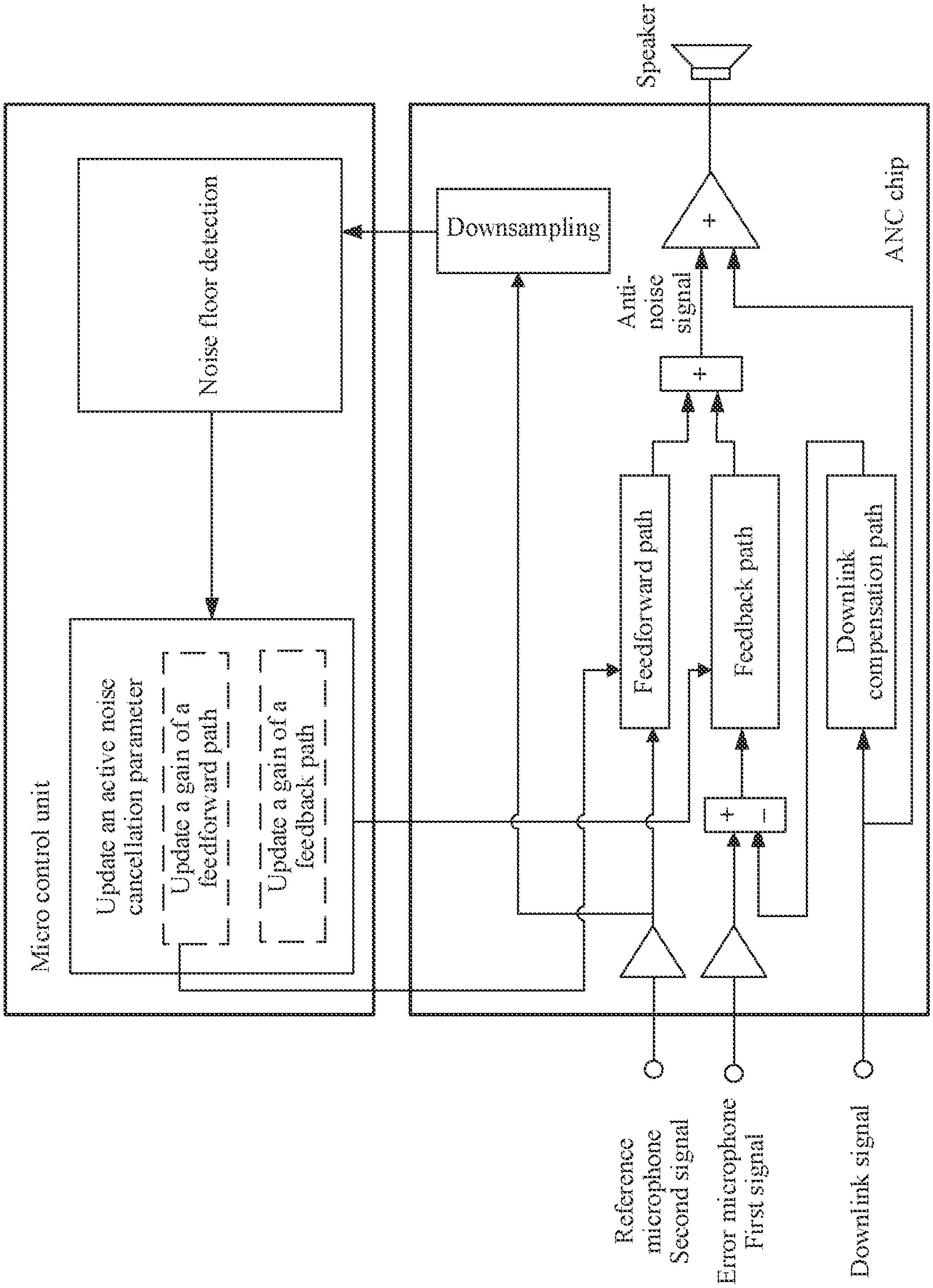
FIG. 32 is a schematic diagram of working principles of noise floor detection and noise cancellation processing according to an embodiment.

FIG. 32 is a schematic diagram of working principles of noise floor detection and noise cancellation processing. The ANC method described in this application is understood with reference to FIG. 32.

When it is detected that the noise floor exists, the foregoing method for updating the filtering parameters further includes step 24024.

Step 24024: Reduce a gain of the feedforward path and a gain of the feedback path in the filtering parameter.

In this embodiment, the gain of the feedforward path and the gain of the feedback path each have a linear relationship with the ambient noise signal, and the gain of the feedforward path and the gain of the feedback path separately change with a smooth change in the sound pressure level of the ambient noise signal. For example, a smaller sound pressure level of the ambient noise signal indicates a smaller gain of the feedforward path and a smaller gain of the feedback path. After the ambient noise signal is determined, the gain of the feedforward path and the gain of the feedback path are determined based on that the gain of the feedforward path and the gain of the feedback path each have the linear relationship with the ambient noise signal.

Figure 33:
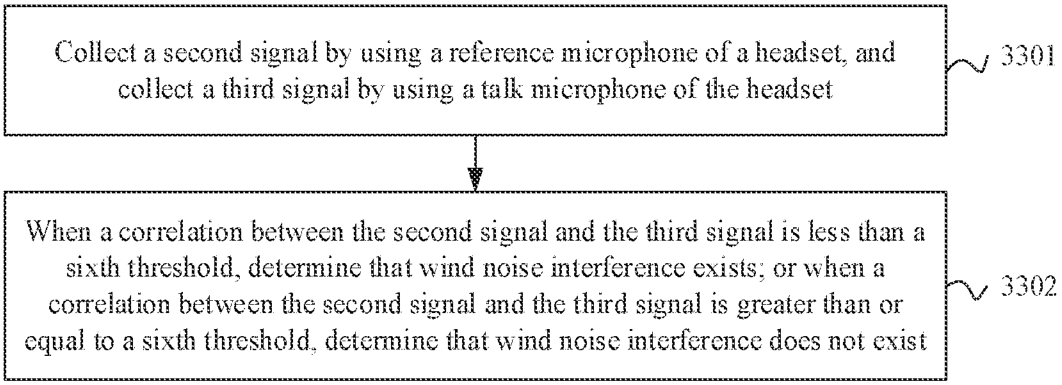
FIG. 33 is a schematic diagram of a wind noise detection method according to an embodiment.

For wind noise, as shown in FIG. 33, a method for detecting whether the wind noise exists further includes step 3301 to step 3302.

Step 3301: Collect a second signal by using the reference microphone of the headset, and collect a third signal by using the talk microphone of the headset.

In this embodiment, after the second signal and the third signal are collected, downsampling is performed on the second signal and the third signal by using a frequency of 16 KHz.

Step 3302: When a correlation between the second signal and the third signal is less than a sixth threshold, determine that wind noise interference exists, or when a correlation between the second signal and the third signal is greater than or equal to a sixth threshold, determine that wind noise interference does not exist.

In this embodiment, Fourier transform is separately performed on the second signal and the third signal, and then the correlation between the second signal and the third signal is calculated by using a correlation function (an existing correlation calculation method), to determine whether the wind noise exists based on a value of the correlation. It should be understood that a result of wind noise detection is that there is no wind or there is wind.

Figure 34:
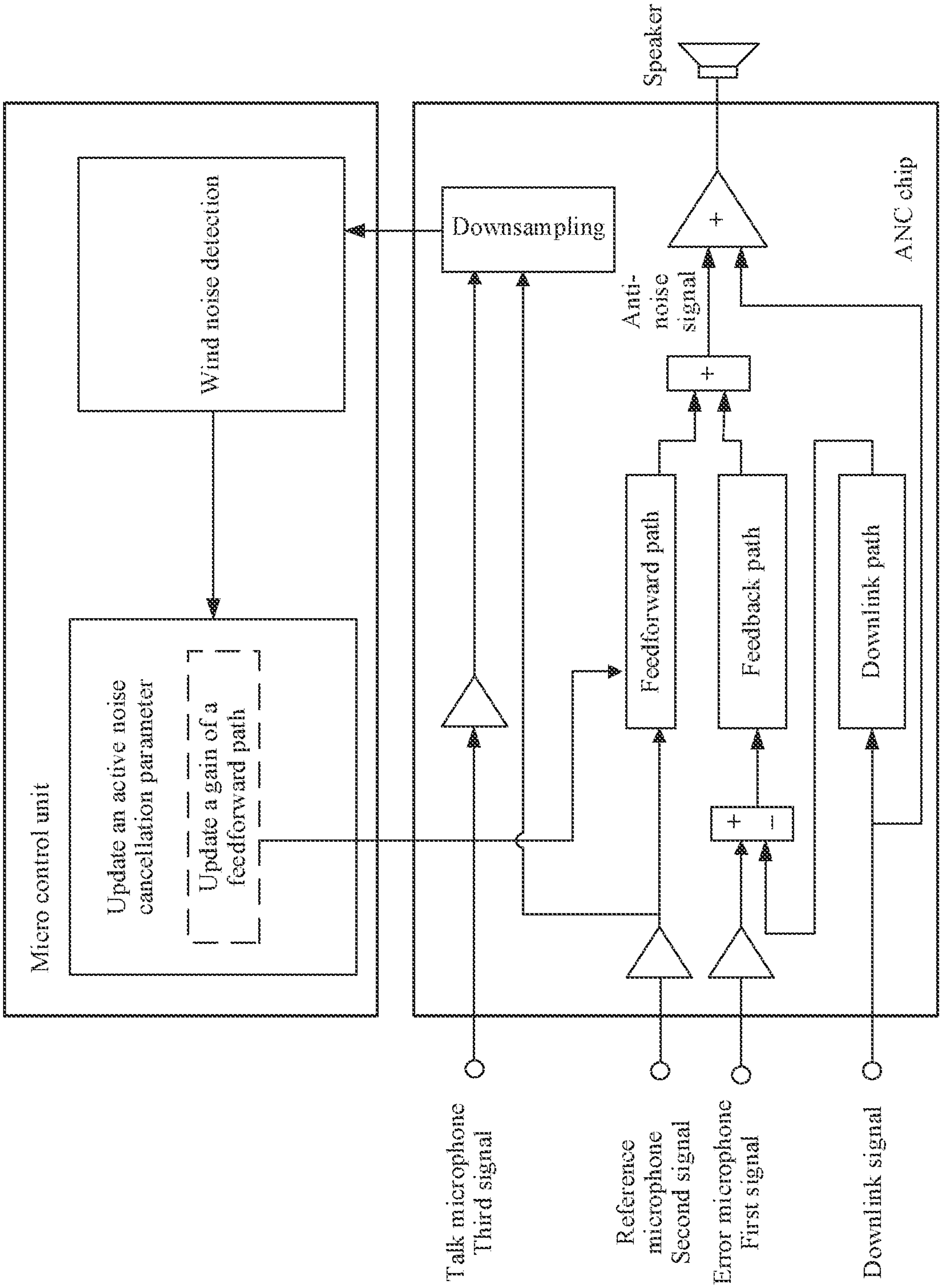
FIG. 34 is a schematic diagram of working principles of wind noise detection and noise cancellation processing according to an embodiment.

FIG. 34 is a schematic diagram of working principles of wind noise detection and noise cancellation processing. The ANC method described in this application is understood with reference to FIG. 34.

When it is detected that the wind noise exists, the foregoing method for updating the filtering parameters further includes step *24025a* to step *24025c*.

Step *24025a*: Analyze energy of the second signal, and determine a level of wind noise interference.

In an implementation of this embodiment, the level of the wind noise interference may include a light wind or a strong wind.

Optionally, two preset thresholds, for example, a first preset threshold and a second preset threshold, may be set. The first preset threshold is less than the second preset threshold. When the energy of the second signal is less than or equal to the first preset threshold, it is determined that there is no wind. When the energy of the second signal is greater than the first preset threshold and less than the second preset threshold, the level of the wind noise interference is a light wind. When the energy of the second signal is greater than or equal to the second preset threshold, the level of the wind noise interference is a strong wind.

Step *24025b*: Monitor the level of the wind noise interference, and determine a corresponding wind noise control state.

After the level of the wind noise interference is determined in the step *24025a*, a change status of the level of the wind noise interference is monitored, to determine the wind noise control state. Optionally, the wind noise control state may include one of the following (11 types): a windless state, a state from no wind to a light wind, a state from a light wind to a strong wind, a state from a strong wind to a light wind, a state from a strong wind, a light wind to a strong wind, a state from a light wind to no wind, a state from a light wind, no wind to a light wind, a light-wind holding state, a strong-wind holding state, a state from a strong wind back to a light wind, or a state from a light wind back to no wind.

As shown in Table 1, the foregoing 10 wind noise control states are separately numbered, to update the filtering parameters based on the wind noise control state.

TABLE 1

| State No. | State |
|---|---|
| 0 | Windless state |
| 1 | State from no wind to a light wind |
| 2 | State from a light wind to a strong wind |
| 3 | State from a strong wind to a light wind |
| 4 | State from a strong wind, a light wind to a strong wind |
| 5 | State from a light wind to no wind |
| 6 | State from a light wind, no wind to a light wind |
| 7 | Light-wind holding state |
| 8 | Strong-wind holding state |
| 9 | State from a strong wind back to a light wind |
| 10 | State from a light wind back to no wind |

Figure 35:
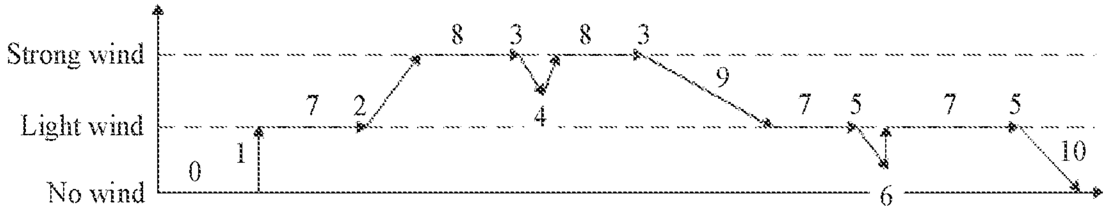
FIG. 35 is a schematic diagram of a wind noise control state according to an embodiment.

The foregoing 11 wind noise control states may also be illustrated by using FIG. 35.

Step *24025c*: Update, by using a filtering parameter corresponding to the wind noise control state in a fourth filtering parameter set, the filtering parameter corresponding to the feedforward path in the filtering parameters.

The fourth filtering parameter set includes filtering parameters corresponding to the feedforward path that respectively correspond to a plurality of wind noise control states.

The filtering parameter corresponding to the feedforward path may be a parameter of a low-frequency shelf filter in the feedforward path, including a center frequency and a gain of the low-frequency shelf filter.

With reference to the foregoing 11 wind noise control states, in a noise cancellation process (which may also be referred to as a wind noise control process), to ensure smooth transition of wind noise control, the foregoing filtering parameter corresponding to the feedforward path smoothly changes with time. For example, wind noise control is performed by using one group of filtering parameters within a specified time period, and wind noise control is performed by using another group of filtering parameters within another specified time period.

Figure 36:
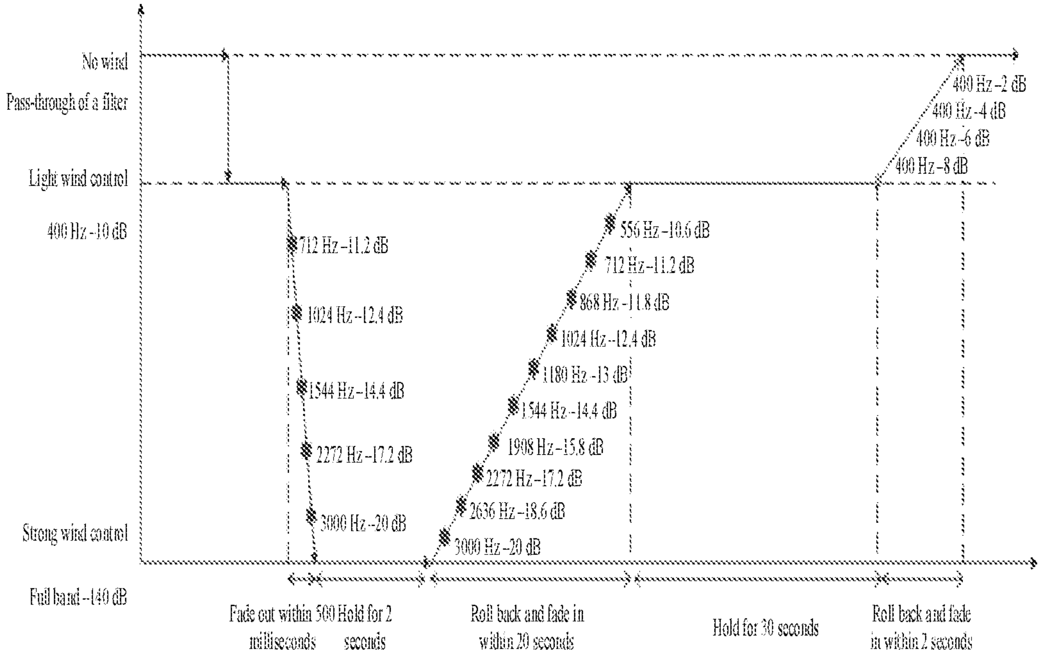
FIG. 36 is a schematic diagram of a filtering parameter corresponding to a wind noise control state according to an embodiment.

For example, the filtering parameter corresponding to the feedforward path is a parameter of the low-frequency shelf filter. With reference to FIG. 36, an embodiment provides a parameter design solution of the low-frequency shelf filter. Refer to FIG. 35 and FIG. 36. Filtering parameters respectively corresponding to the foregoing 11 different wind noise control states can be determined. For example, refer to FIG. 36. For the state from the light wind to the strong wind, wind noise control is performed through smooth transition of parameters within 50 milliseconds. For example, within 500 milliseconds, the signal in the feedforward path is processed by sequentially using the center frequencies and gains of (712 Hz, −11.2 decibel (dB)), (1024 Hz, −12.4 dB), (1544 Hz, −14.4 dB), (2272 Hz, −17.2 dB), and (3000 Hz, −20 dB) as parameters of the low-frequency shelf filter. For another example, for the strong-wind holding state, within 30 seconds, the signal in the feedforward path is processed by using a parameter in which a gain is-140 dB in a full frequency band. For another example, for the windless state, the low-frequency shelf filter is updated to a pass-through filter.

It should be understood that, within a preset wind noise control time period (for example, the foregoing 500 milliseconds), control duration corresponding to each group of center frequencies and gains may be set. This is specifically determined based on an actual situation, and is not limited in this embodiment.

For example, the wind noise control state determined in the step 2045*b* is the state 2 (the state from the light wind to the strong wind) in Table 1. Within 50 milliseconds, (712 Hz, −11.2 dB), (1024 Hz, −12.4 dB), (1544 Hz, −14.4 dB), and (2272 Hz, −17.2 dB) are used as updated filtering parameters corresponding to the feedforward path.

For example, the wind noise control state determined in the step 2045*b* is the state 4 (the state from the strong wind, the light wind to the strong wind) in Table 1. Within 20 seconds, (3000 Hz, −20 dB), (2636 Hz, −18.6 dB), (2272 Hz, −17.2 dB), (1908 Hz, −15.8 dB), (1544 Hz, −14.4 dB), (1180 Hz, −13 dB), (1024 Hz, −12.4 dB), (868 Hz, −11.8 dB), (712 Hz, −11.2 dB), and (556 Hz, −10.6 dB) are used as updated filtering parameters corresponding to the feedforward path. Within 500 milliseconds, the center frequencies and gains (712 Hz, −11.2 dB), (1024 Hz, −12.4 dB), (1544 Hz, −14.4 dB), (2272 Hz, −17.2 dB), and (3000 Hz, −20 dB) are sequentially used as updated filtering parameters corresponding to the feedforward path. For example, the signal in the feedforward path is first processed by sequentially using (3000 Hz, −20 dB), (2636 Hz, −18.6 dB), (2272 Hz, −17.2 dB), (1908 Hz, −15.8 dB), (1544 Hz, −14.4 dB), (1180 Hz, −13 dB), (1024 Hz, −12.4 dB), (868 Hz, −11.8 dB), (712 Hz, −11.2 dB) and (556 Hz, −10.6 dB) within the first 20 seconds; and then when the foregoing 20 seconds end, the signal in the feedforward path is processed by sequentially using (712 Hz, −11.2 dB), (1024 Hz, −12.4 dB), (1544 Hz, −14.4 dB), (2272 Hz, −17.2 dB) and (3000 Hz, −20 dB) within subsequent 500 milliseconds.

Similarly, filtering parameters respectively corresponding to different wind noise control states may be determined with reference to FIG. 36, and are not enumerated in this embodiment.

In this embodiment, the headset includes the earphone corresponding to the left ear and the earphone corresponding to the right ear. In the following embodiment, the earphone corresponding to the left ear is referred to as the left earphone for short, and the earphone corresponding to the right ear is referred to as the right earphone. When the user uses the headset, the user may wear one earphone (the left earphone or the right earphone) or two earphones (the left earphone and the right earphone). It should be understood that the left earphone and the right earphone each have a similar hardware structure, and both have a corresponding microphone, ANC chip, micro control unit, and the like. In a noise cancellation process, the left earphone and the right earphone separately perform the ANC method.

When the left ear and the right ear of the user respectively wear the earphones, because the wind noise is random, wind noise features of the left earphone and the right earphone are different. As a result, wind noise levels of the left ear and the right ear may be different, causing inconsistent listening experience of the left ear and the right ear. This affects user experience. Therefore, the ANC method provided in this embodiment further includes: synchronously performing wind noise control on the left ear and the right ear of the user. For example, the wind noise control state corresponding to the left ear and the wind noise control state corresponding to the right ear are separately determined based on the step 24025*a* to the step 24025*b*, and then the wind noise control state corresponding to the left ear and the wind noise control state corresponding to the right ear are synchronized, to update the filtering parameters based on the synchronized wind noise control states. The left earphone performs noise cancellation processing based on the filtering parameters, and the right earphone also performs noise cancellation processing based on the filtering parameters.

Optionally, a method for synchronizing the wind noise control state corresponding to the left ear and the wind noise control state corresponding to the right ear further includes adjusting, based on priorities of the wind noise control states, a wind noise control state with a low priority in the wind noise control state corresponding to the left ear and the wind noise control state corresponding to the right ear to a wind noise control state with a high priority.

In this embodiment, the left earphone and the right earphone may communicate with each other through BLUETOOTH. When the left earphone detects the wind noise control state and the right earphone detects that the wind noise control state changes, the left earphone and the right earphone respectively notify each other of respective wind noise control states, and further synchronize the wind noise control states according to the foregoing priority policy. Optionally, in six wind noise control states shown in the following Table 2, wind noise control states of the left ear and the right ear need to be synchronized, that is, when the wind noise control state corresponding to the left earphone or the right earphone is any one in Table 2, respective wind noise control states need to be sent to each other for synchronization.

TABLE 2

| State No. | State |
|---|---|
| 1 | State from no wind to a light wind |
| 2 | State from a light wind to a strong wind |
| 3 | State from a strong wind to a light wind |
| 4 | State from a strong wind, a light wind to a strong wind |
| 5 | State from a light wind to no wind |
| 6 | State from a light wind, no wind to a light wind |

With reference to Table 2, in an implementation, priorities of the foregoing six wind noise control states in descending order are: 2, 4, 3, 6, 1, and 5. When one earphone enters a wind noise control state with a high priority, the other earphone synchronously enters the wind noise control state. For example, if a wind noise control state (a state number) corresponding to the left earphone is 4, the left earphone sends the wind noise control state 4 to the right earphone. If a wind noise control state corresponding to the right earphone is 1, the right earphone needs to change the wind noise control state corresponding to the right earphone to 4, that is, keep synchronous with the wind noise control state corresponding to the right earphone.

It should be noted that, for the wind noise control state 3 (the state from the strong wind to the light wind) and the wind noise control state 4 (the state from the strong wind, the light wind to the strong wind), a priority of the wind noise control state 3 may also be the same as a priority of the wind noise control state 4. For example, if the left ear first enters the wind noise control state 3, and then the right ear enters the wind noise control state 4, because the priority of the wind noise control state 3 is the same as the priority of the wind noise control state 4, the left ear and the right ear maintain respective wind noise states, and do not need to be synchronized. Similarly, for the wind noise control state 1 (the state from no wind to the light wind) and the wind noise control state 6 (the state from the light wind, no wind to the light wind), a priority of the wind noise control state 1 may be the same as a priority of the wind noise control state 6.

With reference to the description of the foregoing embodiment, it can be learned that the application (App) corresponding to the headset is installed on the terminal. After the user starts the application and establishes the communication connection to the headset (the left earphone and/or the right earphone), the user may perform the corresponding operation on the terminal, to control the headset to work in different working modes, for example, enable the headset to work in the ANC working mode.

Optionally, in an implementation, when the headset works in the ANC working mode, different noise cancellation modes may be further selected in the ANC working mode. For example, the user may enable one or more control modes of the howling noise, the clipping noise, the noise floor, or the wind noise based on a characteristic of an environment in which the user is currently located. For example, if the user is currently on a hillside with a strong wind, the user may enable a wind noise control mode, to detect wind noise and perform noise cancellation.

Figure 37:
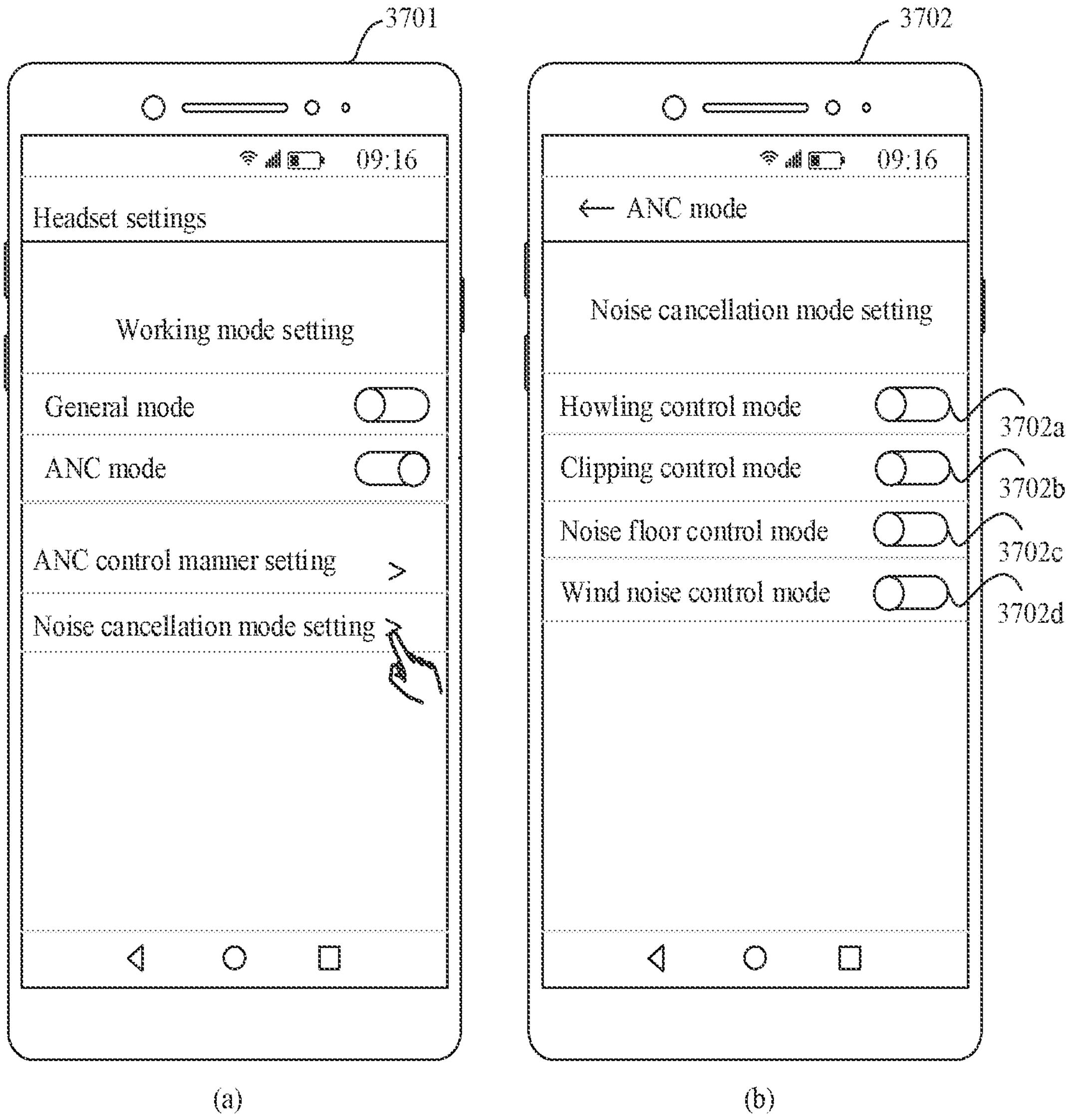
FIG. 37 is a schematic diagram of display effect in an ANC method according to an embodiment.

For example, with reference to FIG. 17, after the user enables the ANC function of the headset, the terminal may further display a setting interface in the ANC working mode. The setting interface includes at least the option for setting the ANC control manner and the option for setting the noise cancellation mode in the foregoing embodiment. Refer to an interface 3701 shown in (a) in FIG. 37. Optionally, when the user selects the option of setting the ANC control manner, the terminal displays the interface shown in (b) in FIG. 18A or (b) in FIG. 18B in the foregoing embodiment. Optionally, when the user selects the option for setting the noise cancellation mode, the terminal displays an interface 3702 shown in (b) in FIG. 37. The interface 3702 includes options of different noise control modes. For example, the interface 3702 includes a "howling control mode" option 3702*a*, a "clipping control mode" option 3702*b*, a "noise floor control mode" option 3702*c*, and a "wind noise control mode" option 3702*d*. When the user selects the "wind noise control mode" option 3702*d* on the interface 3702, for example, the user taps the "wind noise control mode" option 3702*d*, the headset performs wind noise detection and noise cancellation processing. Certainly, the user may simultaneously enable one control mode or a plurality of control modes based on an actual requirement.

Optionally, the ANC method provided in this embodiment further includes: The terminal displays a noise detection result. The noise detection result includes at least one of the following: howling noise, clipping noise, noise floor, or wind noise.

In this embodiment, after the headset detects the abnormal noise, the headset sends indication information to the terminal, to indicate a type of the abnormal noise, so that the terminal displays the noise detection result.

Figure 38:
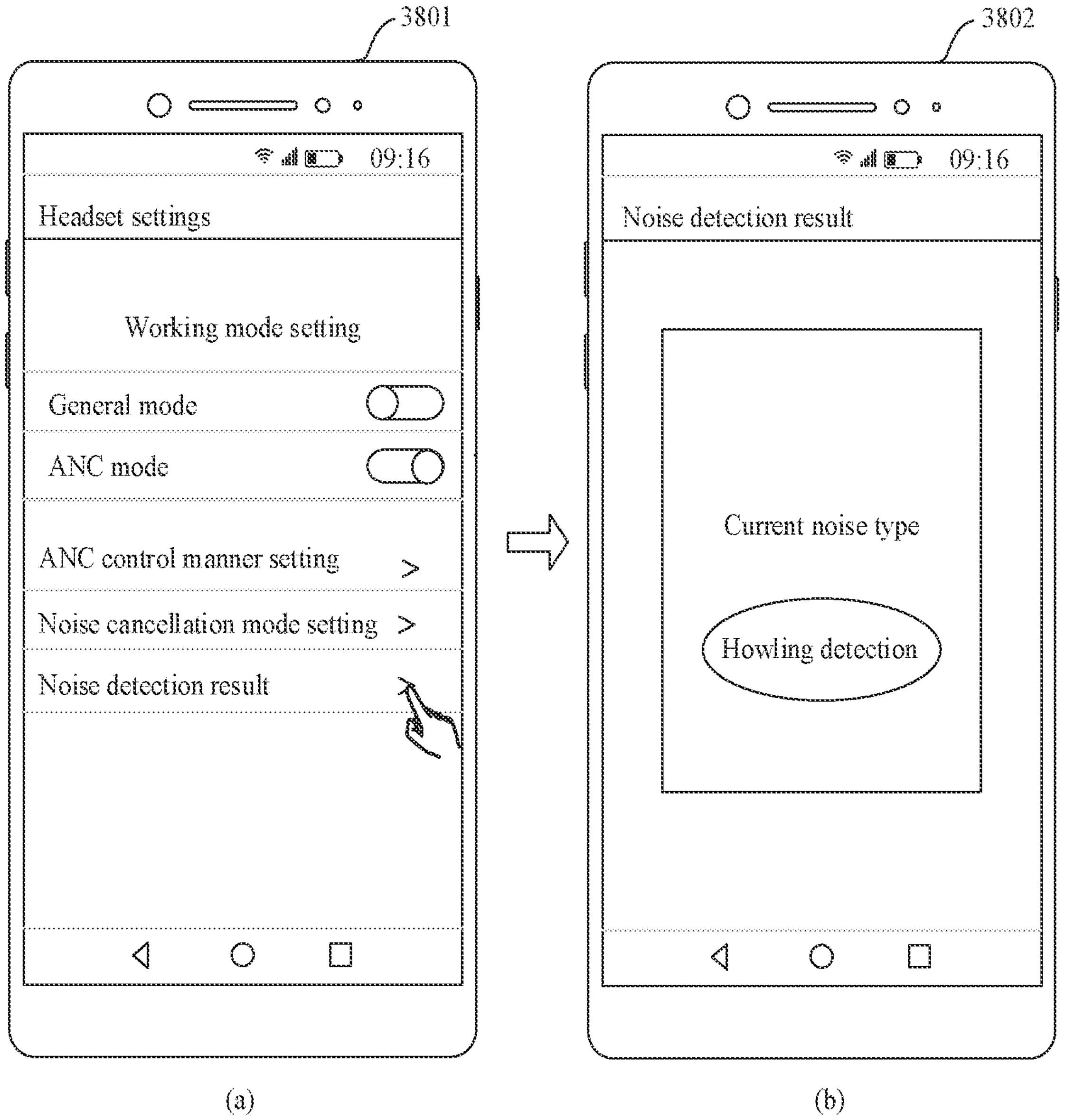
FIG. 38 is a schematic diagram of display effect in an ANC method according to an embodiment.

Optionally, in an implementation, after the ANC working mode of the headset is enabled, the terminal may further display a setting list in the ANC working mode. The setting list includes at least the option for setting the ANC control manner and the option for setting the ANC noise cancellation mode in the foregoing embodiment, and may further include an option for viewing the noise detection result. For example, as shown in FIG. 38, after the user enables the ANC working mode, the terminal displays an interface 3801 shown in (a) in FIG. 38, and a "noise cancellation mode setting" option and a "noise detection result" option are displayed below an "ANC mode" option on the interface 3801. When the user selects the "noise detection result" option, the terminal displays an interface 3802 shown in (b) in FIG. 38. The interface 3802 displays a type of currently detected noise. For example, it is detected that the current noise is howling noise.

Optionally, the ANC method provided in this embodiment further includes: The terminal displays the index corresponding to the filtering parameters. The index is an index of the current filtering parameters in a preset filtering parameter set.

In this embodiment, the indexes of the filtering parameters may be represented in different levels. For example, the filtering parameters include $N_1$ levels, and all levels correspond to different filtering parameters. Optionally, the levels of the filtering parameters are displayed on the terminal in a disk form, or may be displayed in a strip form, or certainly may be displayed in another form. This is not limited in this embodiment.

The headset detects that the abnormal noise exists, further updates the filtering parameters based on a group of initialized filtering parameters, and displays an index (that is, a level) of the updated filtering parameters by using a display of the terminal, so that the user can intuitively learn of a current noise cancellation status (for example, FIG. 20).

Figure 39:
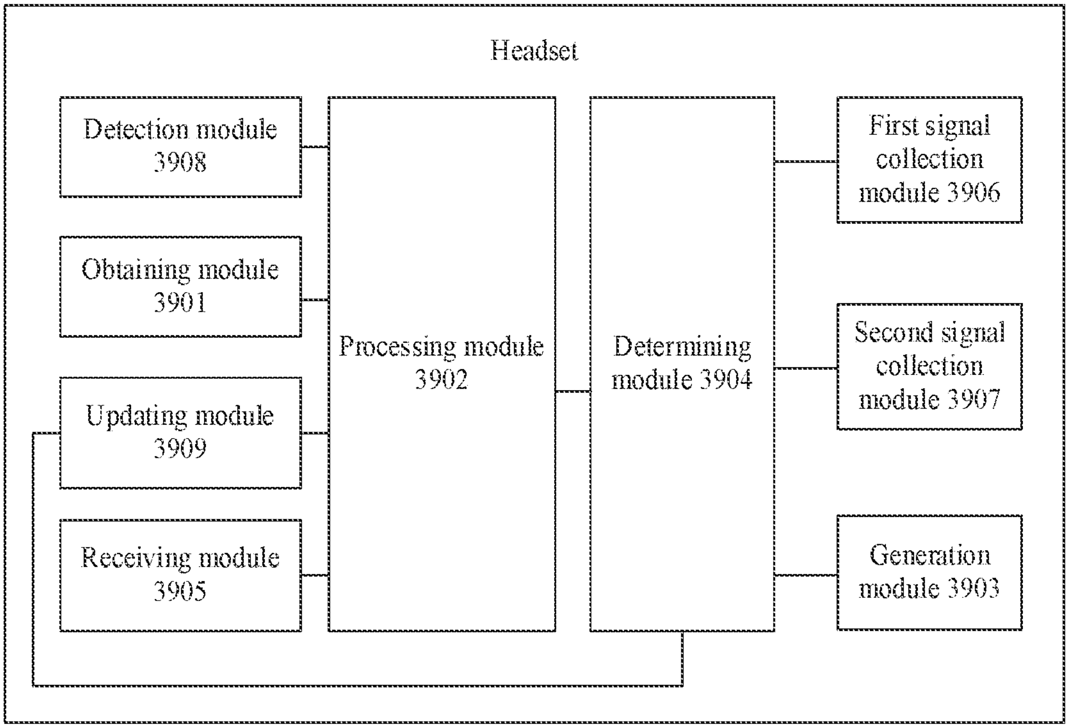
FIG. 39 is a schematic diagram of a structure of a headset according to an embodiment.

Correspondingly, an embodiment provides a headset. As shown in FIG. 39, the headset includes an obtaining module 3901 and a processing module 3902. The obtaining module 3901 is configured to obtain a first group of filtering parameters when the headset is in an ANC working mode. The first group of filtering parameters is one of $N_1$ groups of filtering parameters prestored in the headset. For example, the obtaining module 3901 is configured to perform the step 901 in the foregoing method embodiment. The processing module 3902 is configured to perform noise cancellation by using the first group of filtering parameters. For example, the processing module 3902 is configured to perform the step 902 in the foregoing method embodiment.

Optionally, the headset provided in this embodiment further includes a generation module 3903, a determining module 3904, a receiving module 3905, a first signal collection module 3906, a second signal collection module 3907, a detection module 3908, and an updating module 3909. The generation module 3903 is configured to perform the step 903 (including the step 9031) and the step 1605 in the foregoing method embodiment. The determining module 3904 is configured to perform the step 905 and the step 1002 to the step 1004, or the step 1102 to the step 1105, or the step 1202 to the step 1204, or the step 1302 to the step 1304, or the step 1402 to the step 1403, and the step 1609 in the foregoing method embodiment. The receiving module 3905 is configured to perform the step 1603 and the step 1608 in the foregoing embodiment. The first signal collection module 3906 is configured to perform the step 1001, the step 1101, the step 1201, the step 1301, the step 2403, and the like in the foregoing method embodiment. The second signal collection module 3907 is configured to perform the step 1101, the step 1201, the step 1301, the step 2403, and the like in the foregoing method embodiment. The detection module 3908 is configured to update the first group of filtering parameters. For example, the detection module 3908 is configured to perform the step 2401 in the foregoing method embodiment. The updating module 3909 is configured to perform the step 2402 in the foregoing method embodiment.

The foregoing modules may further perform other related actions in the foregoing method embodiment. For example, the obtaining module 3901 is further configured to perform the step 904 and the step 1401, and the processing module 3902 is further configured to perform the step 906, the step 1604, the step 16010, and the step 2404. For details, refer to descriptions of the foregoing embodiment. Details are not described herein again.

Similarly, the apparatus embodiment described in FIG. 39 is merely an example. For example, division into the units (or modules) is merely logical function division, and there may be other division manners in actual implementation. For example, a plurality of units or components may be combined or integrated into another system, or some features may be ignored or may not be performed. Functional units in embodiments may be integrated into one module, or each of the modules may exist alone physically, or two or more units may be integrated into one module. The foregoing modules in FIG. 39 may be implemented in a form of hardware, or may be implemented in a form of a software functional unit. For example, when software is used for implementation, the obtaining module 3901, the processing module 3902, the generation module 3903, the determining module 3904, the detection module 3908, and the updating module 3909 may be implemented by software functional modules generated after the processor of the headset reads program code stored in a memory. The foregoing modules may also be respectively implemented by different hardware of the headset. For example, the obtaining module 3901, the generation module 3903, the determining module 3904, the detection module 3908, and the updating module 3909 are implemented by a part of processing resources (for example, one core or two cores in a multi-core processor) in a micro control unit (for example, the micro control unit 202 in FIG. 2) of the headset, and the processing module 3902 is implemented by an ANC chip (for example, the ANC chip 203 in FIG. 2) of the headset. Refer to FIG. 2. The first signal collection module 3906 is implemented by an error microphone of the headset. The second signal collection module 3907 is implemented by a reference microphone of the headset. The receiving module 3905 is implemented by a network interface and the like of the headset. Apparently, the foregoing functional modules may alternatively be implemented by a combination of software and hardware. For example, the detection module 3908 and the updating module 3909 are software functional modules generated after the processor reads the program code stored in the memory.

For more details about implementing the foregoing function by the modules included in the headset, refer to the descriptions in the foregoing method embodiment. Details are not described herein again.

Embodiments in this specification are all described in a progressive manner, for same or similar parts in embodiments, refer to these embodiments, and each embodiment focuses on a difference from other embodiments.

Figure 40:
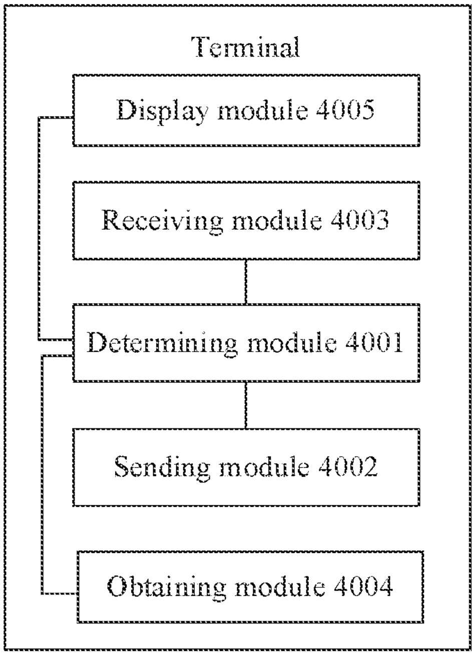
FIG. 40 is a schematic diagram of a structure of a terminal according to an embodiment.

An embodiment further provides a terminal. As shown in FIG. 40, the terminal includes a determining module 4001 and a sending module 4002. The determining module 4001 is configured to determine a first group of filtering parameters. The first group of filtering parameters is one of $N_1$ groups of filtering parameters prestored in a headset. For example, the determining module 4001 is configured to perform the step 1601 in the foregoing method embodiment, and the step 1601 further includes the step 16011*b* to the step 16011*e*, the step 16012*b* to the step 16012*e*, the step 16013*b* to the step 16013*e*, the step 16014*b* to the step 16014*d*, or the step 16015*b* to the step 16015*d*. The sending module 4002 is configured to send first indication information to the headset. The first indication information indicates the headset to perform noise cancellation by using the first group of filtering parameters. For example, the sending module 4002 is configured to perform the step 1602 and the like in the foregoing method embodiment.

Optionally, the terminal provided in this embodiment further includes a receiving module 4003, an obtaining module 4004, and a display module 4005. The receiving module 4003 is configured to perform the step 16011*a*, the step 16012*a*, the step 16013*a*, the step 16014*a*, the step 16015*a*, the step 1601*b*, the step 1606*b*, and the like in the foregoing method embodiment. The obtaining module 4004 is configured to perform the step 16011*a*, the step 16012*a*, the step 16013*a*, the step 16015*a*, and the like in the foregoing method embodiment. The display module 4005 is configured to perform the step 1601*a*, the step 1606*a*, and the like in the foregoing method embodiment.

The foregoing modules may further perform other related actions in the foregoing method embodiment. For example, the determining module 4001 is further configured to perform the step 1601*c*, the step 1606, the step 1606*c*, and the like. The sending module is further configured to perform the step 1607. For details, refer to descriptions of the foregoing embodiment. Details are not described herein again.

Similarly, the apparatus embodiment described in FIG. 40 is merely an example. For example, division into the units (or modules) is merely logical function division, and there may be other division manners in actual implementation. For example, a plurality of units or components may be combined or integrated into another system, or some features may be ignored or may not be performed. Functional units in embodiments may be integrated into one module, or each of the modules may exist alone physically, or two or more units may be integrated into one module. The foregoing modules in FIG. 40 may be implemented in a form of hardware, or may be implemented in a form of a software functional unit. For example, when software is used for implementation, the determining module 4001 and the obtaining module 4004 may be implemented by software functional modules generated after a processor of the terminal reads program code stored in a memory. The foregoing modules may also be respectively implemented by different hardware of the terminal. For example, the determining module 4001 is implemented by a part of processing resources (for example, one core or two cores in a multi-core processor) in the processor of the terminal, or is implemented by a programmable device such as a field-programmable gate array (FPGA) or a coprocessor. The sending module 4002 and the receiving module 4003 are implemented by a network interface and the like of the terminal. The display module 4005 is implemented by a display of the terminal.

For more details about implementing the foregoing function by the modules of the terminal, refer to the descriptions in the foregoing method embodiment. Details are not described herein again.

With reference to the foregoing descriptions of the filtering parameters of the headset and the leakage states between the headset and the ear canal, it should be noted that in this embodiment, N groups of filtering parameters are prestored in the headset. The N groups of filtering parameters are respectively used to perform noise cancellation on ambient sound in N leakage states. Noise cancellation effect obtained when the N groups of filtering parameters are applied to the headset varies with the leakage state between the headset and the ear canal.

Optionally, recording signals corresponding to N different ear canal environments may be processed to generate N groups of filtering parameters, and the N groups of filtering parameters are stored in a memory of a semi-open ANC earphone. It should be understood that the N groups of filtering parameters are used to perform noise cancellation on ambient sound in N leakage states, and are universally applicable, to meet personalized requirements of different people. For a method for generating the N groups of filtering parameters, refer to related descriptions in the foregoing embodiment. Details are not described herein again.

When a user wears the semi-open ANC earphone, and the semi-open ANC earphone is in an ANC working mode, the N groups of filtering parameters are used as alternative filtering parameters for selection.

It should be understood that a scenario in which the user uses the ANC earphone is as follows: In an online running process of the headset whose ANC function is enabled, a wearing state of the headset changes, causing a change in the leakage state between the headset and the ear canal. A group of filtering parameters that is currently applied to the headset is no longer a group of optimal filtering parameters, that is, noise cancellation effect obtained when the headset performs noise cancellation by using the group of current filtering parameters deteriorates. This affects listening experience of the user. For example, in the online running process of the headset, the headset is not away from the ear, and the user manually adjusts the headset when feeling uncomfortable in a current wearing posture, or a sealing degree (or fitness) between the headset and the ear canal of the user changes due to impact of another external factor, for example, a sealing degree decreases or a sealing degree increases.

Figure 41:
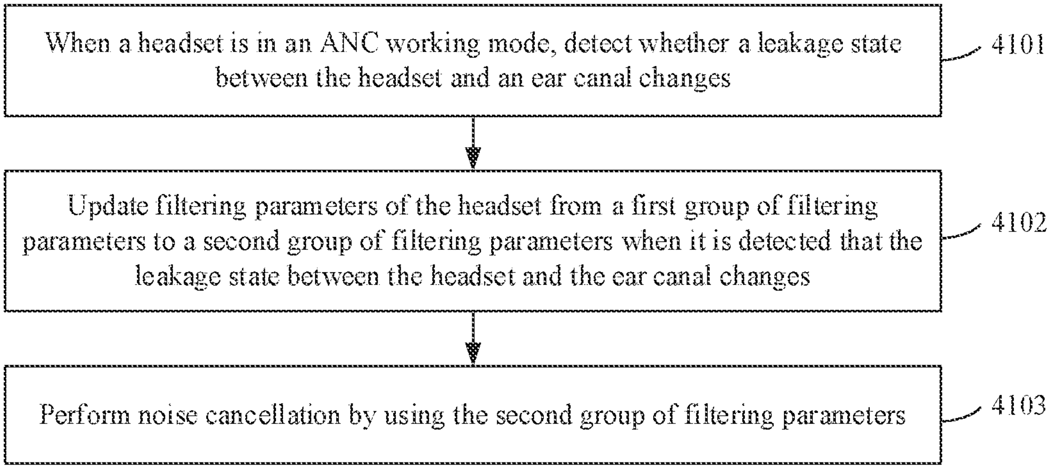
FIG. 41 is a schematic diagram of an ANC method according to an embodiment.

In view of this, an embodiment provides an ANC method, applied to a headset having an ANC function. As shown in FIG. 41, the ANC method includes step 4101 to step 4103.

Step 4101: When the headset is in an ANC working mode, detect whether a leakage state between the headset and an ear canal changes.

In this embodiment, the leakage states are formed by the headset and different ear canal environments. The ear canal environment is related to an ear canal feature of the user and a posture of wearing the headset by the user. Combinations of different ear canal features and different postures of wearing the headset may form a plurality of ear canal environments, and also correspond to a plurality of leaking states.

It should be understood that the foregoing N leakage states may represent N ranges of fitness between the headset and a human ear, and may represent N sealing degrees between the headset and the human ear. Any leakage state does not specifically refer to a specific wearing state of the headset, but is a typical or differentiated leakage scenario obtained by performing a large amount of statistics collection based on an impedance characteristic of the leakage state.

A wearing state of the headset corresponds to an ear canal environment, to form a leakage state. The wearing state of the headset varies with the ear canal feature of the user and a change in the posture of wearing the headset by the user. The current wearing state of the headset corresponds to a stable ear canal environment, that is, corresponds to a stable ear canal feature and wearing posture. Noise cancellation effect obtained when the foregoing N groups of filtering parameters are applied to the headset varies with the wearing state of the headset.

It should be understood that, in this embodiment, when the sealing degree between the headset and the human ear changes, and noise cancellation effect obtained when a first group of filtering parameters is applied to the headset deteriorates, a leakage state between the headset and the ear canal changes.

Optionally, in this embodiment, a frequency band (or a detection frequency band) for detecting whether the leakage state between the headset and the ear canal changes may be set based on an actual situation. For example, the detection frequency band may be a low and medium frequency band of 100 Hz to 1 kHz, 125 Hz to 500 Hz or the like, or another frequency band. This is not limited in this embodiment.

Step 4102: Update filtering parameters of the headset from the first group of filtering parameters to a second group of filtering parameters when it is detected that the leakage state between the headset and the ear canal changes.

The first group of filtering parameters and the second group of filtering parameters are respectively two different groups of filtering parameters in N groups of filtering parameters prestored in the headset. The N groups of filtering parameters are respectively used to perform noise cancellation on ambient sound in N leakage states. The N leakage states are formed by the headset and N different ear canal environments.

It should be noted that, in a current wearing state of the headset, for same ambient noise, noise cancellation effect obtained when the second group of filtering parameters is applied to the headset is better than noise cancellation effect obtained when another filtering parameter in the N groups of filtering parameters is applied to the headset.

In this embodiment, the ambient noise is noise formed by an external environment in the ear canal of the user, and the ambient noise includes background noise in different scenarios, for example, a high-speed railway scenario, an office scenario, and an aircraft flight scenario. This is not limited in this embodiment.

The first group of filtering parameters is a group of filtering parameters applied to the headset when the leakage state between the headset and the ear canal does not change. Optionally, the first group of filtering parameters may be a group of initial filtering parameters determined after the ANC function of the headset is enabled, for example, a group of optimal filtering parameters which is adapted to the user by using a prompt tone as test audio in a process of playing the prompt tone indicating that ANC is enabled, or a group of initial filtering parameters set in another manner. Alternatively, the first group of filtering parameters may be a group of filtering parameters updated last time in an online running process of the headset when the ANC method provided in this embodiment is implemented. This is not specifically limited in this embodiment.

Step 4103: Perform noise cancellation by using the second group of filtering parameters.

In this embodiment, with reference to FIG. 4, performing noise cancellation by using the second group of filtering parameters further includes: processing, by using the second group of filtering parameters, a sound signal collected by a reference microphone of the headset and a sound signal collected by an error microphone of the headset, to generate an anti-noise signal. The anti-noise signal can weaken some ambient noise signals in the ear canal, to weaken a noise signal in the ear canal of the user, so as to implement noise cancellation on ambient sound.

Optionally, in this embodiment, in the foregoing process of updating the filtering parameters of the headset from the first group of filtering parameters to the second group of filtering parameters and performing noise cancellation by the headset by using the second group of filtering parameters, the step 4101 may continue to be performed, to detect whether the leakage state between the headset and the ear canal changes. When the leakage state between the headset and the ear canal changes again, the filtering parameters of the headset continue to be updated.

According to the ANC method provided in this embodiment, after the ANC function of the headset is enabled, in a process in which a user uses the headset, the filtering parameter of the headset may be adaptively updated based on a change in the leakage state between the headset and the ear canal, and noise cancellation is performed based on the updated filtering parameter. This can improve noise cancellation effect.

The ANC method provided in this embodiment may be applied to a scenario in which the headset has no downlink signal, or may be applied to a scenario in which the headset has a downlink signal.

Optionally, in this embodiment, a method for determining whether the headset has the downlink signal may include: in a running process of the headset, obtaining the downlink signal of the headset; and if energy of the downlink signal of the headset is less than a first preset energy threshold, determining that the headset has no downlink signal; or if energy of the downlink signal of the headset is greater than or equal to a first preset energy threshold, determining that the headset has the downlink signal.

In an implementation, the energy of the downlink signal may be frame energy of the downlink signal. After the downlink signal of the headset is obtained, filtering processing is performed on the downlink signal to obtain a downlink signal in the detection frequency band, and then the frame energy of the downlink signal is calculated. When the frame energy of the downlink signal is less than the first preset energy threshold, it is determined that there is no downlink signal.

In another implementation, the energy of the downlink signal may be total energy of an amplitude spectrum. After the downlink signal of the headset is obtained, short-time Fourier transform is performed on the downlink signal, and the total energy of the amplitude spectrum of the downlink signal in the detection frequency band is calculated. When the total energy of the amplitude spectrum of the downlink signal is less than the first preset energy threshold, it is determined that the headset has no downlink signal.

It should be noted that when the energy of the downlink signal is defined in different manners, the foregoing first preset energy thresholds corresponding to the different definition manners may be different. The first preset energy threshold may be set based on an actual requirement. This is not limited in this embodiment.

Figure 42A:
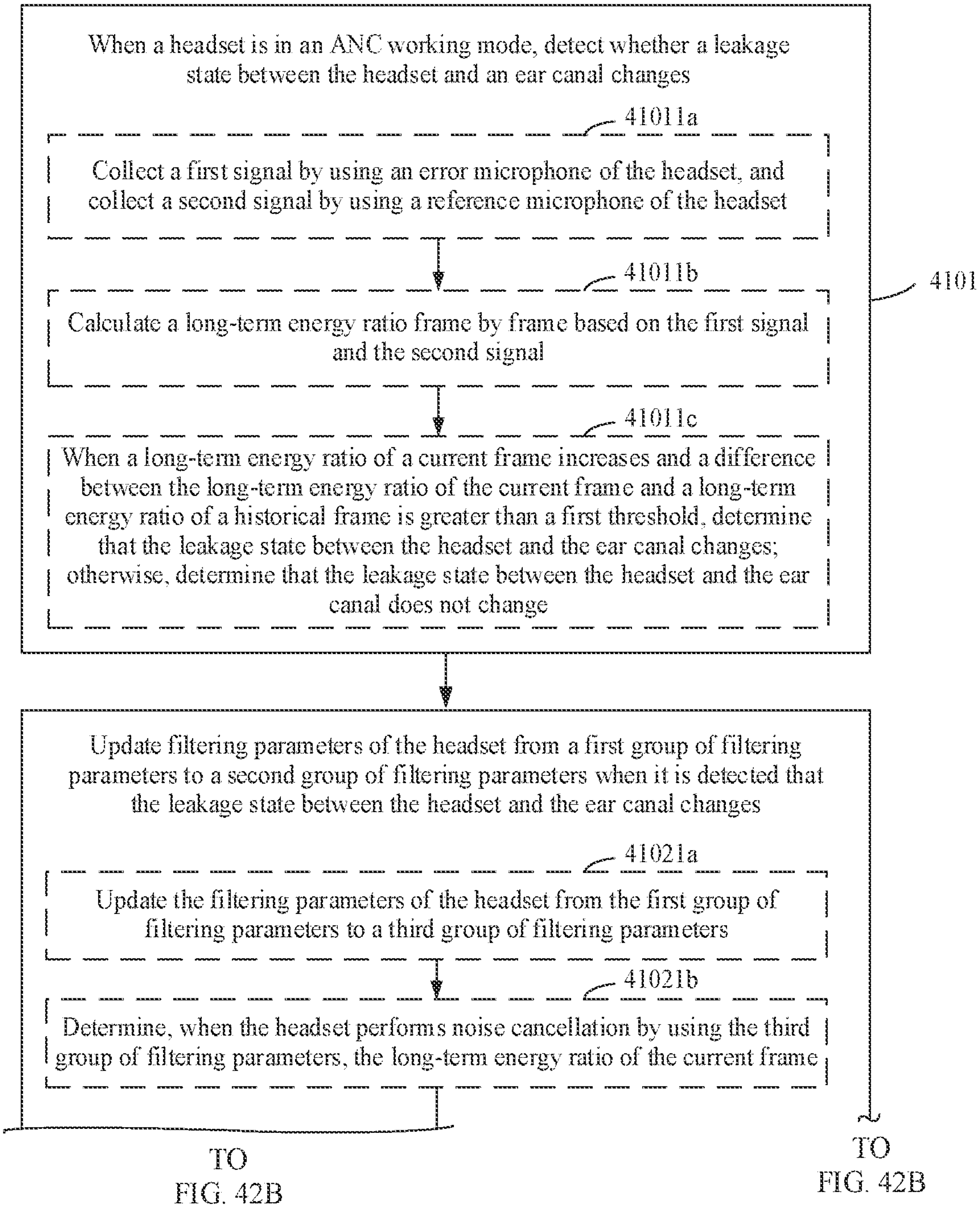
FIG. 42A and FIG. 42B are a schematic diagram of an ANC method according to an embodiment.
Figure 42B:
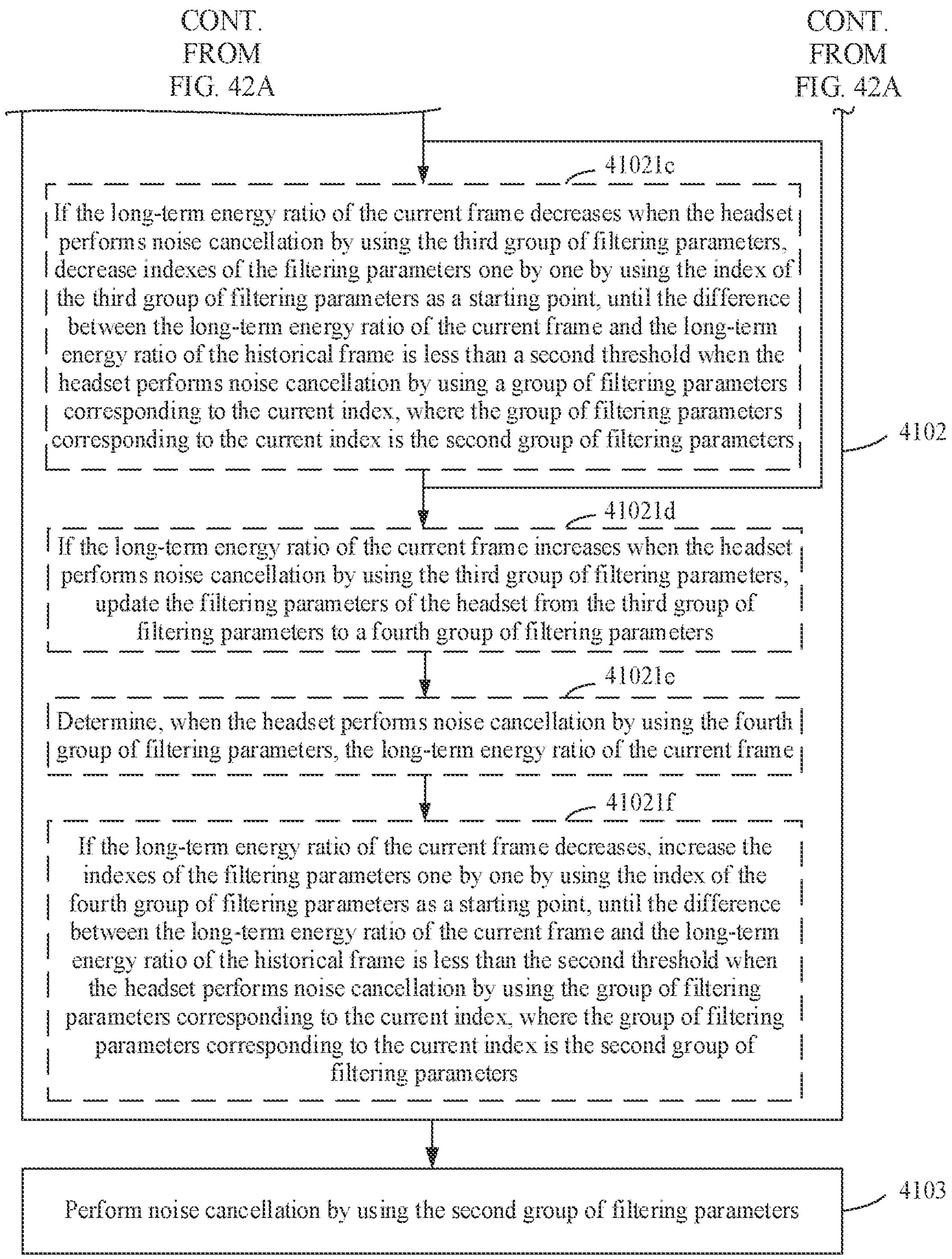

With reference to FIG. 41, as shown in FIG. 42A and FIG. 42B, for a scenario in which the headset has no downlink signal, the step 4101 (that is, detecting whether the leakage state between the headset and the ear canal changes) may be performed by performing step 41011*a* to step 41011*c*.

Step 41011*a*: Collect a first signal by using the error microphone of the headset, and collect a second signal by using the reference microphone of the headset.

Step 41011*b*: Calculate a long-term energy ratio frame by frame based on the first signal and the second signal.

Optionally, a sampling frequency of the first signal or the second signal is a frequency of 16 kHz, and duration of each frame of signal may be preset, for example, set to 5 milliseconds (ms) or 20 ms. This is specifically set based on an actual situation, and is not limited in this embodiment.

In this embodiment, a long-term energy ratio of an audio frame is an indicator reflecting noise cancellation effect. A larger long-term energy ratio indicates worse noise cancellation effect, and a smaller long-term energy ratio indicates better noise cancellation effect.

Calculating a long-term energy ratio of a current frame is used as an example. In an implementation, the long-term energy ratio of the current frame may be implemented by using the following A1 to A2.

A1: Calculate an average energy ratio of average energy of the current frame of the first signal to that of the current frame of the second signal.

In this embodiment, the average energy ratio of the average energy of the current frame of the first signal to that of the current frame of the second signal is calculated according to the following formula (1):

$$R(m) = \frac{P_{err}(m)}{P_{ref}(m)}. \quad (1)$$

R(m) is the average energy ratio of the average energy of the current frame of the first signal to that of the current frame of the second signal, $P_{err}(m)$ is average energy of the current frame of the first signal, $P_{ref}(m)$ is average energy of the current frame of the second signal, and the current frame is an mth frame.

A2: Determine the long-term energy ratio of the current frame based on the average energy ratio of the average energy of the current frame of the first signal to that of the current frame of the second signal.

In this embodiment, the long-term energy ratio of the current frame is a smoothing result of energy ratios of the current frame to a historical frame (the historical frame in this embodiment is a frame previous to the current frame). In an implementation, the long-term energy ratio of the current frame may be a smoothing result of the energy ratio of the current frame and the long-term energy ratio of the historical frame. Further, the long-term energy ratio of the current frame is calculated according to the following formula (2):

$$R_{smooth}(m)=\eta*R(m)+(1-\eta)*R_{smooth}(m-1) \quad (2)$$

$R_{smooth}(m)$ is the long-term energy ratio of the current frame, R(m) is the average energy ratio of the current frame, $R_{smooth}(m-1)$ is the long-term energy ratio of the historical frame, η is a smoothing factor, and the historical frame is an $(m-1)^{th}$ frame.

Optionally, in the foregoing A1 to A2, the detection frequency band may be 100 Hz to 1 kHz. After the first signal is collected by using the error microphone, and the second signal is collected by using the reference microphone, filtering processing may be performed on the first signal and the second signal by using a band-pass filter, to obtain a first signal and a second signal in the foregoing detection frequency band.

Calculating the long-term energy of the current frame is used as an example. In an implementation, the long-term energy ratio of the current frame may alternatively be implemented by using the following B1 to B3.

B1: Perform short-time Fourier transform on the first signal and the second signal.

Specifically, short-time Fourier transform is performed on the first signal and the second signal to obtain spectrums of the first signal and the second signal. Optionally, an order of the foregoing short-time Fourier transform may be 256. If a quantity of sampling points included in the signal frame of the first signal or the second signal is less than 256, frame splicing processing is performed on the first signal or the second signal, and the sampling points in the signal frame are spliced into 256 sampling points, that is, a frequency band of 0 Hz to 16 kHz corresponds to 256 frequencies.

B2: Calculate long-term stationary energy (or referred to as smooth energy) of the current frames of the first signal and the second signal at each frequency.

For example, at a frequency $w_i$, the long-term stationary energy of the current frame of the first signal may be calculated according to the following formula (3):

$$P_{err}(m,w_i)=a*P_{err}(m,w_i)+b*P_{err}(m-1,w_i) \quad (3).$$

$P_{err}(m, w_i)$ is the long-term stationary energy of the current frame of the first signal at the frequency $w_i$, $P_{err}(m-1, w_i)$ is the long-term stationary energy of the historical frame of the first signal at the frequency $w_i$, and a and b are smoothing coefficients.

At the frequency $w_i$, the long-term stationary energy of the current frame of the second signal may be calculated according to the following formula (4):

$$P_{ref}(m,w_i)=a*P_{ref}(m,w_i)+b*P_{ref}(m-1,w_i) \quad (4).$$

$P_{ref}(m, w_i)$ is the long-term stationary energy of the current frame of the second signal at the frequency $w_i$, $P_{ref}(m-1, w_i)$ is the long-term stationary energy of the historical frame of the second signal at the frequency $w_i$, and a and b are smoothing coefficients.

B3: Determine the long-term energy ratio of the current frame based on the long-term stationary energy of the current frame of the first signal and the long-term stationary energy of the current frame of the second signal.

First, the long-term stationary energy ratio of the long-term stationary energy of the current frame of the first signal to that of the second signal at each frequency is calculated according to a formula (5):

$$R(m, w_i) = \frac{P_{err}(m, w_i)}{P_{ref}(m, w_i)}. \quad (5)$$

$R(m, w_i)$ is the long-term stationary energy ratio of the long-term stationary energy of the current frame of the first signal to that of the second signal at the frequency $w_i$.

Then, an average value of the long-term stationary energy ratios of the current frame at all the frequencies is calculated. The average value of the long-term stationary energy ratios is the long-term energy ratio of the current frame. For details, refer to the following formula (6):

$$R_{smooth}(m) = \frac{\sum_{i=1}^{K} R(m, w_i)}{K}. \quad (6)$$

$R_{smooth}(m)$ is the long-term energy ratio of the current frame, and K is a total quantity of frequencies corresponding to the current frame.

Optionally, in the foregoing B1 to B3, the detection frequency band may be 100 Hz to 1 kHz. After the short-time Fourier transform is performed on the first signal and the second signal, a transform result in the detection frequency band is selected to calculate the long-term energy ratio of the current frame. In an implementation, an interval between frequencies in the detection frequency band of 100 Hz to 1 kHz is set to 62.5 Hz. The detection frequency band includes 15 frequencies, that is, K=15.

Step 41011*c*: When the long-term energy ratio of the current frame increases and a difference between the long-term energy ratio of the current frame and the long-term energy ratio of the historical frame is greater than a first threshold, determine that the leakage state between the headset and the ear canal changes. Otherwise, determine that the leakage state between the headset and the ear canal does not change.

Based on the step 41011*b*, the long-term energy ratio $R_{smooth}(m)$ of the current frame is obtained, and the difference $R_{smooth}(m)-R_{smooth}(m-1)$ between the long-term energy ratio of the current frame and the long-term energy ratio of the historical frame is used to measure a change amplitude of the long-term energy ratio of the current frame. If $R_{smooth}(m)-R_{smooth}(m-1)>0$, the long-term energy ratio of the current frame increases, and noise cancellation effect of the headset deteriorates. If $R_{smooth}(m)-R_{smooth}(m-1)<0$, the long-term energy ratio of the current frame decreases, and noise cancellation effect of the headset becomes better.

In this embodiment, if an increase amplitude of the long-term energy ratio of the current frame is greater than the first preset threshold, that is $R_{smooth}(m)-R_{smooth}(m-1)>\Delta 1$, ($\Delta 1$ is the first threshold, and $\Delta 1$ is greater than 0), it indicates that the leakage state between the headset and the ear canal changes, and because the leakage state between the headset and the ear canal changes, noise cancellation effect of the headset deteriorates. In this case, the filtering parameters of the headset need to be updated, to improve the noise cancellation effect of the headset.

It should be understood that, when the leakage state between the headset and the ear canal changes, the sealing degree between the headset and the human ear may increase, or the sealing degree of the headset may decrease, that is, both a higher sealing degree and a lower sealing degree of the headset may affect the noise cancellation effect of the headset. As a result, noise cancellation effect obtained when the headset performs noise cancellation by using a group of current filtering parameters (for example, the first group of filtering parameters) deteriorates.

In this embodiment, if the increase amplitude of the long-term energy ratio of the current frame is less than or equal to the first preset threshold, that is $R_{smooth}(m)-R_{smooth}(m-1)\leq\Delta 1$, ($\Delta 1$ is the first threshold, and $\Delta 1$ is greater than 0), it indicates that the leakage state between the headset and the ear canal does not change, and the noise cancellation effect of the headset does not deteriorate. In this case, the filtering parameters of the headset do not need to be updated, that is, the headset continues to perform noise cancellation by using the group of current filtering parameters.

Optionally, the N leakage states sequentially corresponding to the N groups of filtering parameters prestored in the headset indicate that the sealing degree between the headset and the human ear changes from high to low, or the N leakage states sequentially corresponding to the N groups of filtering parameters prestored in the headset indicate that the sealing degree between the headset and the human ear changes from low to high. This is not limited in this embodiment.

It should be noted that, in this embodiment, a process of updating the filtering parameters is described by using an example in which the N leakage states sequentially corresponding to the N groups of filtering parameters prestored in the headset indicate that the sealing degree between the headset and the human ear changes from high to low.

Based on the implementation of detecting whether the leakage state between the headset and the ear canal changes in the step 41011*a* to the step 41011*c*, the foregoing step

4102 (updating the filtering parameters of the headset from the first group of filtering parameters to the second group of filtering parameters) may be implemented by performing step 41021*a* to step 41021*c*, or by performing step 41021*a* to step 41021*b* and step 41021*d* to step 41021*f*.

Step 41021*a*: Update the filtering parameters of the headset from the first group of filtering parameters to a third group of filtering parameters.

An index of the first group of filtering parameters in the N groups of prestored filtering parameters is n, and an index of the third group of filtering parameters is n−1.

When $R_{smooth}(m)-R_{smooth}(m-1)>\Delta 1$, it can be learned that the leakage state between the headset and the ear canal changes. In this case, whether the sealing degree between the headset and the human ear increases or decreases cannot be known. It should be understood that, if the sealing degree between the headset and the human ear increases, when the filtering parameters of the headset are updated, an index of the filtering parameters should be decreased, for example, the index of the filtering parameters of the headset is decreased to n−1. If the sealing degree between the headset and the human ear decreases, when the filtering parameters of the headset are updated, an index of the filtering parameters should be increased. For example, the index of the filtering parameters of the headset is increased to n+1.

It can be learned that, when the leakage state between the headset and the ear canal changes, a direction of updating the filtering parameters of the headset may be: decreasing the index of the filtering parameters or increasing the index of the filtering parameters.

It should be noted that, when the leakage state between the headset and the ear canal changes, in the step 41021*a*, the filtering parameters are updated in a manner of decreasing the index of the filtering parameters. For example, the filtering parameters of the headset are updated from the first group of filtering parameters (the index is n) to the third group of filtering parameters (the index is n−1), and noise cancellation effect obtained when the third group of filtering parameters is applied to the headset is detected. Further, whether a direction of updating the filtering parameters this time is appropriate, that is, whether the manner of decreasing the index of the filtering parameters is appropriate, is determined based on the noise cancellation effect obtained when the third group of filtering parameters is applied to the headset.

Step 41021*b*: Determine, when the headset performs noise cancellation by using the third group of filtering parameters, the long-term energy ratio of the current frame.

It should be understood that the long-term energy ratio of the current frame is used to measure the noise cancellation effect of the headset. If the long-term energy ratio of the current frame continues to increase when the headset performs noise cancellation by using the third group of filtering parameters, that is $R_{smooth}(m)-R_{smooth}(m-1)>0$, it indicates that the noise cancellation effect deteriorates. If the long-term energy ratio of the current frame decreases when the headset performs noise cancellation by using the third group of filtering parameters, that is $R_{smooth}(m)-R_{smooth}(m-1)<0$, it indicates that the noise cancellation effect becomes better.

Step 41021*c*: When the headset performs noise cancellation by using the third group of filtering parameters, if the long-term energy ratio of the current frame decreases, decrease indexes of the filtering parameters one by one by using the index of the third group of filtering parameters as a starting point until the difference between the long-term energy ratio of the current frame and the long-term energy ratio of the historical frame is less than a second threshold when the headset performs noise cancellation by using a group of filtering parameters corresponding to the current index. The group of filtering parameters corresponding to the current index is the second group of filtering parameters.

In this embodiment, when the headset performs noise cancellation by using the third group of filtering parameters, the long-term energy ratio of the current frame decreases, that is, $R_{smooth}(m)-R_{smooth}(m-1)<0$, it indicates that the noise cancellation effect of the headset becomes better. In this way, it indicates that the direction of updating the filtering parameters of the headset in the step 41021*a* is appropriate, that is, the manner of decreasing the index of the filtering parameters is feasible.

In this embodiment, after the first group of filtering parameters is updated to the third group of filtering parameters, although the noise cancellation effect obtained when the third group of filtering parameters is applied to the headset becomes better the third group of filtering parameters may not be optimal filtering parameters. Based on this, in this embodiment, after the filtering parameters of the headset are updated from the first group of filtering parameters to the third group of filtering parameters, when the headset performs noise cancellation by using the third group of filtering parameters and a decrease amplitude of the long-term energy ratio of the current frame is greater than the second threshold, the indexes of the filtering parameters continue to decrease one by one by using the index of the third group of filtering parameters as a starting point until the difference between the long-term energy ratio of the current frame and the long-term energy ratio of the historical frame is less than the second threshold when the headset performs noise cancellation by using a group of filtering parameters corresponding to an index. In addition, the group of filtering parameters is determined as the second group of filtering parameters, and subsequently, the headset performs noise cancellation by using the second group of filtering parameters.

In conclusion, for example, when the headset performs noise cancellation by using the first group of filtering parameters, if $R_{smooth}(m)-R_{smooth}(m-1)>\Delta 1$, the index of the filtering parameters of the headset is adjusted from n to n−1. When the headset performs noise cancellation by using the filtering parameters whose index is n−1, if $R_{smooth}(m)-R_{smooth}(m-1)<0$ and $|R_{smooth}(m)-R_{smooth}(m-1)|>\Delta 2$ ($\Delta 2$ is the second threshold, and $\Delta 2$ is greater than 0), the index of the filtering parameters of the headset is adjusted from n−1 to n−2. When the headset performs noise cancellation by using the filtering parameters whose index is n−2, if $R_{smooth}(m)-R_{smooth}(m-1)<0$ and $|R_{smooth}(m)-R_{smooth}(m-1)|\leq\Delta 2$, adjustment of the index of the filtering parameters is stopped, and the filtering parameters whose index is n−2 are determined as a group of filtering parameters suitable for a current leakage state between the headset and the ear canal, that is, the second group of filtering parameters.

Step 41021*d*: If the long-term energy ratio of the current frame increases when the headset performs noise cancellation by using the third group of filtering parameters, update the filtering parameters of the headset from the third group of filtering parameters to a fourth group of filtering parameters.

An index of the fourth group of filtering parameters is n+1.

In this embodiment, when the headset performs noise cancellation by using the third group of filtering parameters, the long-term energy ratio of the current frame increases, that is, $R_{smooth}(m)-R_{smooth}(m-1)>0$, it indicates that the noise cancellation effect of the headset deteriorates. In this way, it indicates that the direction of updating the filtering parameters of the headset in the step 41021_a_ is inappropriate, that is, the manner of decreasing the index of the filtering parameters is not feasible. In this case, the index of the filtering parameters of the headset should be increased. Further, the index of the filtering parameters of the headset is increased from n−1 to n+1, that is, in the step 41021_d_, the filtering parameters are updated in a manner of increasing the index of the filtering parameters.

Step 41021_e_: Determine, when the headset performs noise cancellation by using the fourth group of filtering parameters, the long-term energy ratio of the current frame.

Step 41021_f_: If the long-term energy ratio of the current frame decreases, increase the indexes of the filtering parameters one by one by using the index of the fourth group of filtering parameters as a starting point until the difference between the long-term energy ratio of the current frame and the long-term energy ratio of the historical frame is less than the second threshold when the headset performs noise cancellation by using the group of filtering parameters corresponding to the current index. The group of filtering parameters corresponding to the current index is the second group of filtering parameters.

In this embodiment, when the headset performs noise cancellation by using the fourth group of filtering parameters, the long-term energy ratio of the current frame decreases, that is, $R_{smooth}(m)-R_{smooth}(m-1)<0$, it indicates that the noise cancellation effect of the headset becomes better. In this way, it indicates that the direction of updating the filtering parameters of the headset in the step 41021_d_ is appropriate, that is, the manner of increasing the index of the filtering parameters is feasible.

Similarly, after the third group of filtering parameters is updated to the fourth group of filtering parameters, although noise cancellation effect obtained when the fourth group of filtering parameters is applied to the headset becomes better, the fourth group of filtering parameters may not be optimal filtering parameters. Based on this, in this embodiment, after the filtering parameters of the headset are updated from the third group of filtering parameters to the fourth group of filtering parameters, when the headset performs noise cancellation by using the fourth group of filtering parameters and the decrease amplitude of the long-term energy ratio of the current frame is greater than the second threshold, the indexes of the filtering parameters continue to increase one by one by using the index of the fourth group of filtering parameters as a starting point until the difference between the long-term energy ratio of the current frame and the long-term energy ratio of the historical frame is less than the second threshold when the headset performs noise cancellation by using a group of filtering parameters corresponding to an index. In addition, the group of filtering parameters is determined as the second group of filtering parameters, and subsequently, the headset performs noise cancellation by using the second group of filtering parameters.

In conclusion, for example, when the headset performs noise cancellation by using the first group of filtering parameters, if $R_{smooth}(m)-R_{smooth}(m-1)>\Delta 1$, the index of the filtering parameters of the headset is adjusted from n to n−1. When the headset performs noise cancellation by using the filtering parameters whose index is n−1, if $R_{smooth}(m)-R_{smooth}(m-1)>0$, the index of the filtering parameters of the headset is adjusted from n−1 to n+1. When the headset performs noise cancellation by using the filtering parameters whose index is n+1, if $R_{smooth}(m)-R_{smooth}(m-1)<0$ and $|R_{smooth}(m)-R_{smooth}(m-1)|>\Delta 2$ (Δ2 is the second threshold, and Δ2 is greater than 0), the index of the filtering parameters of the headset is adjusted from n+1 to n+2. When the headset performs noise cancellation by using the filtering parameters whose index is n+2, if $R_{smooth}(m)-R_{smooth}(m-1)<0$ and $|R_{smooth}(m)-R_{smooth}(m-1)|\leq\Delta 2$, adjustment of the index of the filtering parameters is stopped, and the filtering parameters whose index is n+2 are determined as a group of filtering parameters suitable for a current leakage state between the headset and the ear canal, that is, the second group of filtering parameters.

Based on the descriptions of the step 41021_a_ to the step 41021_d_, optionally, if the noise cancellation effect obtained when the first group of filtering parameters is applied to the headset deteriorates, the filtering parameters may be first updated in the manner of increasing the index of the filtering parameters, for example, the index of the filtering parameters of the headset is first adjusted from n to n+1, to determine noise cancellation effect obtained when the filtering parameters whose index is n+1 are applied to the headset. If the noise cancellation effect obtained when the filtering parameters whose index is n+1 are applied to the headset becomes better, it indicates that the manner of increasing the index of the filtering parameters is feasible, to determine whether to continue to increase the index of the filtering parameters. If the noise cancellation effect obtained when the headset performs noise cancellation by using the filtering parameters whose index is n+1 deteriorates, it indicates that the manner of increasing the index of the filtering parameters is not feasible. In this case, the index of the filtering parameters is decreased to n−1, and noise cancellation is performed by using the filtering parameters whose index is n−1. If the noise cancellation effect becomes better, it indicates that the manner of decreasing the index of the filtering parameters is feasible, to determine whether to continue to decrease the index of the filtering parameters. For detailed content descriptions of this implementation, refer to related descriptions of the step 41021_a_ to the step 41021_d_. Details are not described herein again.

It should be understood that, when the N leakage states sequentially corresponding to the N groups of filtering parameters prestored in the headset indicate that the sealing degree between the headset and the human ear changes from low to high, a process of updating the filtering parameters of the headset from the first group of filtering parameters to the second group of filtering parameters is a reverse process of the step 41021_a_ to the step 41021_f_. Based on the descriptions of the step 41021_a_ to the step 41021_f_, the process of updating the filtering parameters of the headset from the first group of filtering parameters to the second group of filtering parameters may be clarified when the N leakage states sequentially corresponding to the N groups of filtering parameters prestored in the headset indicate that the sealing degree between the headset and the human ear changes from low to high. Details are not described in this embodiment.

Figure 43:
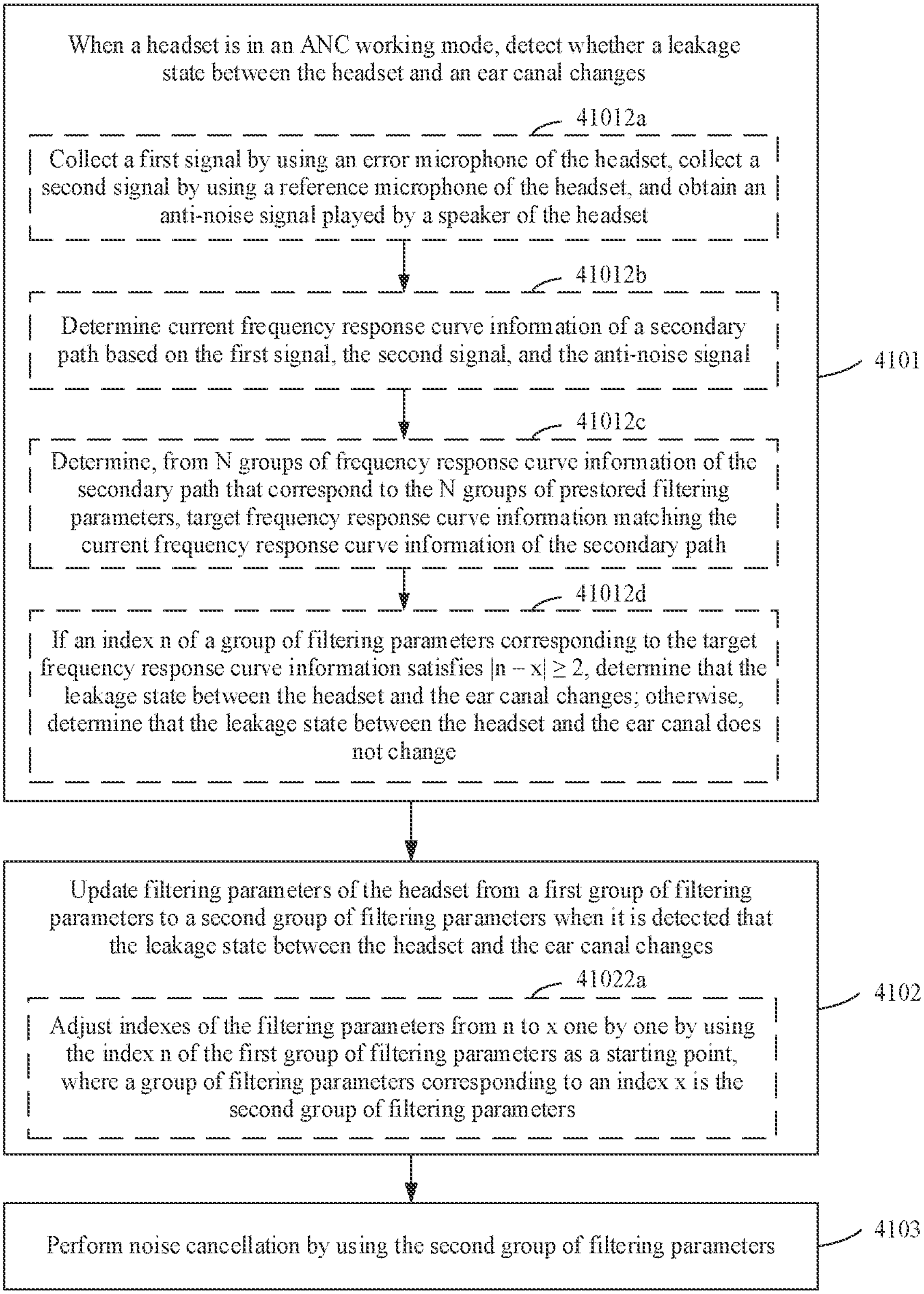
FIG. 43 is a schematic diagram of an ANC method according to an embodiment.

With reference to FIG. 41, as shown in FIG. 43, when the N leakage states sequentially corresponding to the N groups of filtering parameters prestored in the headset indicate that the sealing degree between the headset and the human ear changes from high to low, for a scenario in which the headset has no downlink signal and a current environment is noisy, the foregoing step 4101 may be implemented by performing step 41012_a_ to step 41012_d_.

Step 41012_a_: Collect a first signal by using the error microphone of the headset, collect a second signal by using the reference microphone of the headset, and obtain an anti-noise signal played by a speaker of the headset.

Step 41012*b*: Determine current frequency response curve information of a secondary path based on the first signal, the second signal, and the anti-noise signal.

Optionally, the method for determining the current frequency response curve information of the secondary path based on the first signal, the second signal, and the anti-noise signal may further include calculating a residual signal of the error microphone of the headset based on the first signal and the second signal; and then performing adaptive filtering on the residual signal of the error microphone by using the anti-noise signal as a reference signal, to obtain the current frequency response curve information of the secondary path.

In this embodiment, short-time Fourier transform is separately performed on the first signal, the second signal, and the anti-noise signal, and a transform result in a target noise cancellation frequency band is selected to calculate the current frequency response curve information of the secondary path. Optionally, the target noise cancellation frequency band may be 100 Hz to 1 kHz.

Based on the first signal and the second signal in the target noise cancellation frequency band, the residual signal of the error microphone at each frequency of the headset may be calculated according to the following formula (7). The residual signal of the error microphone is another signal other than an ambient noise signal caused by a change in the leakage state in a signal (that is, the first signal) of the error microphone.

$$X_{res}(w_i)=X_{err}(w_i)-X_{ref}(w_i)*M_{PP}(w_i) \quad (7)$$

$X_{res}(w_i)$ is a spectrum (that is, an amplitude) of the residual signal of the error res microphone at a frequency $w_i$, $X_{err}(w_i)$ is a spectrum of the first signal at the frequency $w_i$, $X_{ref}(w_i)$ is a spectrum of the second signal at the frequency $w_i$, and $M_{PP}(w_i)$ is an average value of values of a plurality of pieces of offline designed frequency response curve information (that is, transfer functions of a primary path) of the primary path at the frequency $w_i$. $X_{ref}(w_i)*M_{PP}(w_i)$ is the ambient noise signal caused by the change in the leakage state.

Optionally, in the foregoing step 41012*a* to step 41012*c*, the detection frequency band may be 100 Hz to 1 kHz. After the short-time Fourier transform is performed on the first signal, the second signal, and the anti-noise signal, the transform result in the detection frequency band is selected to calculate the current frequency response curve information of the secondary path. In an implementation, an interval between frequencies in the detection frequency band of 100 Hz to 1 kHz is set to 62.5 Hz. The detection frequency band includes 15 frequencies, that is, K=15.

After the residual signal of the error microphone is obtained, adaptive filtering is performed on the residual signal of the error microphone by using a Kalman filter and an NLMS filter and by using the anti-noise signal as the reference signal, and an amplitude of a converged filter is calculated, to obtain the current frequency response curve information of the secondary path.

Step 41012*c*: Determine, from N groups of frequency response curve information of the secondary path that correspond to the N groups of prestored filtering parameters, target frequency response curve information matching the current frequency response curve information of the secondary path.

An index of the first group of filtering parameters in the N groups of prestored filtering parameters is n, and an index of a group of filtering parameters corresponding to the target frequency response curve information is x.

Step 41012*d*: If the index x of the group of filtering parameters corresponding to the target frequency response curve information and the index n of the first group of filtering parameters satisfy $|n-x|\geq 2$, determine that the leakage state between the headset and the ear canal changes. Otherwise, determine that the leakage state between the headset and the ear canal does not change.

In this embodiment, if the index x of the group of filtering parameters corresponding to the target frequency response curve information and the index n of the first group of filtering parameters satisfy $|n-x|\geq 2$, it indicates that there is a large deviation between the current frequency response curve information of the secondary path and historical frequency response curve information of the secondary path, that is, it indicates that the noise cancellation effect obtained when the first group of filtering parameters is used to perform noise cancellation deteriorates. In this case, it is determined that the leakage state between the headset and the ear canal changes. If the index x of the group of filtering parameters corresponding to the target frequency response curve information and the index n of the first group of filtering parameters satisfy $|n-x|<2$, it indicates that there is a small deviation between the current frequency response curve information of the secondary path and historical frequency response curve information of the secondary path, that is, it indicates that the noise cancellation effect obtained when the first group of filtering parameters is used to perform noise cancellation does not change. In this case, it is determined that the leakage state between the headset and the ear canal does not change.

Based on the implementation of detecting whether the leakage state between the headset and the ear canal changes described in the foregoing step 41012*a* to step 41012*d*, the foregoing step 4102 may be implemented by performing step 41022*a*.

Step 41022*a*: Adjust indexes of the filtering parameters from n to x one by one by using the index n of the first group of filtering parameters as a starting point. The group of filtering parameters corresponding to the index x is the second group of filtering parameters.

When the filtering parameters of the headset are updated, the index of the filtering parameters is updated from n to x. In a process of adjusting the filtering parameters, to provide good listening experience to the user, the indexes of the filtering parameters are adjusted one by one until the index of the filtering parameters is x in this embodiment, so that the best noise cancellation effect is smoothly achieved.

It should be noted that the ANC method in the step 41012*a* to the step 41012*c* and the step 41022*a* is applicable to an environment with large noise (that is, a noisy environment), and is not applicable to a quiet environment. In a quiet environment, anti-noise is extremely small. With reference to the foregoing step 41012*b*, the frequency response curve information of the secondary path calculated by using the excessively small anti-noise is inaccurate.

Optionally, in this embodiment, whether an environment is noisy may be determined by using the following methods: collecting a third signal by using an external microphone of the headset, where the external microphone of the headset may include a talk microphone or the reference microphone; and determining whether energy of the third signal is greater than a second preset energy threshold. If the energy of the third signal is greater than the preset threshold, it indicates that the environment is noisy. Otherwise, the environment is quiet. Optionally, the energy of the third signal may be long-term stationary energy of the third signal. The long-term stationary energy is an average value of long-term stationary energy of all frequencies in the detection frequency band after short-term Fourier transform is performed on the third signal.

Optionally, the external microphone of the headset may alternatively be another external microphone that can collect ambient noise in addition to the foregoing talk microphone and the reference microphone. This is not limited in this embodiment.

Correspondingly, the method for updating the filtering parameters of the headset from the first group of filtering parameters to the second group of filtering parameters further includes, when the energy of the third signal is greater than the second preset energy threshold or energy of the second signal is greater than a third preset energy threshold, updating the filtering parameters of the headset from the first group of filtering parameters to the second group of filtering parameters.

Figure 44:
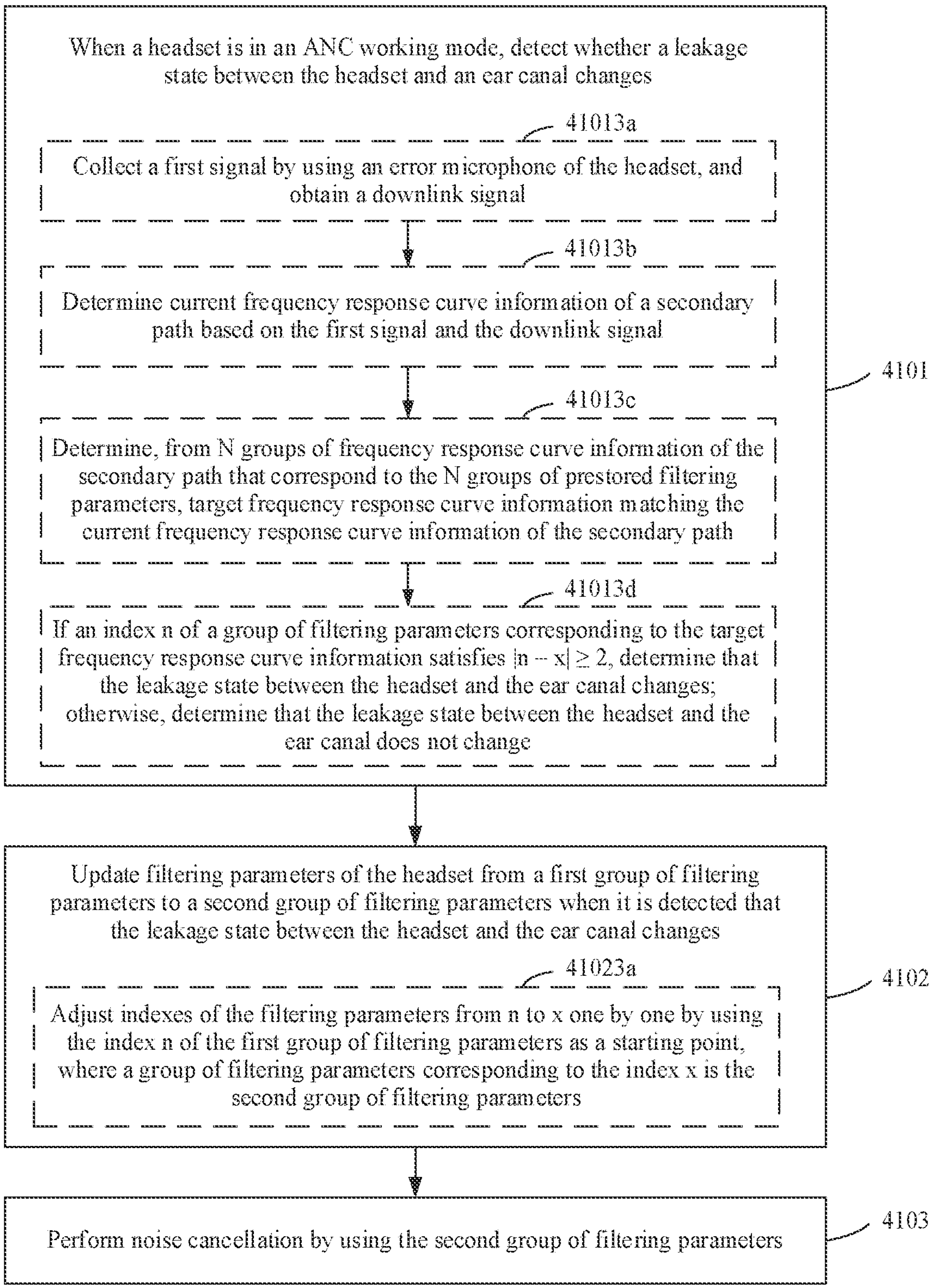
FIG. 44 is a schematic diagram of an ANC method according to an embodiment.

With reference to FIG. 41, as shown in FIG. 44, for a scenario in which the headset has a downlink signal, the step 4101 may be implemented by performed step 41013*a* to step 41013*d*.

Step 41013*a*: Collect a first signal by using the error microphone of the headset, and obtain the downlink signal.

Step 41013*b*: Determine current frequency response curve information of a secondary path based on the first signal and the downlink signal.

Optionally, the method for determining the current frequency response curve information of the secondary path based on the first signal and the downlink signal may further include performing adaptive filtering on the first signal by using the downlink signal as a reference signal, to obtain the current frequency response curve information of the secondary path.

This step is similar to the step 41012*b* in the foregoing embodiment. Adaptive filtering is performed on the first signal by using a Kalman filter and an NLMS filter and by using the downlink signal as the reference signal, and an amplitude of a converged filter is calculated, to obtain the current frequency response curve information of the secondary path.

Step 41013*c*: Determine, from N groups of frequency response curve information of the secondary path that correspond to the N groups of prestored filtering parameters, target frequency response curve information matching the current frequency response curve information of the secondary path.

An index of a group of filtering parameters corresponding to the target frequency response curve information is x, and an index of the first group of filtering parameters in the N groups of prestored filtering parameters is n.

Step 41013*d*: If the index of the group of filtering parameters corresponding to the target frequency response curve information and the index of the first group of filtering parameters satisfy $|n-x|\geq 2$, determine that the leakage state between the headset and the ear canal changes. Otherwise, determine that the leakage state between the headset and the ear canal does not change.

Optionally, in the foregoing step 41013*a* to the step 41013*c*, the detection frequency band may be 125 Hz to 500 Hz. After the short-time Fourier transform is performed on the first signal, the second signal, and the anti-noise signal, the transform result in the detection frequency band is selected to calculate the current frequency response curve information of the secondary path. In an implementation, an interval between frequencies in the detection frequency band of 125 Hz to 500 Hz is set to 62.5 Hz. The detection frequency band includes 7 frequencies, that is, K=7.

Based on the implementation of detecting whether the leakage state between the headset and the ear canal changes described in the foregoing step 41013*a* to the step 41013*d*, the foregoing step 4102 may be implemented by performing step 41023*a*.

Step 41023*a*: Adjust indexes of the filtering parameters from n to x one by one by using the index n of the first group of filtering parameters as a starting point. The group of filtering parameters corresponding to the index x is the second group of filtering parameters.

It should be noted that, in this embodiment, when the headset has the downlink signal, the method for updating the filtering parameters of the headset is similar to the method for updating the filtering parameters of the headset when the headset has no downlink signal. Therefore, for detailed descriptions of the step 41023*a*, refer to the descriptions of the step 41022*a* in the foregoing embodiment. Details are not described herein again.

Figure 45:
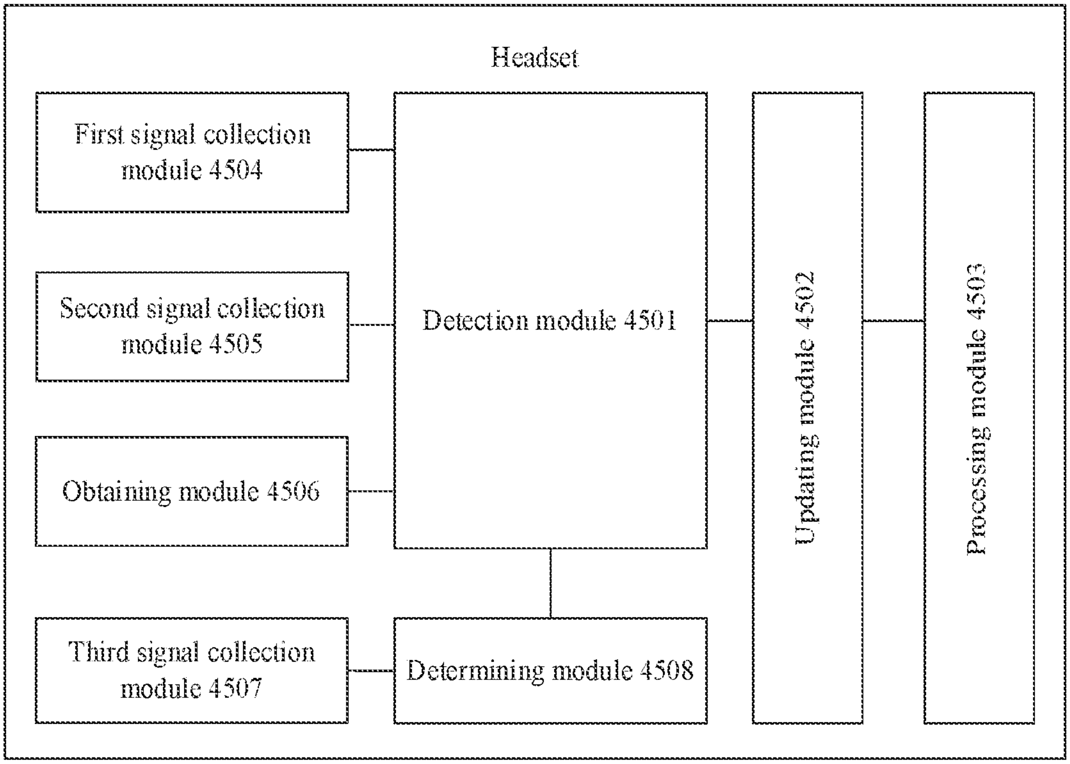
FIG. 45 is a schematic diagram of a structure of a headset according to an embodiment.

Correspondingly, an embodiment provides a headset. FIG. 45 is a possible schematic diagram of a structure of the headset in the foregoing embodiments. As shown in FIG. 45, the headset includes a detection module 4501, an updating module 4502, and a processing module 4503.

The detection module 4501 is configured to: when the headset is in an ANC working mode, detect whether a leakage state between the headset and an ear canal changes, for example, perform the step 4101 (including the step 41011*b* to the step 41011*c*, or the step 41012*b* to the step 41012*d*, or the step 41013*b* to the step 41013*d*) in the foregoing method embodiment.

The updating module 4502 is configured to: when the detection module detects that the leakage state between the headset and the ear canal changes, update filtering parameters of the headset from a first group of filtering parameters to a second group of filtering parameters, for example, perform the step 4102 in the foregoing method embodiment. The step 4102 may include the step 41021*a* to the step 41021*f*, or the step 41022*a*, or the step 41023*a*.

The processing module 4503 is configured to perform noise cancellation by using the second group of filtering parameters, for example, perform the step 4103 in the foregoing method embodiment.

Optionally, the headset provided in this embodiment further includes a first signal collection module 4504 and a second signal collection module 4505. The first signal collection module 4504 is configured to collect a first signal by using an error microphone of the headset, for example, perform actions of collecting the first signal in the step 41011*a*, the step 41012*a*, and the step 41013*a* in the foregoing method embodiment. The second signal collection module 4505 is configured to collect a second signal by using a reference microphone of the headset, for example, perform actions of collecting the second signal in the step 41011*a* and the step 41012*a* in the foregoing method embodiment.

Optionally, the headset provided in this embodiment further includes an obtaining module 4506. The obtaining module 4506 is configured to obtain an anti-noise signal played by a speaker of the headset, for example, perform an action of collecting the anti-noise signal in the step 41012*a* in the foregoing method embodiment. Alternatively, the obtaining module 4506 is configured to obtain a downlink signal of the headset, for example, perform an action of collecting the downlink signal in the step 41013*a* in the foregoing method embodiment.

Optionally, the headset provided in this embodiment further includes a third signal collection module 4507 and a determining module 4508. The third signal collection module 4507 is configured to collect a third signal by using a talk microphone of the headset. The determining module 4508 is configured to determine whether energy of the third signal is greater than a second preset energy threshold, to determine whether an environment is noisy.

The modules of the headset may be further configured to perform other actions in the foregoing method embodiments. All related content of the steps in the foregoing method embodiments may be cited in function descriptions of the corresponding functional modules.

The structure of the headset described in FIG. 45 is merely an example. For example, division into the units or modules of the headset is merely logical function division and may be other division in actual implementation. For example, the modules may be combined or integrated into another system, or some features may be ignored or may not be performed. Functional units or modules in embodiments may be integrated into one module, or each of the modules may exist alone physically, or two or more units or modules may be integrated into one module. The foregoing modules in FIG. 45 may be implemented in a form of hardware, or may be implemented in a form of a software functional unit. For example, when software is used for implementation, the detection module 4501, the updating module 4502, the processing module 4503, the obtaining module 4506, and the determining module 4508 may be implemented by software functional modules generated after the processor of the headset reads the program code stored in the memory. The foregoing modules may also be respectively implemented by different hardware of the headset. For example, the detection module 4501, the updating module 4502, the obtaining module 4506, and the determining module 4508 are implemented by a part of processing resources (for example, one core or two cores in a multi-core processor) in a micro control unit (for example, the micro control unit 202 in FIG. 2) of the headset, and the processing module 4503 is implemented by an ANC chip (for example, the ANC chip 203 in FIG. 2) of the headset. Refer to FIG. 2. The first signal collection module 4504 is implemented by an error microphone of the headset. The second signal collection module 4505 is implemented by a reference microphone of the headset. The third signal collection module 4507 is implemented by a talk microphone or a reference microphone of the headset. Apparently, the foregoing functional modules may alternatively be implemented by a combination of software and hardware. For example, the detection module 4501, the updating module 4502, and the determining module 4508 are software functional modules generated after the processor reads the program code stored in the memory.

For more details about implementing the foregoing function by the modules included in the headset, refer to the descriptions in the foregoing method embodiments. Details are not described herein again.

Embodiments in this specification are all described in a progressive manner, for same or similar parts in embodiments, refer to these embodiments, and each embodiment focuses on a difference from other embodiments.

All or some of the foregoing embodiments may be implemented by software, hardware, firmware, or any combination thereof. When a software program is used to implement embodiments, all or some of embodiments may be implemented in a form of a computer program product. The computer program product includes one or more computer instructions. When the computer instructions are loaded and executed on a computer, all or some of the procedures or functions according to embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a DIGITAL VERSATILE DISC (DVD)), a semiconductor medium (for example, a solid-state drive (SSD)), or the like.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions of embodiments.

In addition, functional units in embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure, or the part contributing to the conventional technology, or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in embodiments. The foregoing storage medium includes: any medium that can store program code, such as a flash memory, a removable hard disk, a read-only memory, a random access memory, a magnetic disk, or an optical disc.

The foregoing descriptions are merely specific implementations, but are not intended to limit the protection scope of this disclosure. Any variation or replacement within the technical scope disclosed in this application shall fall within the protection scope of this disclosure. Therefore, the protection scope of this disclosure shall be subject to the protection scope of the claims.

What is claimed is:

1. A method implemented by a headset having an active noise cancellation (ANC) function, wherein the method comprises:

identifying that the headset is in an ANC working mode;

receiving an instruction instructing the headset to obtain a first group of filtering parameters, wherein the first group of filtering parameters is different from a filtering parameter used by the headset before receiving the instruction;

obtaining the first group of filtering parameters, wherein the first group of filtering parameters is one of $N_1$ groups of filtering parameters prestored in the headset, wherein the $N_1$ groups of filtering parameters are configured to perform noise cancellation on ambient sound in $N_1$ leakage states, wherein the $N_1$ leakage states are formed by the headset and $N_1$ different ear canal environments, wherein, in a current wearing state of the headset, for a same ambient noise, a first noise cancellation effect obtained when the first group of filtering parameters is applied to the headset is better than a second noise cancellation effect obtained when a second filtering parameter in the $N_1$ groups of filtering parameters is applied to the headset, and wherein $N_1$ is a positive integer greater than or equal to 2; and performing noise cancellation using the first group of filtering parameters.

2. The method of claim 1, further comprising generating $N_2$ groups of filtering parameters based on the first group of filtering parameters and a third group of filtering parameters, wherein the $N_2$ groups of filtering parameters correspond to different ANC noise cancellation strengths, wherein the third group of filtering parameters is one of the $N_1$ groups of filtering parameters prestored in the headset, and wherein the third group of filtering parameters performs noise cancellation on ambient sound in a state with a minimum leakage degree in the $N_1$ leakage states.

3. The method of claim 2, further comprising:

obtaining a target ANC noise cancellation strength;

determining a fourth group of filtering parameters from the $N_2$ groups of filtering parameters based on the target ANC noise cancellation strength; and performing noise cancellation using the fourth group of filtering parameters.

4. The method of claim 3, wherein obtaining the target ANC noise cancellation strength comprises receiving indication information from a terminal, and wherein the indication information instructs the headset to perform noise cancellation using the fourth group of filtering parameters corresponding to the target ANC noise cancellation strength.

5. The method of claim 2, wherein generating the $N_2$ groups of filtering parameters comprises performing interpolation on the first group of filtering parameters and the third group of filtering parameters to generate the $N_2$ groups of filtering parameters.

6. The method of claim 2, wherein after obtaining the first group of filtering parameters and before generating the $N_2$ groups of filtering parameters, the method further comprises receiving an instruction triggering the headset to generate the $N_2$ groups of filtering parameters.

7. The method of claim 1, wherein obtaining the first group of filtering parameters comprises receiving indication information from a terminal, and wherein the indication information instructs the headset to perform noise cancellation using the first group of filtering parameters.

8. The method of claim 1, wherein obtaining the first group of filtering parameters comprises:

collecting a first signal using an error microphone of the headset;

obtaining a downlink signal of the headset;

determining current frequency response curve information of a secondary path based on the first signal and the downlink signal;

determining, from preset frequency response curve information of $N_1$ secondary paths, target frequency response curve information matching the current frequency response curve information; and setting a third group of filtering parameters corresponding to the target frequency response curve information as the first group of filtering parameters, wherein the $N_1$ groups of filtering parameters correspond to the preset frequency response curve information.

9. The method of claim 1, wherein obtaining the first group of filtering parameters comprises:

collecting a first signal using an error microphone of the headset;

collecting a second signal using a reference microphone of the headset;

obtaining a downlink signal of the headset;

determining a residual signal of the error microphone based on the first signal and the second signal;

determining current frequency response curve information of a secondary path based on the residual signal and the downlink signal;

determining, from preset frequency response curve information of $N_1$ secondary paths, target frequency response curve information matching the current frequency response curve information; and setting a third group of filtering parameters corresponding to the target frequency response curve information as the first group of filtering parameters, wherein the $N_1$ groups of filtering parameters correspond to the preset frequency response curve information.

10. The method of claim 1, wherein obtaining the first group of filtering parameters comprises:

collecting a first signal using an error microphone of the headset;

collecting a second signal using a reference microphone of the headset;

determining current frequency response curve information of a primary path based on the first signal and the second signal;

determining, from preset frequency response curve information of $N_1$ primary paths, target frequency response curve information matching the current frequency response curve information; and setting a third group of filtering parameters corresponding to the target frequency response curve information as the first group of filtering parameters, wherein the $N_1$ groups of filtering parameters correspond to the preset frequency response curve information.

11. The method of claim 1, wherein obtaining the first group of filtering parameters comprises:

collecting a first signal using an error microphone of the headset;

collecting a second signal using a reference microphone of the headset;

obtaining a downlink signal of the headset;

determining first current frequency response curve information of a primary path based on the first signal and the second signal;

determining second current frequency response curve information of a secondary path based on the first signal and the downlink signal;

determining current frequency response ratio curve information that is a ratio of the first current frequency response curve information to the second current frequency response curve information;

determining, from $N_1$ pieces of preset frequency response ratio curve information, target frequency response ratio curve information matching the current frequency response ratio curve information; and setting a third group of filtering parameters corresponding to the target frequency response ratio curve information as the first group of filtering parameters, wherein the $N_1$ groups of filtering parameters correspond to the $N_1$ pieces of preset frequency response ratio curve information.

12. The method of claim 1, wherein obtaining the first group of filtering parameters comprises:

determining frequency response difference curve information that is of an error microphone of the headset and a reference microphone of the headset and that corresponds to the $N_1$ groups of filtering parameters;

setting, in $N_1$ pieces of frequency response difference curve information corresponding to the $N_1$ groups of filtering parameters, a frequency response difference curve that has a minimum amplitude and that corresponds to a target frequency band as a target frequency response difference curve, wherein the frequency response difference curve information is a difference between first frequency response curve information of the error microphone and second frequency response curve information of the reference microphone; and setting a third group of filtering parameters corresponding to the target frequency response difference curve information as the first group of filtering parameters.

13. The method of claim 1, further comprising determining the $N_1$ groups of filtering parameters based on a first recording signal in a secondary path (SP) mode and a second recording signal in a primary path (PP) mode, wherein the first recording signal comprises a downlink signal, a first signal of a tympanic microphone, and a second signal of an error microphone of the headset, and wherein the second recording signal comprises the first signal, the second signal, and a third signal of a reference microphone of the headset.

14. A headset comprising:

a memory configured to store instructions; and a processor coupled to the memory and configured to execute the instructions to cause, when the headset is in an active noise cancellation (ANC) working mode, the headset to:

receive an instruction instructing the headset to obtain a first group of filtering parameters, wherein the first group of filtering parameters is different from a filtering parameter used by the headset before receiving the instruction;

obtain the first group of filtering parameters, wherein the first group of filtering parameters is one of $N_1$ groups of filtering parameters prestored in the headset, wherein the $N_1$ groups of filtering parameters are configured to perform noise cancellation on ambient sound in $N_1$ leakage states, wherein the $N_1$ leakage states are formed by the headset and $N_1$ different ear canal environments, wherein, in a current wearing state of the headset, for a same ambient noise, first noise cancellation effect obtained when the first group of filtering parameters is applied to the headset is better than second noise cancellation effect obtained when a second filtering parameter in the $N_1$ groups of filtering parameters is applied to the headset, and wherein $N_1$ is a positive integer greater than or equal to 2; and perform noise cancellation using the first group of filtering parameters.

15. The headset of claim 14, further comprising:

an error microphone coupled to the processor and configured to collect a first signal; and a reference microphone coupled to the processor and configured to collect a second signal, wherein the processor is further configured to execute the instructions to cause the headset to:

obtain a downlink signal of the headset;

determine a residual signal of the error microphone based on the first signal and the second signal;

determine current frequency response curve information of a secondary path based on the residual signal and the downlink signal;

determine, from preset frequency response curve information of $N_1$ secondary paths, target frequency response curve information matching the current frequency response curve information; and set a third group of filtering parameters corresponding to the target frequency response curve information as the first group of filtering parameters, wherein the $N_1$ groups of filtering parameters correspond to the preset frequency response curve information.

16. The headset of claim 14, further comprising:

an error microphone coupled to the processor and comprising a first signal; and a reference microphone coupled to the processor and comprising a second signal, wherein the processor is further configured to execute the instructions to cause the headset to determine the $N_1$ groups of filtering parameters based on a first recording signal in a secondary path (SP) mode and a second recording signal in a primary path (PP) mode, wherein the first recording signal comprises a downlink signal, a third signal of a tympanic microphone, and the first signal, and wherein the second recording signal comprises the third signal, the first signal, and the second signal.

17. The headset of claim 14, wherein obtaining the first group of filtering parameters comprises:

an error microphone coupled to the processor and comprising a first signal;

wherein the processor is further configured to execute the instructions to cause the headset to:

obtain a downlink signal of the headset;

determine current frequency response curve information of a secondary path based on the first signal and the downlink signal;

determine, from preset frequency response curve information of $N_1$ secondary paths, target frequency response curve information matching the current frequency response curve information; and set a third group of filtering parameters corresponding to the target frequency response curve information as the first group of filtering parameters, wherein the $N_1$ groups of filtering parameters correspond to the preset frequency response curve information.

* * * * *